United States Patent
Lee et al.

(10) Patent No.: US 10,602,076 B2
(45) Date of Patent: Mar. 24, 2020

(54) METHOD FOR COMBINING AND PROVIDING IMAGE, OBTAINED THROUGH A CAMERA, ELECTRONIC DEVICE, AND STORAGE MEDIUM

(71) Applicant: SAMSUNG ELECTRONICS CO., LTD., Suwon-si, Gyeonggi-do (KR)

(72) Inventors: Woo-Yong Lee, Hwaseong-si (KR); Dong-Hyun Kim, Suwon-si (KR); Dong-Hoon Kim, Seoul (KR); Sang-Ho Noh, Seoul (KR); Kyung-Yul Seo, Suwon-si (KR); Jong-Hun Won, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 8 days.

(21) Appl. No.: 15/748,307

(22) PCT Filed: Aug. 10, 2016

(86) PCT No.: PCT/KR2016/008789
§ 371 (c)(1),
(2) Date: Jan. 29, 2018

(87) PCT Pub. No.: WO2017/026793
PCT Pub. Date: Feb. 16, 2017

(65) Prior Publication Data
US 2018/0227506 A1 Aug. 9, 2018

(30) Foreign Application Priority Data

Aug. 12, 2015 (KR) .................. 10-2015-0114144

(51) Int. Cl.
*H04N 5/262* (2006.01)
*H04N 5/232* (2006.01)
(Continued)

(52) U.S. Cl.
CPC ......... *H04N 5/2624* (2013.01); *G11B 27/031* (2013.01); *G11B 27/28* (2013.01);
(Continued)

(58) Field of Classification Search
CPC ............. H04N 5/2624; H04N 5/23216; H04N 5/23219; H04N 5/23222; H04N 5/23232;
(Continued)

(56) References Cited

U.S. PATENT DOCUMENTS 7,529,429 B2  5/2009 Rother et al.
8,126,192 B2  2/2012 Sagoo et al.
(Continued)

FOREIGN PATENT DOCUMENTS

CN  101146179  3/2008
CN  103024262  4/2013
(Continued)

OTHER PUBLICATIONS

Extended Search Report dated May 18, 2018 in counterpart European Patent Application No. 16835433.0.
(Continued)

*Primary Examiner* — Nicholas G Giles
(74) *Attorney, Agent, or Firm* — Nixon & Vanderhye, P.C.

(57) ABSTRACT

According to various examples, a method for providing, in an electronic device, an image can comprise the steps of: obtaining a first image of a subject by using a camera functionally connected to the electronic device; generating at least one image comprising a second image to be related to the first image; and concurrently displaying the first image on a first region of a display functionally connected to the electronic device, and the second image on a second region of the display.

13 Claims, 40 Drawing Sheets

(51) Int. Cl.
*H04N 21/2387* (2011.01)
*H04N 5/265* (2006.01)
*H04N 5/77* (2006.01)
*G11B 27/28* (2006.01)
*G11B 27/031* (2006.01)

(52) U.S. Cl.
CPC ..... *H04N 5/23216* (2013.01); *H04N 5/23219* (2013.01); *H04N 5/23222* (2013.01); *H04N 5/23232* (2013.01); *H04N 5/23293* (2013.01); *H04N 5/23296* (2013.01); *H04N 5/265* (2013.01); *H04N 5/2621* (2013.01); *H04N 5/772* (2013.01); *H04N 21/2387* (2013.01)

(58) Field of Classification Search
CPC .......... H04N 5/23293; H04N 5/23296; H04N 5/2621; H04N 5/265; H04N 5/772; H04N 21/2387; G11B 27/031; G11B 27/28
See application file for complete search history.

(56) References Cited

U.S. PATENT DOCUMENTS

| | | | |
|---|---|---|---|
| 8,144,919 | B2 | 3/2012 | Murai et al. |
| 8,509,518 | B2 | 8/2013 | Sorek et al. |
| 2008/0068487 | A1 | 3/2008 | Morita |
| 2009/0207248 | A1* | 8/2009 | Cilia .................... H04N 19/17 348/143 |
| 2010/0199227 | A1 | 8/2010 | Xiao et al. |
| 2011/0029884 | A1 | 2/2011 | Grosz et al. |
| 2012/0268641 | A1 | 10/2012 | Kazama |
| 2013/0070143 | A1 | 3/2013 | Jang et al. |
| 2013/0227414 | A1 | 8/2013 | Hwang et al. |
| 2014/0186004 | A1 | 7/2014 | Hamer |
| 2014/0192137 | A1 | 7/2014 | Kim et al. |
| 2014/0204244 | A1 | 7/2014 | Choi et al. |
| 2014/0212110 | A1* | 7/2014 | Lee .................... H04N 5/2624 386/282 |
| 2014/0286625 | A1 | 9/2014 | Matsubara et al. |
| 2015/0103101 | A1 | 4/2015 | Lee et al. |

FOREIGN PATENT DOCUMENTS

| | | |
|---|---|---|
| CN | 103945113 | 7/2014 |
| CN | 103961100 | 8/2014 |
| EP | 2 757 773 | 1/2014 |
| KR | 10-2012-0083123 | 7/2012 |
| KR | 10-2013-0031176 | 3/2013 |
| KR | 10-2013-0097372 | 9/2013 |
| KR | 10-2014-0089146 | 7/2014 |
| WO | 2014/132548 | 9/2014 |

OTHER PUBLICATIONS

International Search Report for PCT/KR2016/008789, dated Nov. 15, 2016, 4 pages.
Written Opinion of the ISA for PCT/KR2016/008789, dated Nov. 15, 2016, 7 pages.
First Office Action dated Sep. 25, 2019 in counterpart Chinese Patent Application No. 201680047443.3 and English-language translation.

* cited by examiner

METHOD FOR COMBINING AND PROVIDING IMAGE, OBTAINED THROUGH A CAMERA, ELECTRONIC DEVICE, AND STORAGE MEDIUM

CROSS-REFERENCE TO RELATED APPLICATION

This application is the U.S. national phase of International Application No. PCT/KR2016/008789 filed Aug. 10, 2016, which designated the U.S. and claims priority to KR Patent Application No. 10-2015-0114144 filed Aug. 12, 2015, the entire contents of each of which are hereby incorporated by reference.

TECHNICAL FIELD

Various embodiments of the present disclosure relate to an electronic device and a method for providing an image.

BACKGROUND ART

A conventional electronic device includes a camera to photograph a subject when needed by a user.

The conventional electronic device processes an image captured using the camera, generates an image file by compressing the processed image, and stores the generated image file in a memory.

DETAILED DESCRIPTION OF THE INVENTION

Technical Problem

In the conventional electronic device, to edit the image captured with the camera, an editing process is performed by post-processing using a separate editor after the image is captured. As a result, a long time is needed until the user obtains a desired image, causing inconvenience to the user.

Therefore, a need exists for a method for rapidly and easily editing an image captured using the camera.

Technical Solution

According to various embodiments, a method for providing, in an electronic device, an image includes obtaining an image of a subject by using a camera functionally connected with the electronic device, generating at least one sub image corresponding to a part of the subject based on the image, and concurrently displaying the image on a first region of a display functionally connected with the electronic device and the at least one sub image on a second region of the display.

According to various embodiments, a method for providing, in an electronic device, an image includes obtaining a first image by using a camera functionally connected with the electronic device, generating a second image by using the first image, combining the first image with the second image to thereby generate a third image, the first image being provided on a first region of the third image and the second image being provided on a second region of the third image, and displaying the third image on a display functionally connected with the electronic device.

According to various embodiments, an electronic device includes a camera and a processor functionally connected with the camera, and the processor is configured to obtain an image of a subject by using the camera, to generate at least one sub image corresponding to a part of the subject based on the image, and to concurrently display the image on a first region of a display functionally connected with the electronic device and the at least one sub image on a second region of the display.

According to various embodiments, an electronic device includes a camera and a processor functionally connected with the camera, and the processor is configured to obtain a first image by using the camera, to generate a second image by using the first image, to combine the first image with the second image to thereby generate a third image, the first image being provided on a first region of the third image and the second image being provided on a second region of the third image, and to display the third image on a display functionally connected with the electronic device.

Advantageous Effects

According to various embodiments, an image captured using a camera may be rapidly and easily edited.

According to various embodiments, the image captured using the camera may be displayed in a divided manner based on a time or a region.

According to various embodiments, the image captured using the camera may be displayed in real time by using a camera application, and the image may be displayed in a divided manner based on a time or a region.

According to various embodiments, in a network environment including a plurality of electronic devices, an electronic device may display at least one image, received from another electronic device, in a divided manner based on a time or a region.

MODE FOR CARRYING OUT THE INVENTION

Figure 1:
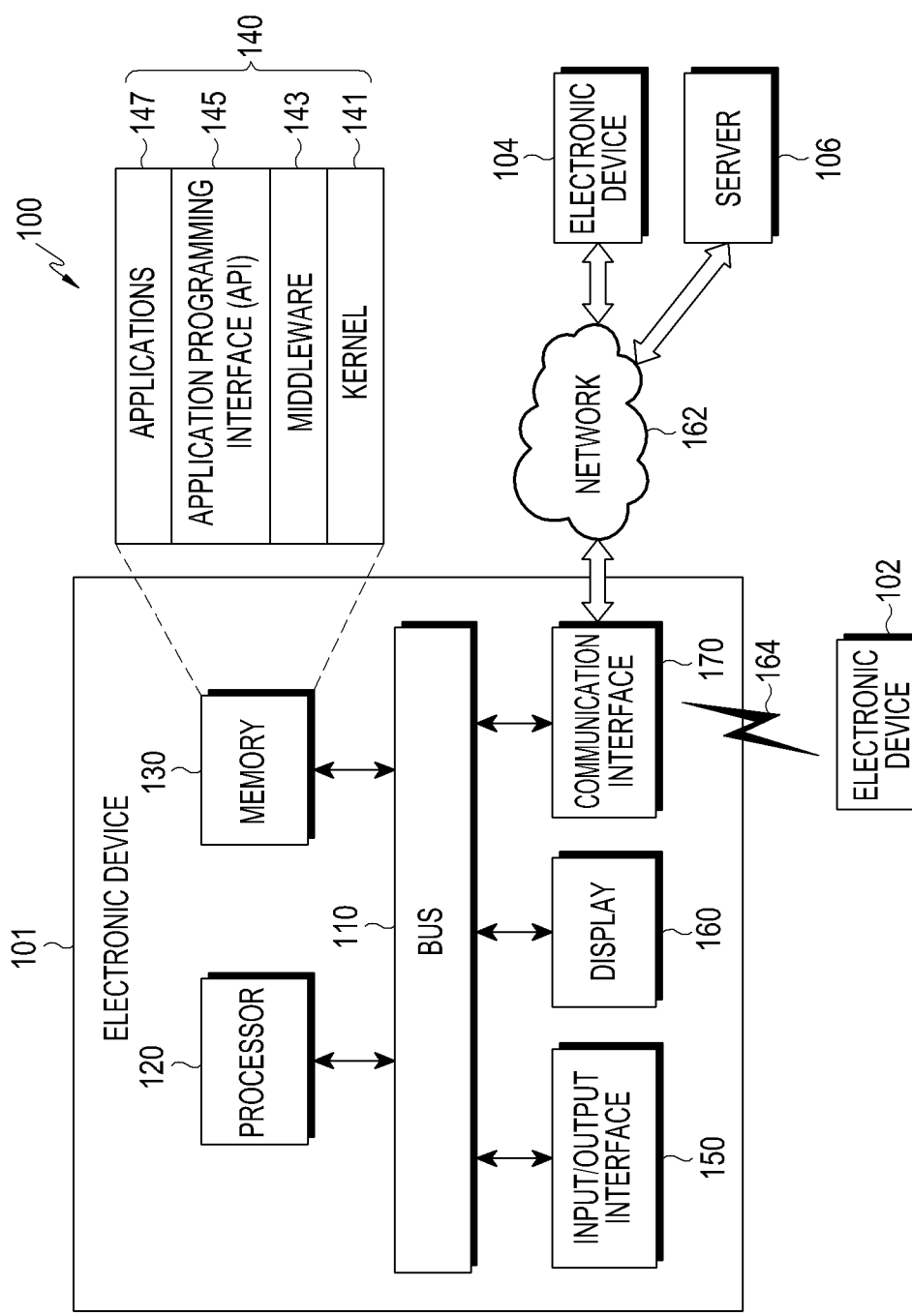
FIG. 1 illustrates an electronic device in a network environment according to various embodiments of the present disclosure.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

According to some embodiments, the electronic device may be a home appliance. The home appliance may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 120, 130, and 150 to 170 and delivering communication (e.g., a control message and/or data) between the elements 120, 130, and 150 to 170.

The processor 120 may include one or more of a central processing unit (CPU), an application processor (AP), and a communication processor (CP). The processor 120 performs operations or data processing for control and/or communication of, for example, at least one other elements of the electronic device 101. The processor 120 may be referred to as a controller, may include the controller as a part thereof, or may constitute the controller.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., the vehicle device 102, the electronic device 104, or the server 106). For example, the communication interface 170 may be connected to a network 162 through wireless communication or wired communication to communicate with an external device (e.g., the second external electronic device 104 or the server 106). The communication interface 170 may include a communication processor (CP) that may constitute one of a plurality of modules of the communication interface 170. In an embodiment, the CP may be included in the processor 120.

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, short-range communication 164. The short-range communication 164 may include, for example, at least one of WiFi, Bluetooth, NFC, and GNSS. Depending on a usage area or bandwidth, the GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of USB, HDMI, RS-232, and POTS. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The other electronic device (e.g., the electronic device 102 or 104 or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
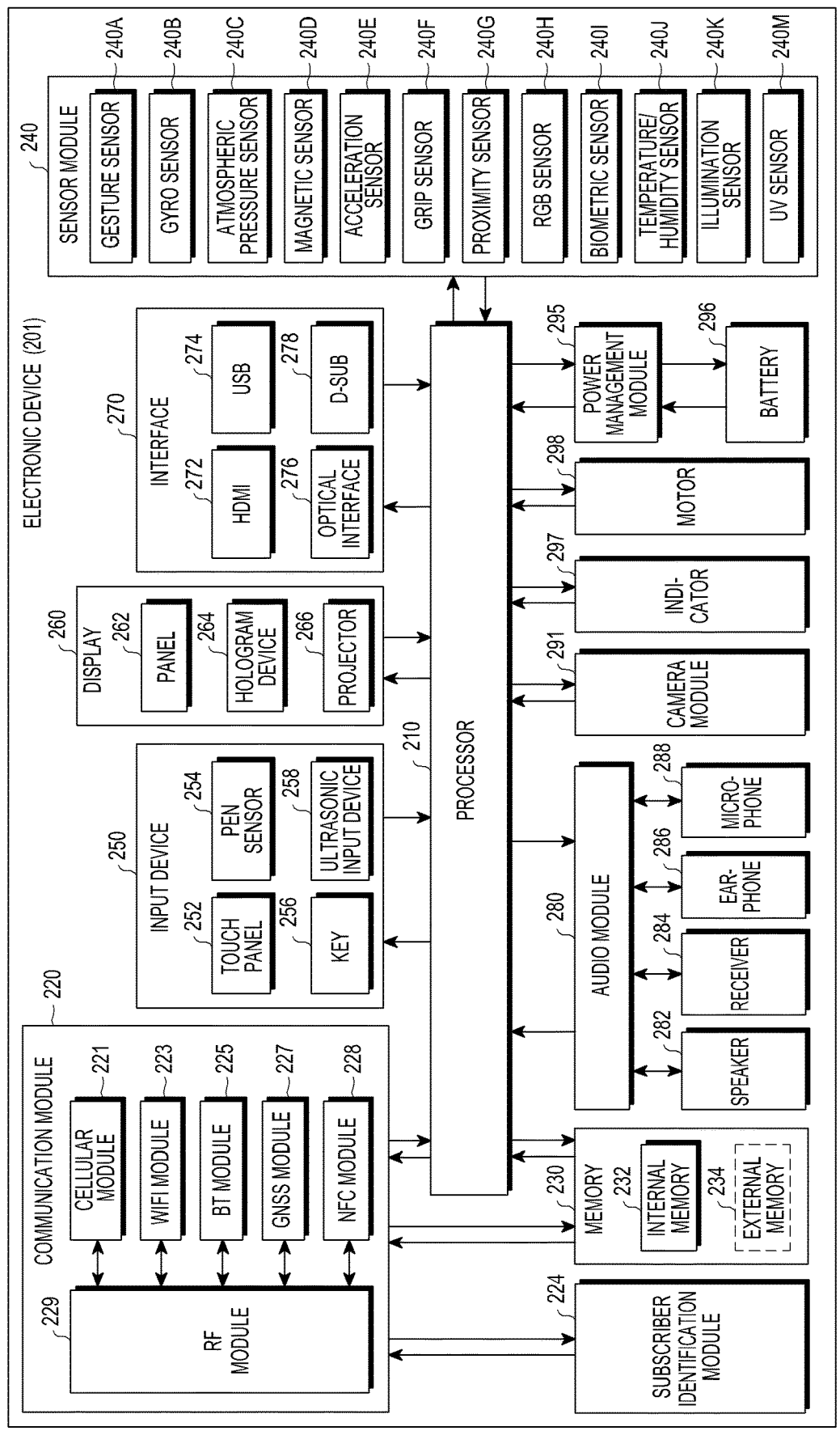
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more application processors (APs) 210, a communication module 220, a memory 230, a sensor module 240, an input device 250, and a display 260, and the electronic device 201 may further include at least one of a subscriber identification module (SIM) 224, an interface 270, an audio module 280, a camera module 291, a power management module 295, a battery 296, an indicator 297, and a motor 298.

The processor 210 controls multiple hardware or software components connected to the processor 210 by driving an Operating System (OS) or an application program, and performs processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data, and stores various data in the non-volatile memory.

The communication module 220 may have a configuration that is the same as or similar to the communication interface 170 illustrated in FIG. 1. The communication module 220 may include, for example, at least one of the cellular module 221, a WiFi module 223, a Bluetooth (BT) module 225, a GNSS module 227 (e.g., a GPS module, a Glonass module, a Beidou module, or a Galileo module), a near field communication (NFC) module 228, and a radio frequency (RF) module 229.

The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP).

Each of the WiFi module 223, the BT module 225, the GNSS module 227, and the NFC module 228 may include, for example, a processor for processing data transmitted and received by a corresponding module. According to some embodiment, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include at least one of a transceiver, a power amp module (PAM), a frequency filter, a low noise amplifier (LNA), and an antenna. According to another embodiment, at least one of the cellular module 221, the WiFi module 223, the BT module 225, the GNSS module 227, and the NFC module 228 may transmit and receive an RF signal through the separate RF module.

The SIM 224 may, for example, include a card including an SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid-state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input module 250 may, for example, include a touch panel 252, and may further include at least one of a (digital) pen sensor 254, a key 256, and an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, and may further include a hologram device 264, and/or a projector 266. The panel 262 may have a configuration that is the same as or similar to the display 160 illustrated in FIG. 1. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto an external screen through projection of light. The screen may be positioned inside or outside the electronic device 201. According to an embodiment, the display 260 may further include a control circuit for controlling the panel 262, the hologram device 264, or the projector 266.

According to an embodiment, the interface 270 may include at least one of a high-definition multimedia interface (HDMI) 272, a universal serial bus (USB) 274, an optical communication 276, and a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio module 280 bi-directionally converts sound and an electric signal. At least one element of the audio module 280 may be included in the input/output interface 150 illustrated in FIG. 1. The audio module 280 processes sound information input or output through the speaker 282, the receiver 284, the earphone 286, or the microphone 288.

The camera module 291 is a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes, for example, at least one of a magnetic-resonance type, a magnetic induction type, and an electromagnetic type, and an additional circuit for wireless charging, for example, a coil loop, a resonance circuit, a rectifier, or the like may be further included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 3:
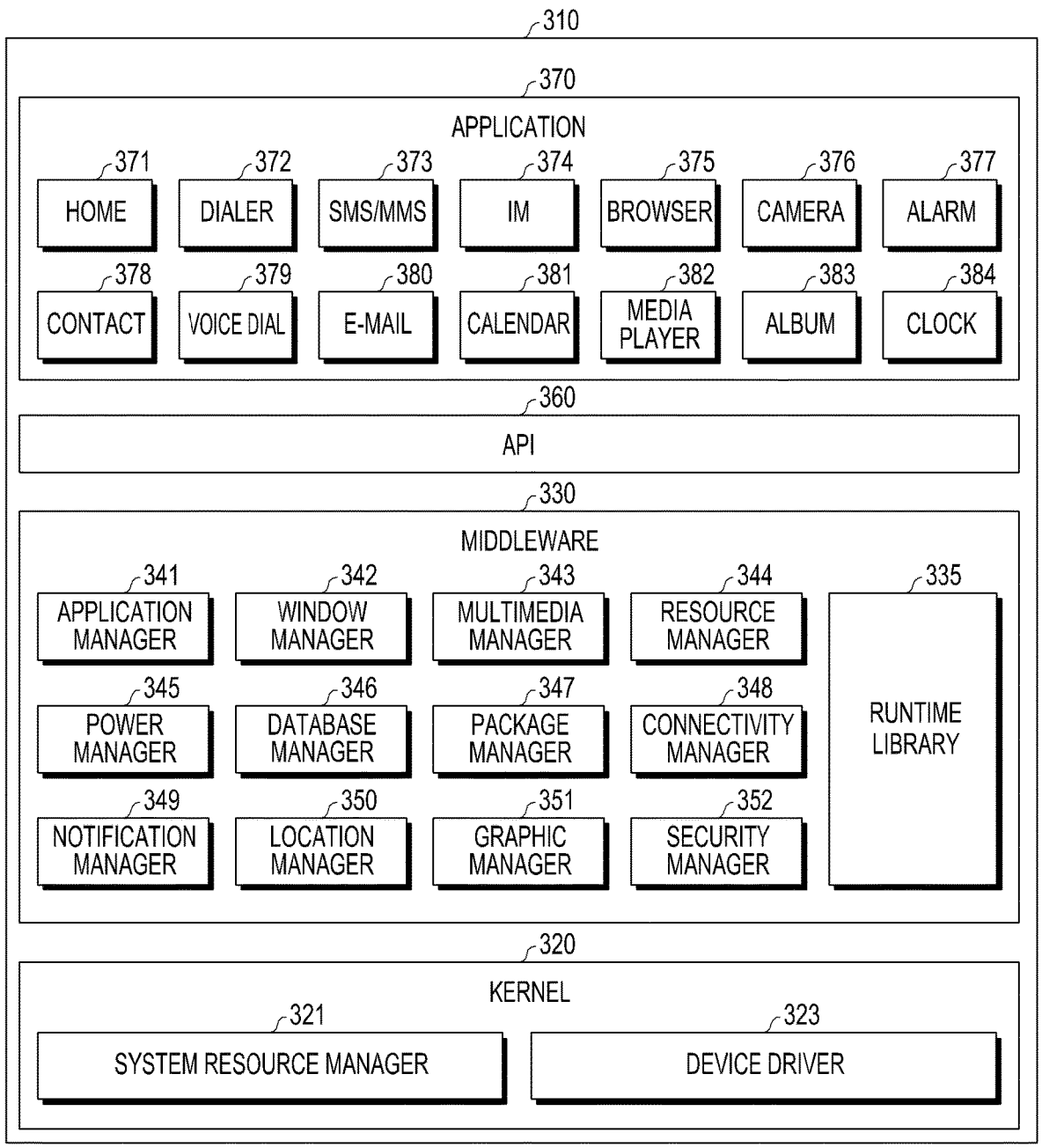
FIG. 3 is a block diagram of a programming module according to various embodiments of the present disclosure.

FIG. 3 is a block diagram of a programming module according to various embodiments of the present disclosure. According to an embodiment, a programming module 310 (e.g., the program 140) may include an OS for controlling resources associated with an electronic device (e.g., the electronic device 101) and/or various applications (e.g., the application program 147) executed on the OS. The OS may include Android, iOS, Windows, Symbian, Tizen, or Bada.

The programming module 310 may include, for example, a kernel 320, middleware 330, an application programming interface (API) 360, and/or an application 370. At least a part of the programming module 310 may be preloaded on an electronic device or may be downloaded from an external device (e.g., the external device 102 or 104 or the server 106).

The kernel 320 (e.g., the kernel 141) may, for example, include a system resource manager 321 and/or a device driver 323. The system resource manager 321 may perform control, allocation, retrieval of system resources, and so forth. According to an embodiment, the system resource manager 321 may include at least one of a process management unit, a memory management unit, a file system, and the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may include provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an input/output, memory management, or calculation operation.

The application manager 341 manages a life cycle of at least one application among the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power, for example, in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface relating thereto. The security manager 352 provides a general security function necessary for system security or user authentication. According to an embodiment, if the electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. In the case of Android or iOS, for example, one API set may be provided by each platform, and in the case of Tizen, two or more API sets may be provided.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 37 may include an application (e.g., device health care application of mobile medical equipment) designated according to an attribute of the external electronic device (e.g., the electronic device 102 or 104). According to an embodiment, the application 37 may include an application received from the external electronic device (e.g., the server 106 or the electronic device 102 or 104). According to an embodiment, the application 370 may include a preloaded application or a third-party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). At least some of the programming module 310 may include, for example, at least one of modules, programs, routines, sets of instructions, and processes for performing one or more functions.

Figure 4:
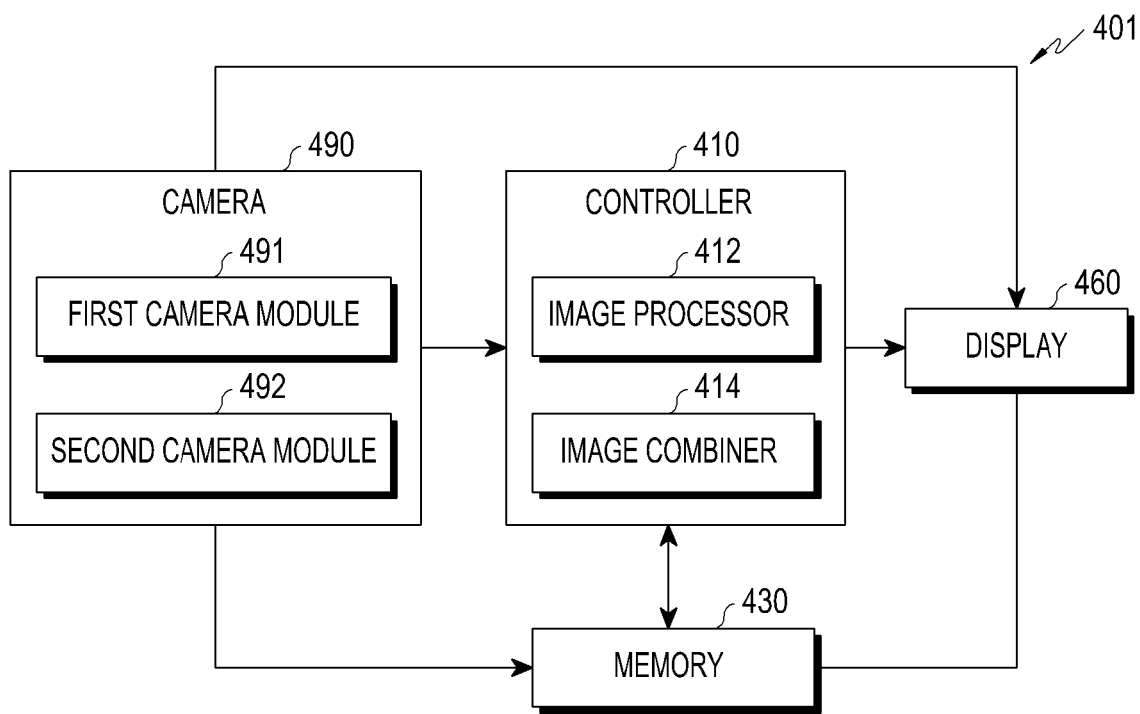
FIG. 4 is a block diagram of main elements of an electronic device for executing a method for providing an image.

FIG. 4 is a block diagram of main elements of an electronic device for executing a method for providing an image.

The electronic device 401 (e.g., the electronic device 101 or 201) may include a camera 490 (e.g., the camera module 291), a memory 430 (e.g., the memory 130 or 230), a display 460 (e.g., the display 160 or 260), and a controller 410 (e.g., the processor 120 or 210).

The camera 490 photographs a subject(s) in front of and/or at the rear of the electronic device 401 and outputs an image(s) of the photographed subject(s). The camera 490 may include a first camera module 491 (or a rear surface/rear camera module) for photographing a rear subject of the electronic device 401 and a second camera module 492 (or a front surface/front camera module) for photographing a front subject of the electronic device 401. For example, each of the camera modules 491 and 492 may capture a still image or a moving image under control of the controller 410 and output the captured still image or moving image to the controller 410 or the memory 430. The controller 410 stores the captured still image or moving image in the memory 430 or displays the same on the display 460. For example, each of the camera modules 491 and 492 may generate a preview image (or a live preview image) of the front or rear subject and output the generated preview image to the controller 410 or the display 460. The controller 410 displays the preview image on the display 460. For example, the controller 410 may display the image stored in the memory 430 on the display 460.

The display 460 displays an image, a signal, data, or information that is input from the camera 490, the memory 430, or the controller 410 on a screen.

The memory 430 stores an image, a signal, data, or information that is input from the controller 410. The memory 430 stores a combined image and a first image and a second image (and other image(s) to be included in the combined image). For example, each of the first image, the second image, and/or the combined image may be a moving image file(s) having image information such as a picture, a drawing, etc. The moving image file may include image information and audio information. The moving image file may have at least one extension of mpeg, mpg, mp4, avi, mov, and mkv.

In an embodiment, the second image may be generated based on a still image file(s) having image information such as a picture, a drawing, etc. For example, the still image file may have at least one extension of BMP (*.BMP, *.RLE), JPEG (*.JPG), Compuserve GIF (*.GIF), PNG (*.PNG), Photoshop (*,PSD, *.PDD), TIFF (*.TIF), Acrobat PDF (*.PDF), RAW (*.RAW), Illustrator (*.AI), Illustrator, Photoshop EPS (*.EPS), Amiga IFF (*.IFF), FlaschPix (*.FPX), Filmstrip (*.FRM), PCX (*.PCX), PICT File (*.PCT, *.PIC), Pixar (*.PXR), Scitex (*.SCT), and Targa (*.TGA, *.VDA, *.ICB, *.VST).

For example, each of the first image, the second image, and/or the combined image may include audio information. The audio information may be recorded together with an image when the first image or the second image is captured. The audio information may be generated based on an audio file(s) stored in the memory 430. The audio file may have at least one extension of mp3, wma, ogg, and way.

In an embodiment, the memory 430 stores target data (or a database) for recognizing a preset subject (or the entire person or a part thereof, the entire subject (including a natural object such as cloud, the sky, the sea, etc.) or a part thereof, or the like) in an image. The target data for recognizing the subject may include information such as a subject image, a feature point (which may also be referred to as a feature image, a feature pattern, etc.) of the subject image, and so forth. The feature point may include an edge, a corner, an image pattern, a contour, etc.

In an embodiment, the target data for recognizing the subject may include a recognition criterion that may be defined by expressional characteristics such as a shape/movement/size/color/brightness, etc., of an object/person and by a category such as a figure/flower/sky/pet, etc.

The controller 410 displays a first image on a first region (or a first screen region or a first window) on the display 460. For example, the first image may be an image obtained using the camera 490 or a part of the image. The controller 410 displays a second image on a second region (or a second screen region or a second window) on the display 460. The controller 410 stores or shares a combined image including the first image and the second image. The controller 410 stores the combined image in the memory 430.

In an embodiment, the controller 410 transmits the combined image to an external electronic device (e.g., the electronic device 102 or 104, the server 106, or the like) through a communication module (e.g., the communication interface 170 or the communication module 220).

The controller 410 may include an image processor 412 and an image combiner 414.

In an embodiment, the image processor 412 may apply a visual effect to the first image and/or the second image. The image processor 412 applies a visual effect to the entire region or a partial region of at least one frame (i.e., moving image frame) of the first image or the second image. The visual effect may refer to the effect of changing at least one of a color, a brightness, a chroma, and a transparency of the entire region or a partial region of an image frame or changing the partial region into another image. For example, the visual effect may include at least one of a pastel effect, a vignette effect, a warm effect, a vintage/retro effect, a monogram effect, a vivid effect, and a grayscale effect. The visual effect may include at least one of a blur effect of blurring an image, a dim effect of dimming the image, an effect of changing a color of the image into a particular color/tone/feeling, a subtract effect of changing the color of the image into a complementary color of a particular color, an alpha effect of making the image transparent, and a chroma effect of making a particular color of colors of the image transparent.

In an embodiment, the image processor 412 may recognize a preset subject (or a person or an object) in an image frame based on the target data (or the database) stored in the memory 430 and applies a visual effect to the recognized subject.

In an embodiment, the image processor 412 may obtain/generate the first image and at least one image including the second image that is to be associated with the first image, based on configuration information related to the combined image and/or the second image stored in the memory 430. For example, the image processor 412 may generate the second image by using at least a part (or at least some image frames or at least a part of each image frame) of the first image.

In an embodiment, the image processor 412 may perform a management operation such as storage, loading, etc., of the first image and/or the second image. For example, if capturing of the first image is stopped/paused due to occurrence of an event, the image processor 412 may temporarily store a former part of the first image (and the second image) in the memory 430. If capturing of the first image is resumed, the image processor 412 loads the former part of the first image (and the second image) temporarily stored in the memory 430 and stores a latter part consecutively from the former part. For example, the event may include at least one of detection of a photographing stop/pause instruction, battery discharge, phone (call) reception/sending, and so forth.

In an embodiment, the image combiner 414 may generate the combined image including the first image and the second image, based on configuration information related to the combined image and/or the second image stored in the memory 430. For example, the combined image (or a combined image file) may include audio information and/or at least a part of the configuration information, together with image information.

In an embodiment, the image combiner 414 may apply an editing function for the combined image and/or the second image.

According to various embodiments, an electronic device includes a camera and a processor functionally connected with the camera, and the processor is configured to obtain an image of a subject by using the camera, to generate at least one sub image corresponding to a part of the subject based on the image, and to concurrently display the image on a first region of a display functionally connected with the electronic device and the at least one sub image on a second region of the display.

According to various embodiments, an electronic device includes a camera and a processor functionally connected with the camera, and the processor is configured to obtain a first image by using the camera, to generate a second image by using the first image, to combine the first image with the second image to thereby generate a third image, the first image being provided on a first region of the third image and the second image being provided on a second region of the third image, and to display the third image on a display functionally connected with the electronic device.

According to various embodiments, an electronic device includes a camera and a processor functionally connected with the camera, and the processor is configured to obtain a first image of a subject by using the camera, to generate at least one image including a second image to be associated with the first image, and to concurrently display the first image on a first region of the display and the second image on a second region of the display.

According to various embodiments, an electronic device includes a display functionally connected with the electronic device and a processor configured to obtain a first image, to generate at least one image including a second image to be associated with the first image, and to concurrently display the first image on a first region of the display and the second image on a second region of the display.

According to various embodiments, an electronic device includes a camera, a display functionally connected with the electronic device, and a processor configured to capture a first image by using the camera, to generate at least one image including a second image based on a captured part of the first image during/after capturing of the first image, and to concurrently display the first image on a first region of the display and the second image on a second region of the display.

According to various embodiments, an electronic device includes a memory functionally connected with the electronic device, a display functionally connected with the electronic device, and a processor configured to store configuration information about a combined image in the memory, to obtain a first image to be included in the combined image, to automatically generate at least one image including a second image to be included in the combined image based on the first image, and to concurrently display the first image on a first region of the display and the second image on a second region of the display.

According to various embodiments, an electronic device includes a memory functionally connected with the electronic device, a display functionally connected with the electronic device, and a processor configured to store configuration information about a combined image in the memory, to obtain a first image to be included in the combined image, to automatically display at least one image including a second image that is associated with the first image and is to be included in the combined image on the display, and to generate a combined image including the first image and the second image.

According to various embodiments, an electronic device includes a display functionally connected with the electronic device and a processor configured to display a first image on a first screen region of the display, to display a second image to be associated with the first image on a second screen region of the display, and to generate a combined image including the first image and the second image that are concurrently displayed on the display.

According to various embodiments, the processor is configured to divide an original image of the subject, obtained using the camera, into a plurality of images including the first image and the second image.

According to various embodiments, the processor is configured to divide the first image into a plurality of images including the second image.

According to various embodiments, the processor is configured to divide the first image, in which the second image has a second playback time that is different from a first playback time of the first image.

According to various embodiments, the processor is configured to divide a playback section of the first image into a plurality of playback sections to generate a plurality of images corresponding to the plurality of divided playback sections.

According to various embodiments, the processor is configured to divide a part of the subject included in the first image to generate the second image corresponding to the divided part.

According to various embodiments, the processor is configured to divide a first part of the subject in an original image of the subject, obtained using the camera, as the first image and a second part of the subject as the second image.

According to various embodiments, the processor is configured to divide the subject included in the first image into a plurality of parts to generate a plurality of images corresponding to the plurality of divided parts.

According to various embodiments, the processor is configured to remove one of the at least one image in response to a user input.

According to various embodiments, the processor is configured to replace the first image or the second image with at least a part of another image in response to a user input.

According to various embodiments, the processor is configured to select at least one frame of the first image and to display the selected at least one frame on the second screen region.

According to various embodiments, the processor is configured to select at least one frame of the first image, to select at least a partial region of the selected at least one frame, and to display the selected at least a partial region on the second screen region.

According to various embodiments, the processor is configured to select at least one frame of the first image, to recognize a subject included in the selected at least one frame, and to display at least a partial region of the selected at least one frame including the recognized subject on the second screen region.

According to various embodiments, the processor is configured to select at least one frame of the first image, to apply a visual effect to the selected at least one frame, and to display at least one frame to which the visual effect is applied on the second screen region.

According to various embodiments, the processor is configured to obtain configuration information stored in the memory of the electronic device, and to generate and display the second image based on the first image.

According to various embodiments, the processor is configured to obtain configuration information stored in the memory of the electronic device, and to generate and display the second image based on the first image according to the configuration information, in which the configuration information may include at least one of playback time information of the second image, arrangement information of the second screen region, information about the visual effect, section/region information of the second image, and playback speed information of the second image.

According to various embodiments, the processor is configured to initiate capturing of the first image to be included in the combined image, upon reception of a photographing instruction from a user.

According to various embodiments, the processor is configured to terminate capturing of the first image to be included in the combined image, upon reception of a photographing termination instruction from the user or based on photographing-related time information stored in the memory of the electronic device.

According to various embodiments, the processor is configured to execute a camera application and to divide a live-view region of the camera application into a plurality of screen regions and display the plurality of screen regions.

According to various embodiments, the processor is configured to execute a camera application, to display a plurality of graphic elements indicating different arrangements of screen regions on the display, and to divide a live-view region of the camera application into a plurality of screen regions and display the plurality of screen regions, in response to a user input with respect to one of the plurality of graphic elements.

According to various embodiments, the processor is configured to receive the second image from an external electronic device.

According to various embodiments, the processor is configured to receive the second image from an external electronic device, in which the second image is a real-time image captured using a camera of the external electronic device.

According to various embodiments, the processor is configured to obtain the second image stored in the memory of the electronic device.

According to various embodiments, the processor is configured to separately display the first screen region and the second screen region in response to a first user input and to display the second image on the second screen region in response to a second user input.

According to various embodiments, the processor is configured to execute the camera application, to separately display the first screen region and the second screen region on the live-view region of the camera application in response to the first user input, and to display the second image on the second screen region in response to the second user input.

According to various embodiments, the processor is configured to automatically generate the second image after termination of capturing of the first image.

According to various embodiments, the processor is configured to automatically generate the second image during capturing of the first image.

According to various embodiments, the processor is configured to display at least one graphic element indicating at least one of a playback section, a playback region, and a playback position of the second image on the display.

Figure 5:
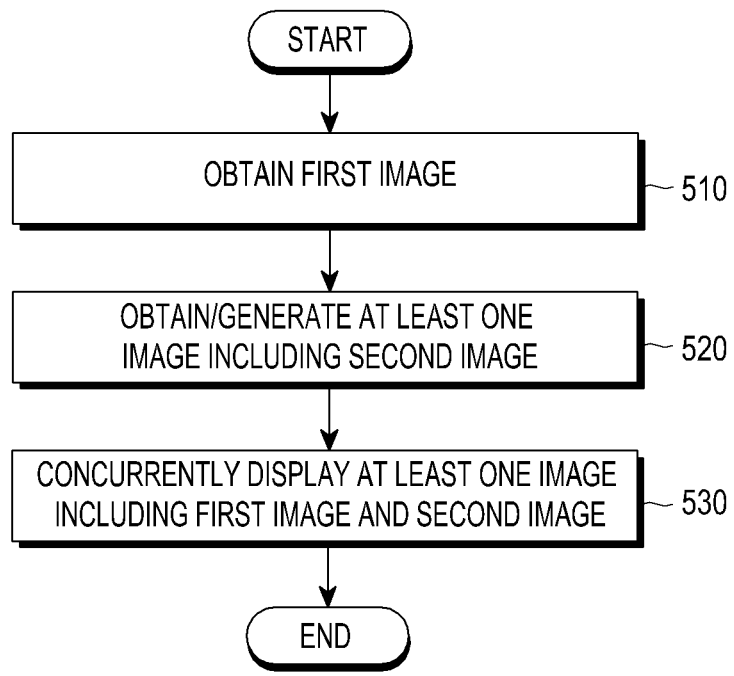
FIG. 5 is a flowchart illustrating a method for providing an image by an electronic device according to various embodiments.

FIG. 5 is a flowchart illustrating a method for providing an image by an electronic device according to various embodiments. The method may include operations 510 through 530. The method may be performed by at least one of the electronic device (e.g., the electronic device 101, 201, or 401), a processor of the electronic device (e.g., the processor 120 or 210), and a controller of the electronic device (e.g., the controller 410).

In operation 510, the electronic device obtains a first image.

In an embodiment, the electronic device may obtain an original image or the first image of a subject by using a camera (e.g., the camera module 291 or the camera 490) functionally connected with the electronic device.

In an embodiment, during capturing of the original image or the first image, the electronic device may display in real time the first image on a display (e.g., the display 160, 260, or 460) functionally connected with the electronic device or a first region (or a first screen region or a first window) on the display.

In an embodiment, capturing of the original image or the first image may be automatically initiated upon reception of a photographing instruction from a user or based on configuration information stored in a memory functionally connected with the electronic device (e.g., the memory 130, 230, or 430).

In an embodiment, termination of capturing of the original image or the first image may be automatically performed upon reception of a photographing termination instruction from the user or based on the configuration information stored in the memory. For example, the electronic device may receive the photographing instruction and/or the photographing termination instruction through an input device (e.g., the input device 250, the display 160, 260, or 460, the microphone 288, or the sensor module 240).

In an embodiment, the electronic device may generate or obtain the first image based on the original image obtained using the camera. For example, the electronic device may generate or obtain the first image from the original image. For example, the electronic device may generate or obtain the first image by using at least a part (or at least some image frames or at least a part of each image frame) of the original image.

In an embodiment, the electronic device may receive the original image or the first image from an external electronic device (e.g., the electronic device 102 or 104, the server 106, or the like) through the communication module (e.g., the communication interface 170 or the communication module 220) functionally connected with the electronic device.

In operation 520, the electronic device obtains or generates at least one image including a second image to be associated with the first image.

In an embodiment, the electronic device may obtain at least one image including the second image of the subject or another subject by using the camera (e.g., the camera module 291 or the camera 490).

In an embodiment, during capturing of the at least one image including the second image, the electronic device may display in real time the at least one image including the second image on the display functionally connected with the electronic device or a second region (or a second screen region or a second window) on the display.

In an embodiment, capturing of the at least one image including the second image may be initiated upon reception of a photographing instruction from a user, or may be automatically initiated based on configuration information stored in the memory (e.g., the memory 130, 230, or 430).

In an embodiment, termination of capturing of the at least one image including the second image may be initiated upon reception of a photographing termination instruction from the user, or may be automatically performed based on the configuration information stored in the memory.

In an embodiment, the electronic device may generate at least one image including a second image having a part corresponding to at least a part of the first image.

In an embodiment, the electronic device may generate at least one image including a second image based on the original image or the first image. For example, the electronic device may generate or obtain the second image by using at least a part (or at least some image frames of the original image or the first image or at least a part of each image frame) of the original image or the first image.

In an embodiment, the electronic device may generate at least one image including a second image based on a captured part of the first image during/after capturing of the original image or the first image.

In an embodiment, the electronic device may automatically generate at least one image including a second image to be included in a combined image based on the original image or the first image, according to the configuration information stored in the memory.

In an embodiment, a second playback time (or a second playback speed) of the second image may be different from a first playback time (or a second playback speed) of the first image. For example, the electronic device may divide (or extract) the second image from the original image or the first image and may cause the second image to have the second playback time (or the second playback speed) that is different from the first playback time (or the first playback speed) of the first image.

In an embodiment, the electronic device may divide (or extract) a plurality of images including the first image and the second image from the original image.

In an embodiment, the electronic device may divide (or extract) a plurality of images including the second image from the first image. For example, the electronic device may divide a playback section of the original image or the first image into a plurality of playback sections to generate a plurality of images corresponding to the plurality of playback sections, respectively. Each playback section may include a plurality of image frames among all image frames of the original image or the first image. For example, among all N image frames of the first image, the electronic device may divide (or extract) first through $(N/3)^{th}$ image frames as a second image, $(N/3+1)^{th}$ through $(2N/3)^{th}$ image frames as a third image, and $(2N/3+1)^{th}$ through $N^{th}$ image frames as a fourth image.

In an embodiment, the second image may correspond to a part (or a region) of a subject (or each image frame) included in the first image.

In an embodiment, the electronic device may divide (or extract) a part of the subject (or each image frame) included in the original image or the first image to generate a second image corresponding to the divided part.

In an embodiment, the electronic device may divide (or extract) a first part of the subject (or each image frame) in the original image as the first image and a second part of the subject (or each image frame) as the second image.

In an embodiment, the electronic device may divide the subject (or each image frame) included in the original image or the first image into a plurality of parts to generate a plurality of images corresponding to the plurality of divided parts. For example, the electronic device may divide each image frame of the original image into four parts to divide (or extract) a first quadrant as a first image, a second quadrant as a second image, a third quadrant as a third image, and a fourth quadrant as a fourth image. For example, the electronic device may recognize first through fourth users (or user faces) in each image frame of the original image and divide (or extract) a first part of each image frame, including the first user, as a first image, a second part of each image frame, including the second user, as a second image, a third part of each image frame, including the third user, as a third image, and a fourth part of each image frame, including the fourth user, as a fourth image.

In operation 530, the electronic device concurrently displays the first image and at least one image including the second image on the display.

In an embodiment, the electronic device may concurrently display the first image on a first region of the display and the second image on a second region of the display.

In an embodiment, the electronic device (e.g., the image combiner 414) may automatically and concurrently display the first image on the first region of the display and the second image on the second region of the display, based on the configuration information stored in the memory.

In an embodiment, the electronic device may execute the camera application automatically or in response to a user input. The electronic device may divide a live-view region of the camera application into a plurality of regions (or screen regions or windows) and display them in response to a user input or based on the configuration information.

In an embodiment, the electronic device may execute the camera application automatically or in response to a user input. The electronic device may display a plurality of graphic elements indicating different arrangements of the plurality of regions (or screen regions or windows) on the display. The electronic device may divide the live-view region of the camera application into a plurality of regions (or screen regions or windows) and display them in response to a user input with respect to one of the plurality of graphic elements.

In an embodiment, the electronic device (e.g., the image combiner 414) displays the first image on a first region among the plurality of regions of the live-view region and the second image on a second region among the plurality of regions of the live-view region.

In an embodiment, the first image and at least one image including the second image may be played at different speeds (or frame rates) during the same time.

In an embodiment, the electronic device may remove one of the first image and the at least one image including the second image, in response to a user input.

In an embodiment, the electronic device may replace one of the first image and the at least one image including the second image with at least a part of another image, in response to a user input.

In an embodiment, the electronic device may store or share a combined image including the first image and the second image that are concurrently displayed on the display, in response to a user input or based on configuration information stored in the memory.

In an embodiment, the electronic device may store the combined image in the memory or transmit the same to the external electronic device, in response to the user input.

In an embodiment, the combined image may include audio information included in at least one of the first image and the at least one image including the second image.

In an embodiment, the electronic device may include the audio information corresponding to user's selection in the combined image.

In an embodiment, the electronic device may replace the audio information of the combined image with audio information corresponding to user's selection during playback of the combined image.

Figure 6:
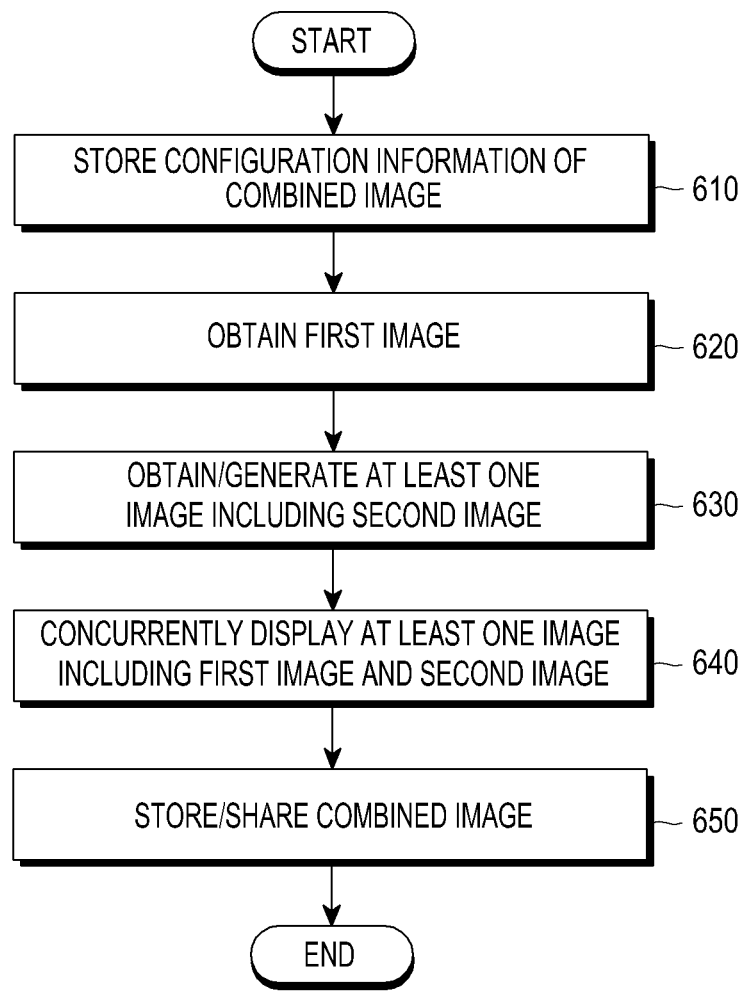
FIG. 6 is a flowchart illustrating a method for providing an image by an electronic device according to various embodiments.

FIG. 6 is a flowchart illustrating a method for providing an image by an electronic device according to various embodiments. The method may include operations 610 through 650. The method may be performed by at least one of the electronic device (e.g., the electronic device 101, 201, or 401), a processor of the electronic device (e.g., the processor 120 or 210), and a controller of the electronic device (e.g., the controller 410).

In operation 610, the electronic device stores configuration information about the combined image in the memory (e.g., the memory 130, 230, or 430) functionally connected with the electronic device. For example, the electronic device may receive the configuration information about the combined image from a user through an input device (e.g., the input device 250, the display 160, 260, or 460, the microphone 288, or the sensor module 240). The configuration information may include at least one of playback/capturing/start/end time information, playback region arrangement information, information about a visual effect, interest section/region/part information, and playback speed (or frame rate) information for at least one of the first image, at least one image including the second image, and the combined image.

In operation 620, the electronic device obtains a first image.

In an embodiment, the electronic device may obtain an original image or the first image of a subject by using a camera (e.g., the camera module 291 or the camera 490) functionally connected with the electronic device.

In an embodiment, the electronic device may generate or obtain the first image from the original image, based on the configuration information.

In an embodiment, during capturing of the original image or the first image, the electronic device may display in real time the first image on a display (e.g., the display 160, 260, or 460) functionally connected with the electronic device or a first region (or a first screen region or a first window) on the display.

In an embodiment, capturing of the original image or the first image may be automatically initiated upon reception of a photographing instruction from a user or based on configuration information stored in a memory functionally connected with the electronic device (e.g., the memory 130, 230, or 430).

In an embodiment, termination of capturing of the original image or the first image may be automatically performed upon reception of a photographing termination instruction from the user or based on the configuration information stored in the memory. For example, the electronic device may receive the photographing instruction and/or the photographing termination instruction through an input device (e.g., the input device 250, the display 160, 260, or 460, the microphone 288, or the sensor module 240).

In an embodiment, the electronic device may receive the original image or the first image from an external electronic device (e.g., the electronic device 102 or 104, the server 106, or the like) through the communication module (e.g., the communication interface 170 or the communication module 220) functionally connected with the electronic device.

In an embodiment, the electronic device may apply a visual effect to the first image based on a user input or the configuration information.

In operation 630, the electronic device obtains or generates at least one image including a second image to be associated with the first image.

In an embodiment, the electronic device may obtain at least one image including the second image of the subject or another subject by using the camera (e.g., the camera module 291 or the camera 490).

In an embodiment, during capturing of the at least one image including the second image, the electronic device (e.g., the image combiner 414) may display in real time the at least one image including the second image on the display functionally connected with the electronic device or a second region (or a second screen region or a second window) on the display.

In an embodiment, capturing of the at least one image including the second image may be initiated upon reception of a photographing instruction from a user, or may be automatically initiated based on configuration information stored in the memory (e.g., the memory 130, 230, or 430).

In an embodiment, termination of capturing of the at least one image including the second image may be initiated upon reception of a photographing termination instruction from the user, or may be automatically performed based on the configuration information stored in the memory.

In an embodiment, the electronic device may generate at least one image including a second image having a part corresponding (or being identical) to at least a part of the first image.

In an embodiment, the electronic device may generate at least one image including a second image based on the original image or the first image.

In an embodiment, the electronic device may generate at least one image including a second image based on a captured part of the first image during/after capturing of the original image or the first image.

In an embodiment, the electronic device may automatically generate at least one image including a second image to be included in a combined image based on the original image or the first image, according to the configuration information stored in the memory.

In an embodiment, a second playback time (or a second playback speed) of the second image may be different from a first playback time (or a second playback speed) of the first image.

In an embodiment, the electronic device may divide (or extract) a plurality of images including the first image and the second image from the original image.

In an embodiment, the electronic device may divide (or extract) a plurality of images including the second image from the first image.

In an embodiment, the electronic device may select at least one frame of the original image or the first image based on a user input or the configuration information. The electronic device may generate the second image including the selected at least one frame.

In an embodiment, the second image may correspond to a part (or a region) of a subject (or each image frame) included in the first image.

In an embodiment, the electronic device may divide (or extract) a part of the subject (or each image frame) included in the original image or the first image to generate a second image corresponding to the divided part.

In an embodiment, the electronic device may divide (or extract) a first part of the subject (or each image frame) in the original image as the first image and a second part of the subject (or each image frame) as the second image.

In an embodiment, the electronic device may divide the subject (or each image frame) included in the original image or the first image into a plurality of parts to generate a plurality of images corresponding to the plurality of divided parts.

In an embodiment, the electronic device may select at least one frame of the original image or the first image based on a user input or the configuration information. The electronic device may select at least a partial region of the selected at least one frame. The electronic device may generate the second image including the selected at least a partial region.

In an embodiment, the electronic device may select at least one frame of the first image, based on a user input or the configuration information. The electronic device may recognize a subject included in the selected at least one frame, based on a user input or the configuration information. The electronic device may generate the second image including at least a partial region of the selected at least one frame including the recognized subject.

In an embodiment, the electronic device may receive the second image from an external electronic device (e.g., the electronic device 102 or 104 or the server 106) through the communication module. For example, the second image may be a live-view image captured using a camera of the external electronic device. For example, each of the first image and the second image may include the same subject.

In an embodiment, the electronic device may obtain the second image stored in the memory.

In an embodiment, the electronic device may apply a visual effect to the second image based on a user input or the configuration information.

In operation 640, the electronic device concurrently displays the first image and at least one image including the second image on the display.

In an embodiment, the electronic device may concurrently display the first image on a first region of the display and the second image on a second region of the display.

In an embodiment, the electronic device may automatically and concurrently display the first image on the first region of the display and the second image on the second region of the display, based on the configuration information stored in the memory.

In an embodiment, the electronic device may execute the camera application automatically or in response to a user input. The electronic device may divide a live-view region of the camera application into a plurality of regions (or screen regions or windows) and display them in response to a user input or based on the configuration information.

In an embodiment, the electronic device may execute the camera application automatically or in response to a user input. The electronic device may display a plurality of graphic elements indicating different arrangements of the plurality of regions (or screen regions or windows) on the display. The electronic device may divide the live-view region of the camera application into a plurality of regions (or screen regions or windows) and display them in response to a user input with respect to one of the plurality of graphic elements.

In an embodiment, the electronic device displays the first image on a first region among the plurality of regions of the live-view region and the second image on a second region among the plurality of regions of the live-view region.

In an embodiment, the electronic device may separately display the first region and the second region in response to a first user input. The electronic device may display the second image on the second region in response to a second user input.

In an embodiment, at least one image including the second image may be generated after termination of capturing of the first image or during capturing of the first image.

In an embodiment, the electronic device may display at least one graphic element indicating at least one of a playback section, an interest/playback region, and a playback position of the second image on the display.

In an embodiment, the first image may be an image captured using a first camera module (or a rear camera module) and the second image may be an image captured using a second camera module (or a front camera module).

In an embodiment, the first image and the at least one image including the second image may be played at different speeds (or frame rates) during the same time.

In an embodiment, the electronic device may remove one of the first image and the at least one image including the second image, in response to a user input.

In an embodiment, the electronic device may replace one of the first image and the at least one image including the second image with at least a part of another image, in response to a user input.

In operation 650, the electronic device stores or shares a combined image including the first image and the at least one image including the second image that are concurrently displayed on the display, in response to a user input or based on the configuration information.

For example, each of the first image, the at least one image including the second image, and/or the combined image may be a moving image file(s) having image information (and audio information) such as a picture, a drawing, etc.

In an embodiment, the electronic device may store the generated combined image in the memory or transmit the same to the external electronic device, in response to the user input.

In an embodiment, the combined image may include audio information included in at least one of the first image and the at least one image including the second image.

In an embodiment, the electronic device may include the audio information corresponding to user's selection in the combined image.

In an embodiment, the electronic device may replace the audio information of the combined image with audio information corresponding to user's selection during playback of the combined image.

In an embodiment, the electronic device may apply a visual effect to at least one of the original image, the first image, the at least one image including the second image, and the combined image, based on a user input or the configuration information. The visual effect may be applied to at least one of the original image, the first image, the at least one image including the second image, and the combined image, equally or differently for each image.

According to various embodiments, a method for providing, in an electronic device, an image includes obtaining an image of a subject by using a camera functionally connected with the electronic device, generating at least one sub image corresponding to a part of the subject based on the image, and concurrently displaying the image on a first region of a display functionally connected with the electronic device and the at least one sub image on a second region of the display.

According to various embodiments, a method for providing, in an electronic device, an image includes obtaining a first image by using a camera functionally connected with the electronic device, generating a second image by using the first image, combining the first image with the second image to thereby generate a third image, the first image being provided on a first region of the third image and the second image being provided on a second region of the third image, and displaying the third image on a display functionally connected with the electronic device.

According to various embodiments, a method for providing, in an electronic device, an image includes obtaining a first image by using a camera functionally connected with the electronic device, obtaining at least one image including a second image to be associated with the first image, and concurrently displaying the first image on a first region of a display functionally connected with the electronic device and the second image on a second region of the display.

According to various embodiments, a method for providing, in an electronic device, an image includes obtaining a first image, obtaining at least one image including a second image to be associated with the first image, and concurrently displaying the first image on a first region of a display functionally connected with the electronic device and a second region of the display.

According to various embodiments, a method for providing, in an electronic device, an image includes capturing a first image, generating at least one image including a second image based on a captured part of the first image during/after capturing of the first image, and concurrently displaying the first image on a first region of a display functionally connected with the electronic device and the second image on a second region of the display.

According to various embodiments, a method for providing, in an electronic device, an image includes storing configuration information about a combined image, obtaining a first image by using a camera functionally connected with the electronic device, obtaining at least one image including a second image to be associated with the first image based on the configuration information by using the camera, and concurrently displaying the first image on a first region of a display functionally connected with the electronic device and the second image on a second region of the display.

According to various embodiments, a method for providing, in an electronic device, an image includes storing configuration information about a combined image, obtaining a first image by using a camera functionally connected with the electronic device, obtaining at least one image including a second image to be associated with the first image based on the configuration information by using the camera, and generating a combined image including the first image and the second image.

According to various embodiments, a method for providing, in an electronic device, an image includes displaying a first image on a first screen region of a display functionally connected with the electronic device, displaying a second image to be associated with the first image on a second screen region of the display, and storing a combined image including the first image and the second image that are concurrently displayed on the display.

According to various embodiments, the second image may be generated based on the first image.

According to various embodiments, the first image and the second image may be generated based on the original image.

According to various embodiments, the second image may have a part corresponding to at least a part of the first image.

According to various embodiments, a second playback time of the second image may be different from a first playback time of the first image.

According to various embodiments, the generation of the at least one image may include dividing the original image of the subject, obtained using the camera, into a plurality of images including the first image and the second image.

According to various embodiments, the generation of the at least one image may include dividing the first image into a plurality of images including the second image.

According to various embodiments, the generation of the at least one image may include dividing the first image, in which the second image has a second playback time that is different from a first playback time of the first image.

According to various embodiments, the generation of the at least one image may include dividing a playback section of the first image into a plurality of playback sections to generate a plurality of images corresponding to the plurality of divided playback sections.

According to various embodiments, the second image may correspond to a part of the subject included in the first image.

According to various embodiments, the generation of the at least one image may include dividing a part of the subject included in the first image to generate the second image corresponding to the divided part.

According to various embodiments, the generation of the at least one image may include dividing a first part of the subject in an original image of the subject, obtained using the camera, as the first image and a second part of the subject as the second image.

According to various embodiments, the generation of the at least one image may include dividing the subject included in the first image into a plurality of parts to generate a plurality of images corresponding to the plurality of divided parts.

According to various embodiments, the first image and the second image may be played during the same time.

According to various embodiments, the method may further include removing one of the at least one image in response to a user input.

According to various embodiments, the method may further include replacing the first image or the second image with at least a part of another image in response to a user input.

According to various embodiments, the first image may be a live-view image captured using the camera functionally connected with the electronic device.

According to various embodiments, the second image may include at least some frames of the first image.

According to various embodiments, the second image may include at least some frames of the first image, and a playback speed of the second image may be different from a playback speed of the first image.

According to various embodiments, the displaying of the second image may include selecting at least one frame of the first image and displaying the selected at least one frame on the second screen region.

According to various embodiments, the second image may include at least a partial region of the first image.

According to various embodiments, the displaying of the second image may include selecting at least one frame of the first image, selecting at least a partial region of the selected at least one frame, and displaying the selected at least a partial region on the second screen region.

According to various embodiments, displaying of the second image may include selecting at least one frame of the first image, recognizing a subject included in the selected at least one frame, and displaying at least a partial region of the selected at least one frame including the recognized subject on the second screen region.

According to various embodiments, the displaying of the second image may include selecting at least one frame of the first image, applying a visual effect to the selected at least one frame, and displaying at least one frame to which the visual effect is applied on the second screen region.

According to various embodiments, the displaying of the second image may include obtaining configuration information stored in the memory of the electronic device, and generating and displaying the second image based on the first image.

According to various embodiments, the displaying of the second image may include obtaining configuration information stored in the memory of the electronic device, and generating and displaying the second image based on the first image according to the configuration information, in which the configuration information may include at least one of playback time information of the second image, arrangement information of the second screen region, information about the visual effect, section/region information of the second image, and play speed information of the second image.

According to various embodiments, capturing of the first image to be included in the combined image may be initiated upon reception of a photographing instruction from the user.

According to various embodiments, termination of capturing of the first image to be included in the combined image may be performed upon reception of a photographing termination instruction from the user or based on photographing-related time information stored in the memory.

According to various embodiments, the method may further include executing a camera application, and dividing a live-view region of the camera application into a plurality of screen regions and displaying the plurality of screen regions.

According to various embodiments, the method may further include executing a camera application, displaying a plurality of graphic elements indicating different arrangements of screen regions on the display, and dividing a live-view region of the camera application into a plurality of screen regions and displaying the plurality of screen regions, in response to a user input with respect to one of the plurality of graphic elements.

According to various embodiments, the method may further include receiving the second image from an external electronic device.

According to various embodiments, the method may further include receiving the second image from an external electronic device, in which the second image is a real-time image captured using a camera of the external electronic device.

According to various embodiments, the method may further include obtaining the second image stored in the memory of the electronic device.

According to various embodiments, the method may further include separately displaying the first screen region and the second screen region in response to a first user input and displaying the second image on the second screen region in response to a second user input.

According to various embodiments, the method may further include executing the camera application, separately displaying the first screen region and the second screen region on the live-view region of the camera application in response to the first user input, and displaying the second image on the second screen region in response to the second user input.

According to various embodiments, the second image may be automatically generated after termination of capturing of the first image.

According to various embodiments, the second image may be automatically generated during capturing of the first image.

According to various embodiments, the method may further include displaying at least one graphic element indicating at least one of a playback section, a playback region, and a play position of the second image on the display.

According to various embodiments, the first image may be an image captured using a first camera module and the second image may be an image captured using a second camera module.

According to various embodiments, the first image may be an image captured using a rear camera module of the electronic device and the second image may be an image captured using a front camera module of the electronic device.

According to various embodiments, the first image and the second image may be sequentially arranged in the combined image.

FIGS. 7A through 7D are views for describing a method for providing an image by an electronic device according to various embodiments.

Figure 7A:
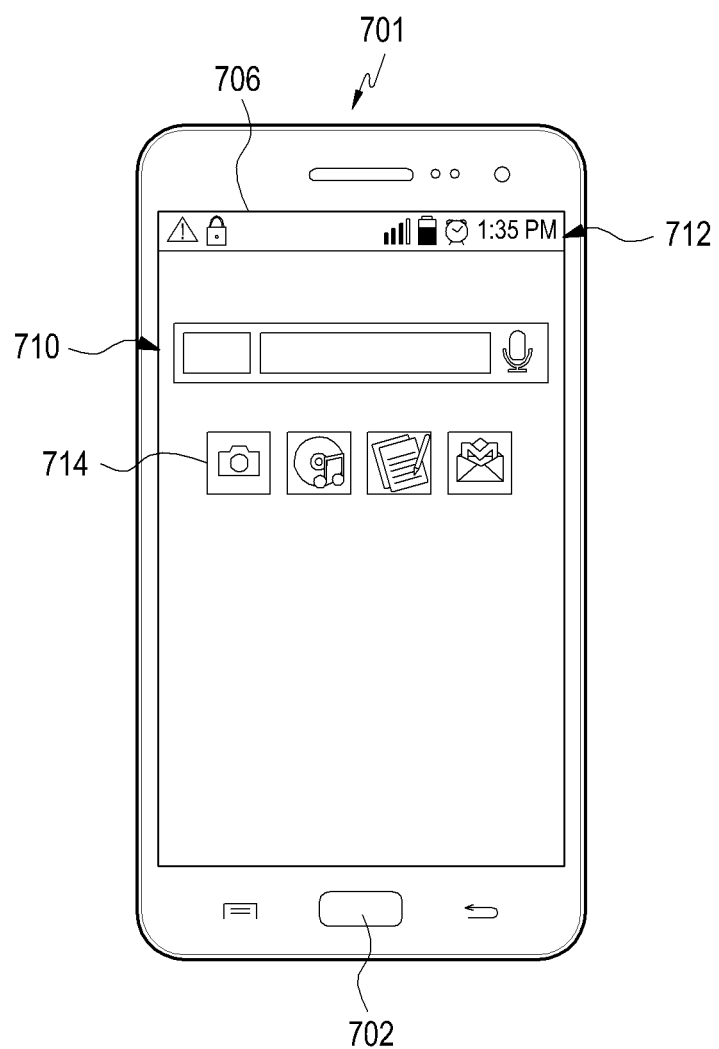
FIGS. 7A through 7D are views for describing a method for providing an image by an electronic device according to various embodiments.

Referring to FIG. 7A, a memory (e.g., the memory 130, 230, or 430) functionally connected with an electronic device 701 (e.g., the electronic device 101, 201, or 401) stores a camera application, a voice recognition application, etc. The electronic device 701 displays a screen 710 (e.g., a home screen) including executable icons mapped to applications such as a camera application, a voice recognition application, etc., on a display 706 (e.g., the display 160, 260, or 460) functionally connected with the electronic device 701.

The electronic device 701 displays a status bar 712 on the screen 710.

The status bar 712 is displayed on an upper portion of the display 706 and may include at least one of an indicator indicating a charging state of a battery, an indicator indicating a strength of a received signal, an indicator indicating a current time, and so forth.

In an embodiment, the electronic device 701 detects an input that needs execution of the camera application through an input device (e.g., the input device 250, the display 160, 260, or 460, the microphone 288, or the sensor module 240) functionally connected with the electronic device 701. The input may be one of various forms of information being input to the electronic device 701, such as a gesture, voice, a biometric signal, etc., of the user. For example, the electronic device 701 may detect a user input (or selection) with respect to a camera icon 714. The electronic device 701 executes the camera application in response to the user input.

In an embodiment, the electronic device 701 may detect a user input with respect to a button or key included in the input device on a screen such as an application screen, a lock screen, a home screen, etc. The electronic device 701 executes the camera application in response to the user input. For example, at least one button may be formed on a front surface, a side surface, or a rear surface of the electronic device 701, and may include at least one of a power button, a volume button (e.g., a volume-up button and a volume-down button), a menu button, a home button/key 702, a back button, a search button, and a multi-task button. For example, the electronic device 701 may detect a user input (or selection) (e.g., double clicks, a long click/press, etc.) with respect to the home button (or home key) 702.

Before the user input, the electronic device performs initialization for operating the camera (e.g., the camera module 291 or the camera 490) functionally connected with the electronic device 701 in a normal mode. Upon completion of the initialization, the electronic device 701 operates the camera system in a sleep mode. The electronic device 701 switches the camera system from the sleep mode to the normal mode in response to the user input.

Figure 7B:
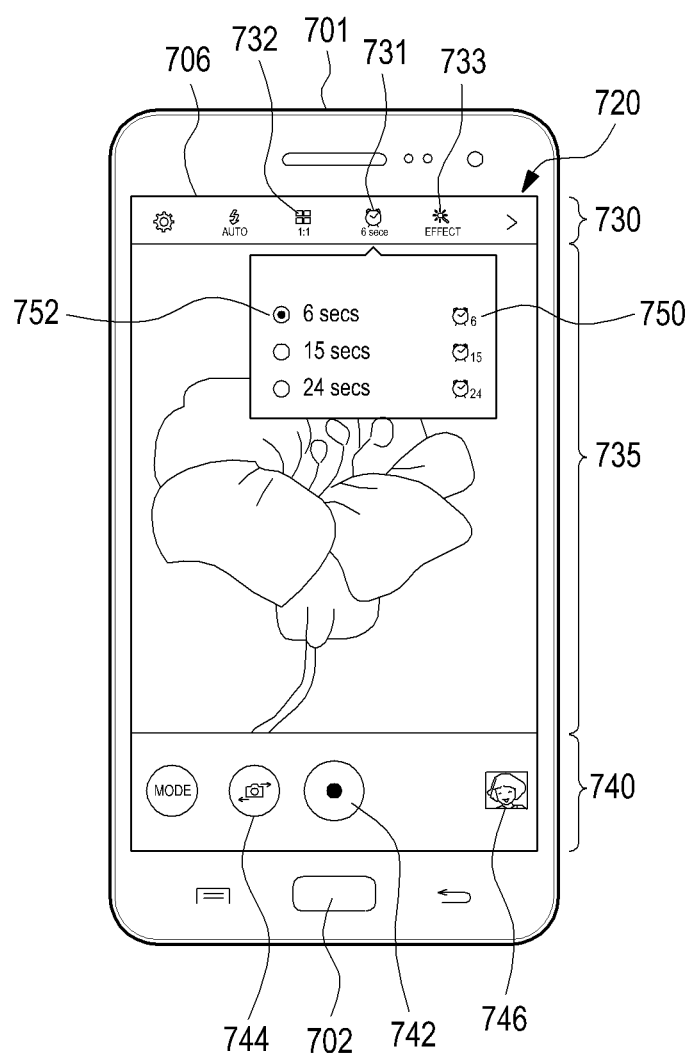

Referring to FIG. 7B, as the camera application is executed, a camera application screen 720 (or a camera application window) is displayed on the display 706. The camera application screen 720 may include, for example, a first menu bar 730, a live-view region 735, and a second menu bar 740.

The first menu bar 730 may include an environment setting item for setting an operation condition, a photographing condition, etc., of the camera application, a time setting item 731 for inputting configuration information for the combined image, an arrangement setting item 732 (or a window/region setting item), and an effect setting item 733.

The second menu bar 740 may include a photograph (or capture)/stop button 742, a switch button 744 for switch between the first camera module 491 (or the rear surface/rear camera module) and the second camera module 492 (or the front surface/front camera module), and a switch image region 746 for displaying a live preview image obtained by the camera module to be switched.

The first menu bar 730 and the second menu bar 740 may be displayed as, but not limited to, one menu bar.

For example, a live-view image, a captured image, etc., may be displayed on a live-view region 735.

For example, the electronic device 701 may control the camera to output a live preview image having a lower resolution (or less pixels) and/or a smaller size than the captured image as the camera application is executed. The live preview image may not be permanently stored in the memory, and may be automatically removed after temporarily stored for displaying on the display 706.

In an embodiment, the electronic device 701 may detect a user input (or selection) with respect to the photographing button 702. The electronic device 701 controls the camera system to output an image (e.g., a still image, a moving image, etc.) having a higher resolution (or more pixels) and/or a greater size than the live preview image in response to the user input. The electronic device 701 stores the image (e.g., a still image, a moving image, etc.) (or an image captured in response to the user input) having a higher resolution (or more pixels) and/or a greater size than the live preview image in the memory or also displays the image on the display 706. The image captured in response to the user input is permanently stored in the memory and is then removed in response to the user input.

In an embodiment, the electronic device 701 may detect a user input (or selection) with respect to the time setting item 731. For example, the electronic device 701 may display a first menu window 750 for inputting/setting playback or photographing time information with respect to at least one of the original image, the first image, the at least one image including the second image, and the combined image, in response to the user input. For example, the first menu window 750 may include at least one graphic element 752 for inputting/setting playback/photographing time information for the original image or the first image. The electronic device 701 may detect a user input (or selection) with respect to at least one of the at least one graphic elements 752. The electronic device 701 stores time information corresponding to the selected graphic element 752 as one of configuration information for the combined image in the memory in response to the user input.

In an embodiment, the electronic device 701 may include at least one graphic element for inputting/setting at least one of a photographing start time and a photographing end time for the original image, the first image, or the at least one image including the second image.

Figure 7C:
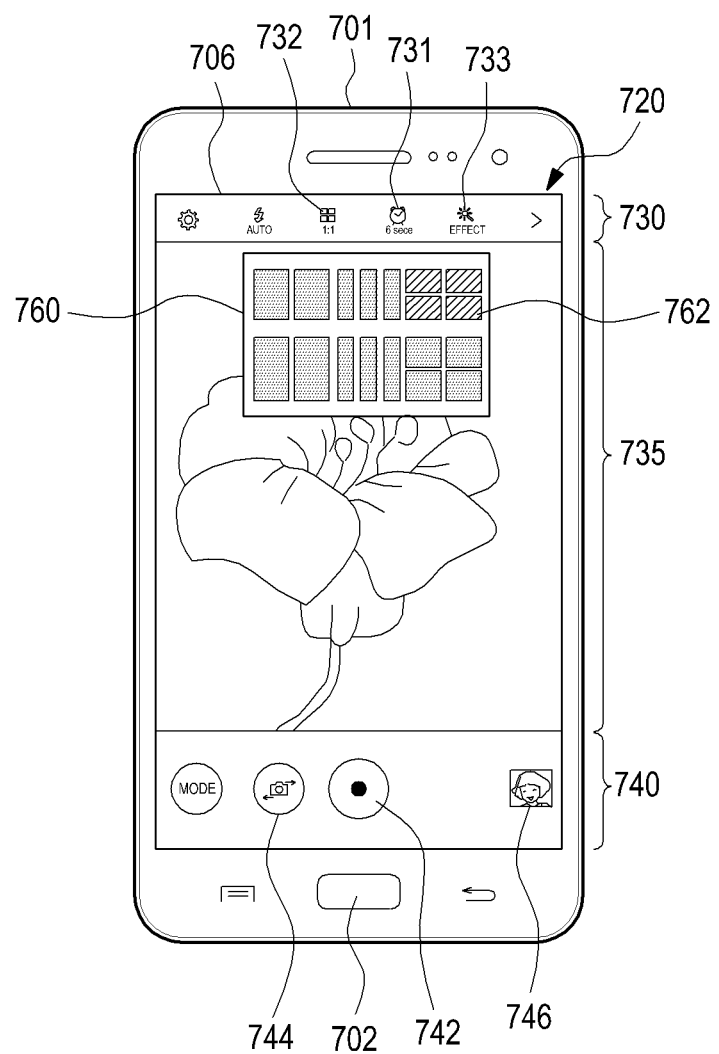

Referring to FIG. 7C, the electronic device 701 may detect a user input (or selection) with respect to the arrangement setting item 732. For example, the electronic device 701 may display a second menu window 760 for inputting/setting display region (or window) arrangement information for the combined image on the display 706 in response to the user input. The display region (window) arrangement information may include at least one of information about arrangement of regions (or screen regions) where the original image, the first image, and/or the at least one image including the second image are to be displayed, information about shape/size/area of each region, and so forth. For example, the second menu window 760 may include at least one graphic element 762 (e.g., 2×2 arrangement, 3×3 arrangement, 1×2 arrangement, 1×3 arrangement, etc.) for inputting/setting the display region (or window) arrangement information for the combined image. The electronic device 701 may detect a user input (or selection) with respect to at least one of the at least one graphic elements 762. The electronic device 701 stores the display region (or window) arrangement information corresponding to the selected graphic element 762 as one of configuration information for the combined image in the memory in response to the user input.

Figure 7D:
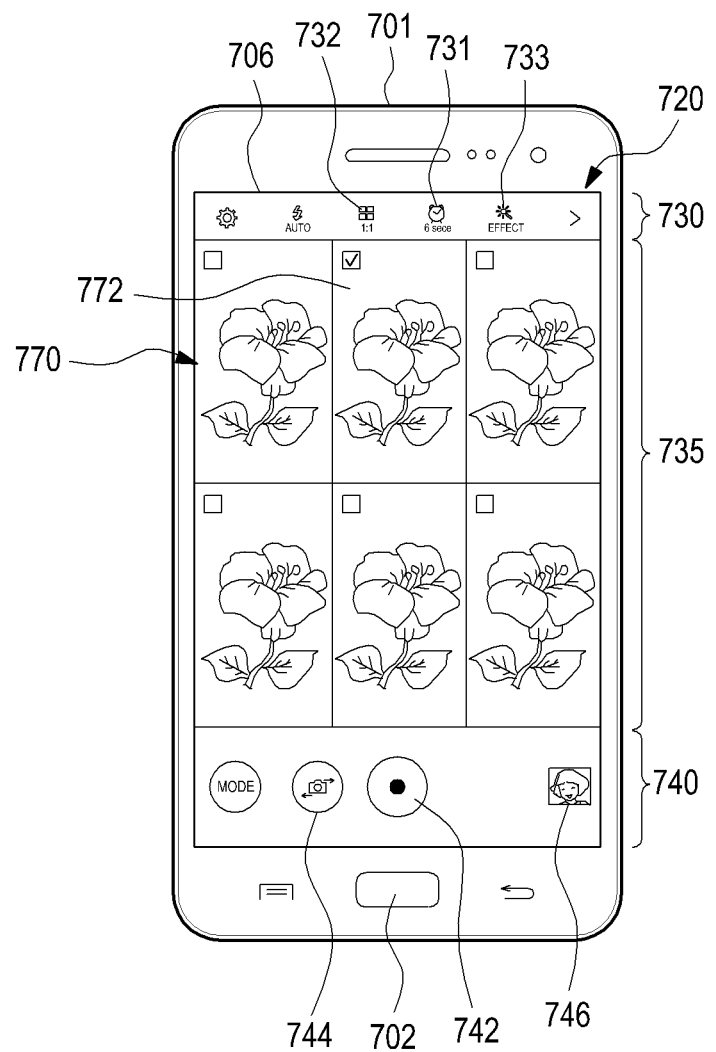

Referring to FIG. 7D, the electronic device 701 may detect a user input (or selection) with respect to the effect setting item 733. For example, the electronic device 701 may display a third menu window 770 for inputting/setting information about a visual effect to be applied to at least one of the original image, the first image, and the at least one image including the second image on the display 706 in response to the user input. For example, the third menu window 770 may include at least one graphic element 772 for inputting/setting information about a visual effect to be applied to at least one of the first image and the at least one image including the second image (e.g., a graphic element indicating at least one of the pastel effect, the vignette effect, the warm effect, the vintage/retro effect, the monogram effect, the vivid effect, and the grayscale effect). The electronic device 701 may detect a user input (or selection) with respect to at least one of the at least one graphic elements 772. The electronic device 701 stores the visual effect setting information corresponding to the selected graphic element 772 as one of configuration information for the combined image in the memory in response to the user input.

In an embodiment, the electronic device may configure or store information about a visual effect to be applied to at least one of the original image, the first image, and the at least one image including the second image before/after or during capturing of the original image, the first image, or the at least one image including the second image.

In an embodiment, the electronic device may apply a visual effect to at least one of the original image, the first image, the at least one image including the second image, and the combined image, based on a user input or the configuration information. The visual effect may be applied to at least one of the original image, the first image, the at least one image including the second image, and the combined image, equally or differently for each image.

Figure 8A:
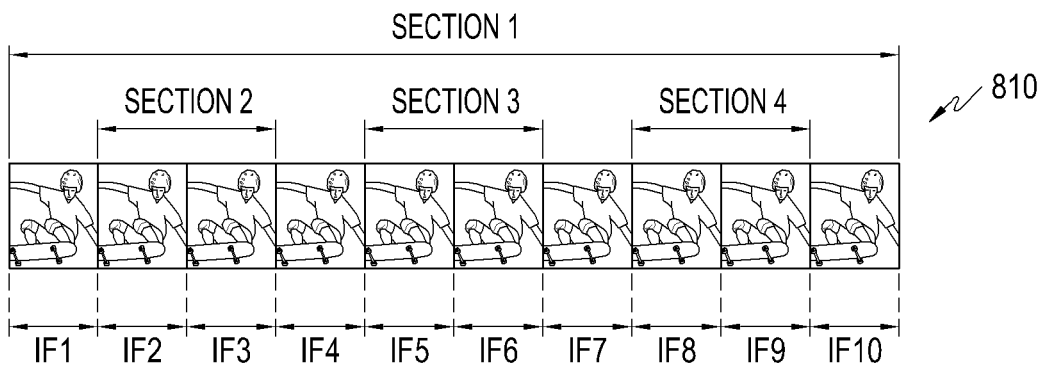
FIGS. 8A through 8C are views for describing a method for providing an image by an electronic device according to various embodiments.
Figure 8B:
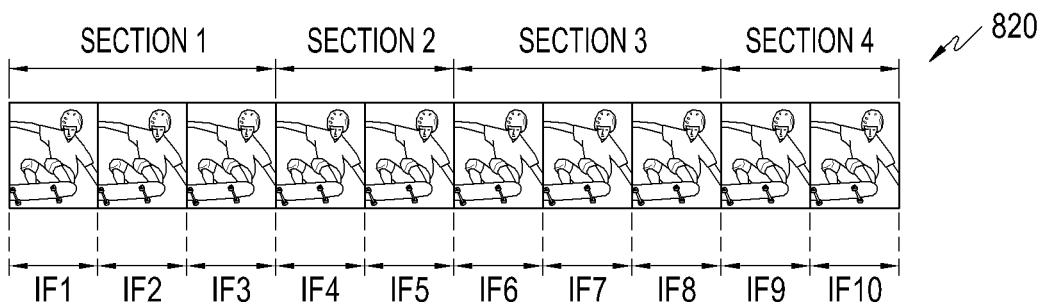
Figure 8C:
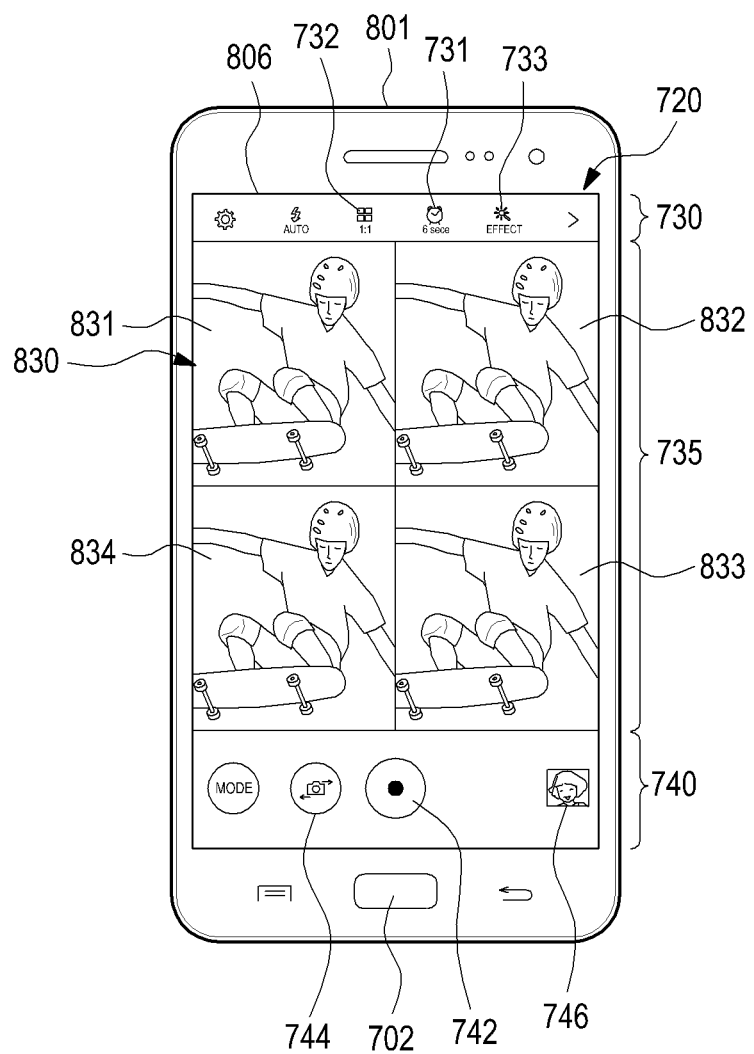

FIGS. 8A through 8C are views for describing a method for providing an image by an electronic device according to various embodiments.

Referring to FIG. 8A, an electronic device 801 (e.g., the electronic device 101, 201, or 401) obtains an original image

810 of a subject by using a camera (e.g., the camera module 291 or the camera 490) functionally connected with the electronic device 801, upon reception of a photographing instruction from a user or based on configuration information about a combined image stored in a memory (e.g., the memory 130, 230, or 430) functionally connected with the electronic device 801. For example, the original image 810 may include ten image frames IF1 through IF10.

In an embodiment, the configuration information about the combined image may include fixed time period (or frame count) information and fixed time interval (or interval expressed with a frame count) information about a plurality of images including the second image. For example, the electronic device 801 may divide (or extract) second through fourth playback/photographing sections having the fixed time period (or frame count) by the fixed time interval (or interval expressed with the frame count) from a first playback/photographing section (e.g., the entire playback/photographing duration), based on the configuration information, thereby generating second through fourth images corresponding to the second through fourth playback/photographing sections. The first image may include first through tenth image frames IF1 through IF10, the second image may include second and third image frames IF2 and IF3, the third image may include the fifth and sixth image frames IF5 and IF6, and the fourth image may include the eighth and ninth image frames IF8 and IF9.

In an embodiment, at least some sections of the second through fourth playback/photographing sections may overlap each other.

In an embodiment, the electronic device 801 may display in real time the original image 810 on a display (e.g., the display 160, 260, or 460) functionally connected with the electronic device 801, during capturing of the original image 810.

Referring to FIG. 8B, the electronic device 801 obtains an original image 820 of a subject by using a camera (e.g., the camera module 291 or the camera 490), upon reception of a photographing instruction from a user or based on configuration information about a combined image stored in the memory. For example, the original image 820 may include ten image frames IF1 through IF10.

In an embodiment, the configuration information about the combined image may include variable time periods (or frame counts) and fixed/variable time intervals (or intervals expressed with the frame counts) for a plurality of images including the second image. For example, the electronic device 801 may divide (or extract) a first playback/photographing section having a first time period (or a first frame count), a second playback/photographing section having a second time period (or a second frame count), a third playback/photographing section having a third time period (or a third frame count), and a fourth playback/photographing section having a fourth time period (or a fourth frame count) from the entire playback/photographing duration, based on the configuration information, thereby generating first through fourth images corresponding to the first through fourth playback/photographing sections.

In an embodiment, at least some sections of the first through fourth playback/photographing sections may overlap each other.

In an embodiment, the electronic device 801 may sequentially obtain the first through fourth playback/photographing sections in response to at least one user input. For example, the electronic device 801 may obtain the first playback/photographing section by using the camera in response to a first photographing instruction and a first stop instruction.

The electronic device 801 may obtain the second playback/photographing section by using the camera in response to a second photographing instruction and/or a second stop instruction. The electronic device 801 may obtain the third playback/photographing section by using the camera in response to a third photographing instruction and/or a third stop instruction. The electronic device 801 may obtain the fourth playback/photographing section by using the camera in response to a fourth photographing instruction and/or based on photographing time end information included in the configuration information (or a fourth photographing end instruction).

In an embodiment, the electronic device 801 may display in real time the original image 820 on the display during capturing of the original image 810.

Referring to FIG. 8C, for example, the electronic device 801 may display the camera application screen 720 as shown in FIG. 7B on a display 806 (e.g., the display 160, 260, or 460) functionally connected with the electronic device 801. The electronic device 801 divides the live-view region 735 into first through fourth regions based on configuration information (e.g., display region arrangement information) about the combined image. For example, the electronic device 801 may display a first image 831 corresponding to a first playback section or the entire playback duration of an original image (e.g., the original image 810 or 820) on a first region, a second image 832 corresponding to a second playback section of the original image or the first image 831 on a second region, a third image 833 corresponding to a third playback section of the original image or the first image 831 on a third region, and a fourth image 834 corresponding to a fourth playback section of the original image or the first image 831 on a fourth region.

In an embodiment, the electronic device 801 may store or share a combined image 830 including the first image 831, the second image 832, the third image 833, and the fourth image 834 that are concurrently displayed on the display 806, in response to a user input or automatically.

In an embodiment, the electronic device 801 may sequentially play at least some of the first image 831, the second image 832, the third image 833, and the fourth image 834 during/after capturing of the original image 810 or 820 or the first image 831. For example, the electronic device 801 may sequentially play the second image 832, the third image 833, and the fourth image 834, while playing the first image 831.

In an embodiment, the electronic device 801 may concurrently play the first image 831, the second image 832, the third image 833, and the fourth image 834, in response to a user input or automatically, after capturing of the original image 810 or 820 or the first image 831. For example, playback times of the first image 831, the second image 832, the third image 833, and the fourth image 834 may be identical to each other. The electronic device 801 may concurrently start and end playback of the first image 831, the second image 832, the third image 833, and the fourth image 834.

In an embodiment, the playback times of the first image 831, the second image 832, the third image 833, and the fourth image 834 may not be identical to each other. For example, when the playback time of the original image 810 or 820 or the first image 831 is 1, the playback times of the second image 832, the third image 833, and the fourth image 834 may be $1/n1$, $1/n2$, and $1/n3$, respectively, in which n1, n2, and n3 are natural numbers. For example, the electronic device 801 may concurrently start playback of the first image 831, the second image 832, the third image 833, and the fourth image 834, and may end at least some of the first through fourth images 831 through 834 in different times.

For example, a playback speed (or a frame rate) of a $p^{th}$ image or a $q^{th}$ image may be calculated as below, in which p is a natural number and q is a natural number greater than 1.

Playback Speed of $p^{th}$ Image=Playback Speed of Original Image×Playback Time of $p^{th}$ Image/Playback Time of Original Image×1/n (n is a natural number), or Playback Speed of $q^{th}$ Image=Playback Speed of First Image×Playback Time of $q^{th}$ Image/Playback Time of First Image×1/n (n is a natural number).

FIGS. 9A through 9D are views for describing a method for providing an image by an electronic device according to various embodiments.

Figure 9A:
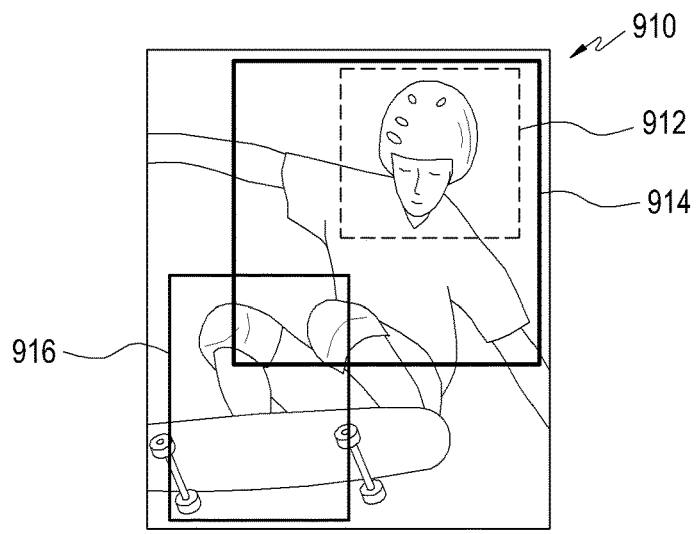
FIGS. 9A through 9D are views for describing a method for providing an image by an electronic device according to various embodiments.

Referring to FIG. 9A, an electronic device 901 (e.g., the electronic device 101, 201, or 401) obtains a first original image 910 of a subject by using a camera (e.g., the camera module 291 or the camera 490) functionally connected with the electronic device 901, upon reception of a photographing instruction from a user or based on configuration information about a combined image stored in a memory (e.g., the memory 130, 230, or 430) functionally connected with the electronic device 901.

In an embodiment, the configuration information about the combined image may include information about region (s)/part(s) of interest of the first original image 910. For example, the information about the region/part of interest may include at least one coordinate set by a user input and/or target data for automatic recognition. The at least one coordinate set by the user input may be fixed. The electronic device 901 may divide (or extract) regions/parts of interest from the entire region/part of the first original image 910 based on the configuration information, thus generating second through fourth images corresponding to the first through fourth regions/parts. The electronic device 901 may divide (or extract) a second region/part 912 corresponding to a facial part of the subject as a second image, a third region/part 914 corresponding to an upper body of the subject as a third image, and a fourth region/part 916 corresponding to a lower body of the subject as a fourth image from the entire region/part (corresponding to a first region/part) of the first original image 910, based on the configuration information. For example, an aspect ratio of each of the regions/parts of interest may be set identical and maintained constant. After the aspect ratio of each region/part of interest is initially set, an aspect ratio of at least some of the regions/parts of interest may be changed. For example, the size of a part/region or image corresponding to the regions/parts of interest may be increased or decreased while maintaining a set aspect ratio.

A position of the second region/part 912 corresponding to the facial part of the subject may be changed between images frames of the first original image 910. That is, the electronic device 901 may recognize/trace the facial part in each image frame of the first original image 910 and generate the recognized/traced facial part of each image frame as a corresponding image frame of the second image. For example, after an initial position of the second region/part 912 is set by the user input, the position of the second region/part 912 may be changed according to face tracing.

Figure 9B:
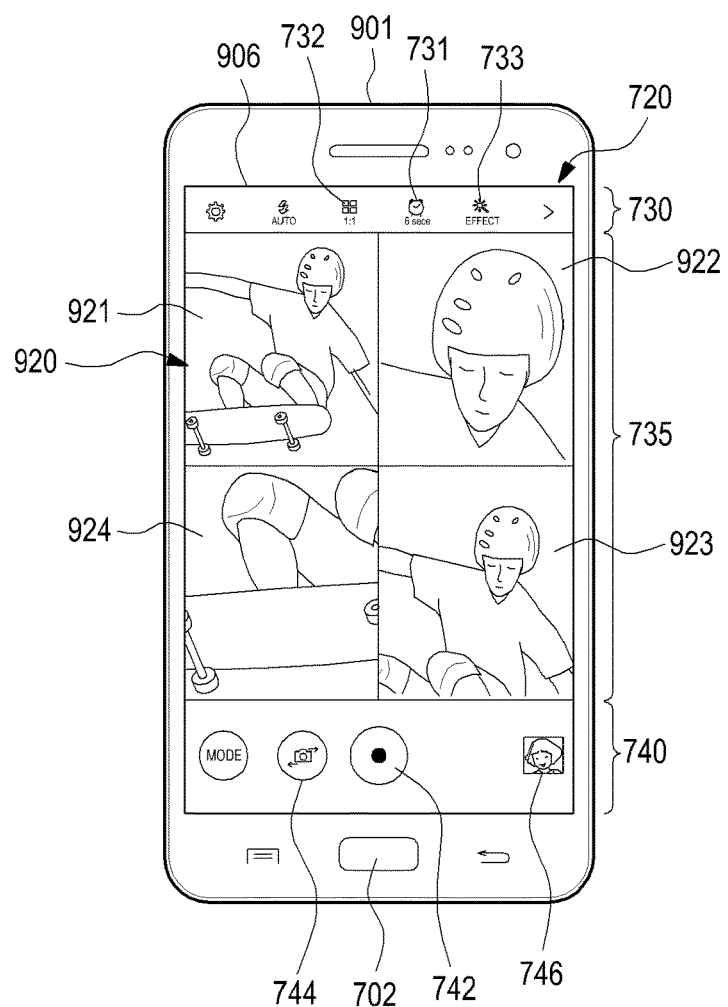

Referring to FIG. 9B, for example, the electronic device 901 may display the camera application screen 720 as shown in FIG. 7B on a display 906 (e.g., the display 160, 260, or 460) functionally connected with the electronic device 901. The electronic device 901 divides the live-view region 735 into first through fourth regions based on configuration information (e.g., display region arrangement information) about the combined image. For example, the electronic device 901 may display a first image 921 (e.g., the first original image 910) corresponding to the entire region/part (or a first region/part) of the first original image 910 on a first region, a second image 922 corresponding to a second region/part of the first original image 910 or the first image 921 on a second region, a third image 923 corresponding to a third region/part of the first original image 910 or the first image 921 on a third region, and a fourth image 924 corresponding to a fourth region/part of the first original image 910 or the first image 921 on a fourth region.

In an embodiment, the electronic device 901 may store or share a combined image 920 including the first image 921, the second image 922, the third image 923, and the fourth image 924 that are concurrently displayed on the display 906, in response to a user input or automatically.

In an embodiment, the electronic device 901 may display in real time the first original image 910 on the display 906 during capturing of the first original image 910.

In an embodiment, the electronic device 901 may concurrently play the first image 921, the second image 922, the third image 923, and the fourth image 924 after capturing of the first original image 910 or the first image 921.

Figure 9C:
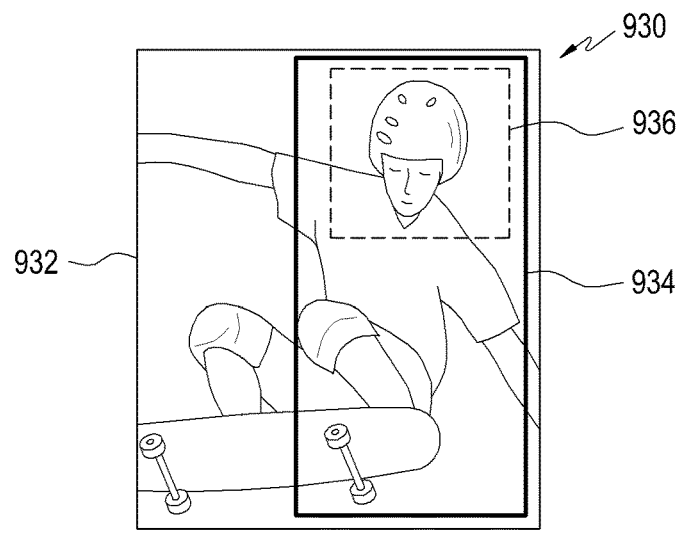

Referring to FIG. 9C, the electronic device 901 obtains a second original image 930 of a subject by using the camera, upon reception of a photographing instruction from a user or based on configuration information about a combined image stored in the memory.

In an embodiment, the configuration information about the combined image may include information about region (s)/part(s) of interest of the second original image 930. For example, the information about the region/part of interest may include at least one coordinate and/or target data. The at least one coordinate set by the user input may be fixed. The electronic device 901 may divide (or extract) regions/parts of interest from the entire region/part of the second original image 930 based on the configuration information, thus generating first through third images corresponding to the first through third regions/parts. The electronic device 901 may divide (or extract) a first region/part 932 corresponding to the entire region/part of the second original image 930 as a first image, a second region/part 934 corresponding to a right part of the entire region/part as a second image, and a third region/part 936 corresponding to the facial part of the subject as a third image from the entire region/part of the second original image 930, based on the configuration information. For example, aspect ratios of some of the regions/parts of interest may be set different and the aspect ratios of the regions/parts of interest may be maintained constant. After the aspect ratio of each region/part of interest is initially set, an aspect ratio of at least some of the regions/parts of interest may be changed. For example, the size of a part/region or image corresponding to the regions/parts of interest may be increased or decreased while maintaining a set aspect ratio.

A position of the third region/part 936 corresponding to the facial part of the subject may be changed between images frames of the second original image 930. That is, the electronic device 901 may recognize/trace the facial part in each image frame of the second original image 930 and generate the recognized/traced facial part of each image frame as a corresponding image frame of the third image. For example, after an initial position of the third region/part 936 is set by the user input, the position of the third region/part 936 may be changed according to face tracing.

Figure 9D:
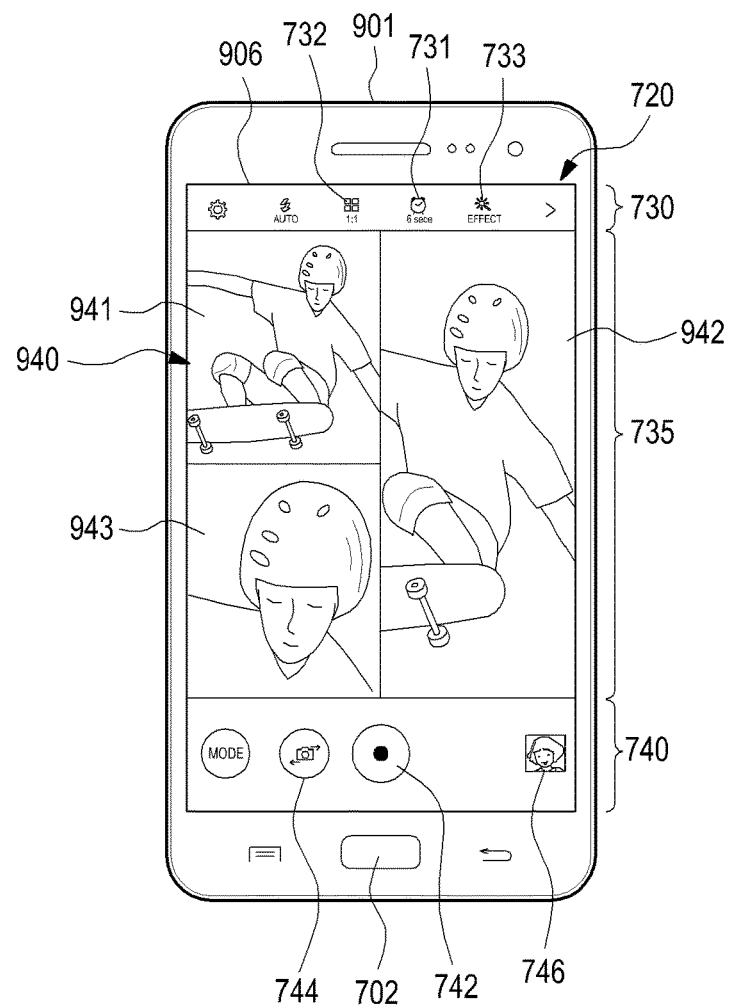

Referring to FIG. 9D, for example, the electronic device 901 may display the camera application screen 720 as shown in FIG. 7B on the display 906. The electronic device 901 divides the live-view region 735 into first through third regions based on configuration information (e.g., display region arrangement information) about the combined image. For example, the electronic device 901 may display a first image 941 corresponding to a first region/part of the second original image 930 on a first region, a second image 942 corresponding to a second region/part of the second original image 930 on a second region, and a third image 943 corresponding to a third region/part of the second original image 930 on a third region.

In an embodiment, the electronic device 901 may store or share a combined image 940 including the first image 941, the second image 942, and the third image 943 that are concurrently displayed on the display 906, in response to a user input or automatically.

In an embodiment, the electronic device 901 may display in real time the second original image 930 on the display 906 during capturing of the second original image 930.

In an embodiment, the electronic device 901 may concurrently play the first image 941, the second image 942, and the third image 943 during/after capturing of the second original image 930.

FIGS. 10A through 10K are views for describing a method for providing an image by an electronic device according to various embodiments.

Figure 10A:
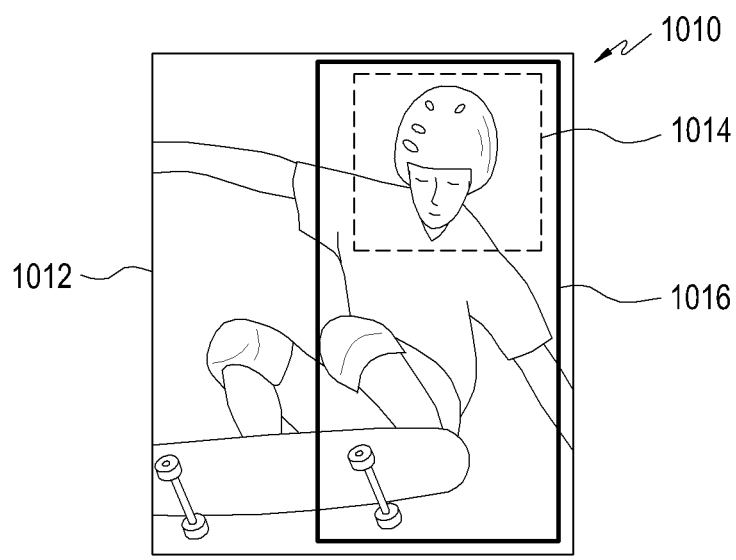
FIGS. 10A through 10K are views for describing a method for providing an image by an electronic device according to various embodiments.
Figure 10B:
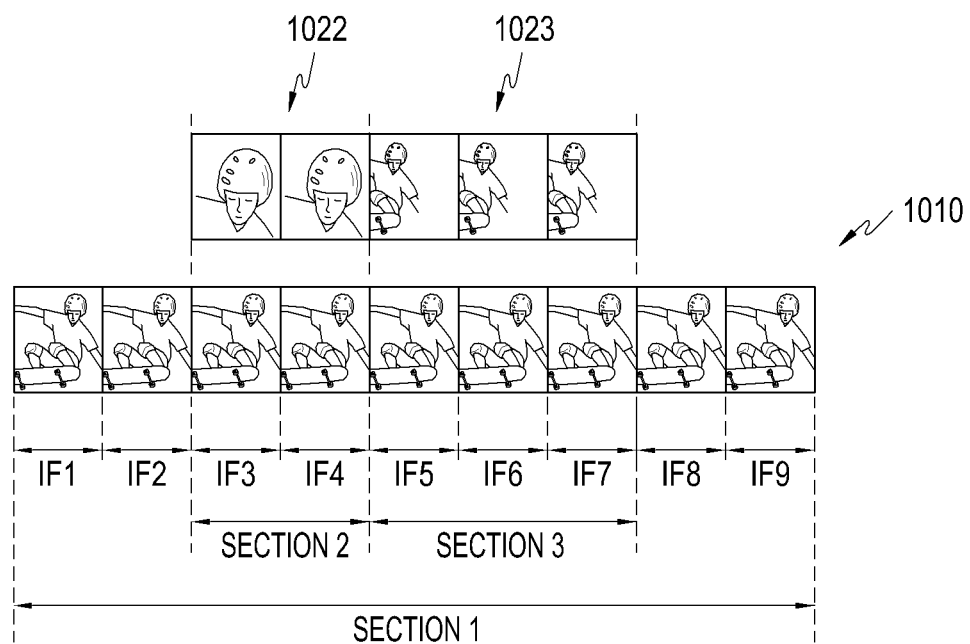

Referring to FIGS. 10A and 10B, an electronic device 1001 (e.g., the electronic device 101, 201, or 401) obtains an original image 1010 of a subject by using a camera (e.g., the camera module 291 or the camera 490) functionally connected with the electronic device 1001, upon reception of a photographing instruction from a user or based on configuration information about a combined image stored in a memory (e.g., the memory 130 or 230) functionally connected with the electronic device 1001. For example, the original image 1010 may include nine image frames IF1 through IF9.

In an embodiment, the configuration information about the combined image may include information about region(s)/part(s) of interest of the original image 101, and variable time period (or frame count) information and fixed/variable time interval (or intervals expressed with the frame counts) information for a plurality of images including the first image and the second image. For example, the information about the region/part of interest may include at least one coordinate set by a user input and/or target data for automatic recognition.

For example, the electronic device 1001 may divide (or extract) a first playback section having a first time period (or a first frame count) (corresponding to the entire time period of the original image 1010), a second playback section having a second time period (or a second frame count), and a third playback section having a third time period (or a third frame count) from the entire playback/photographing duration of the original image 1010, based on the configuration information. The electronic device 1001 divides (or extracts) a first region/part 1012 corresponding to the entire region/part of image frames IF1 through IF9 as a first image from the first playback section and the entire region/part, based on the configuration information. The electronic device 1001 divides (or extracts) a second region/part 1014 corresponding to a facial part of a subject as a second image 1022 from the second playback section and the entire region/part of the image frames IF3 and IF4, based on the configuration information. The electronic device 1001 divides (or extracts) a third region/part 1016 corresponding to a right part of the entire region/part of the image frames IF5, IF6, and IF7 as a third image from the third playback section and the entire region/part of the image frames IF5, IF6, and IF7, based on the configuration information.

Figure 10C:
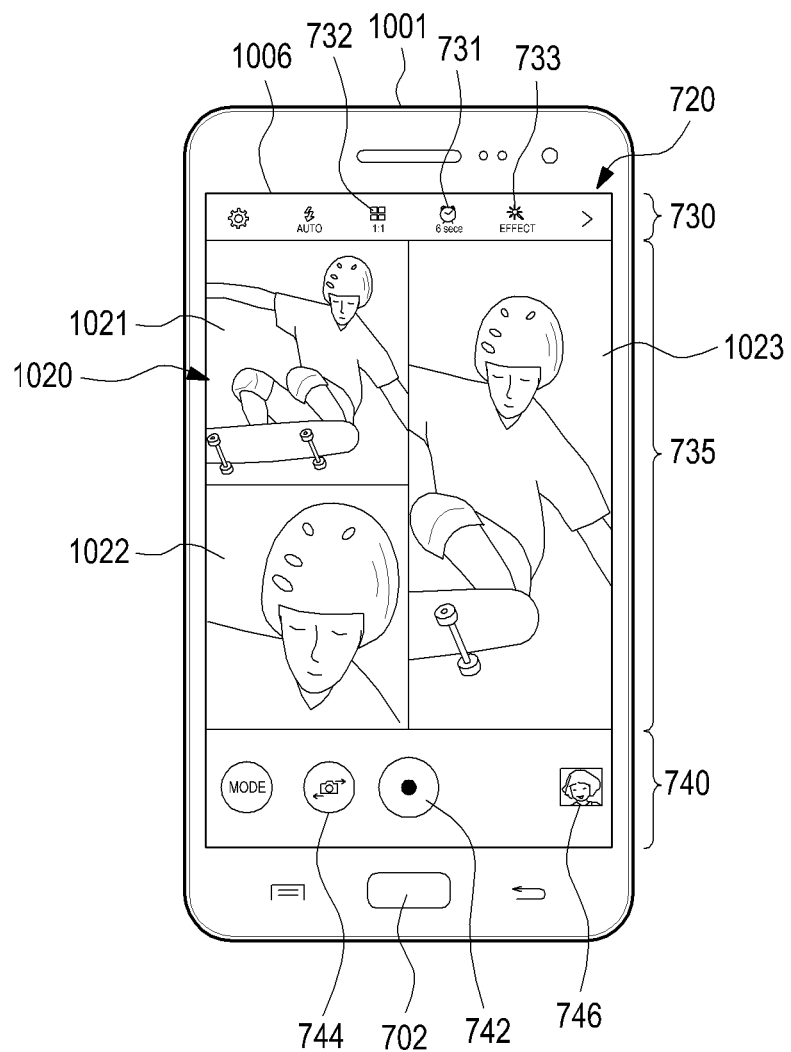

Referring to FIG. 10C, for example, the electronic device 1001 may display the camera application screen 720 as shown in FIG. 7B on a display 1006. The electronic device 1001 divides the live-view region 735 into first through third regions based on configuration information (e.g., display region arrangement information) about the combined image. For example, the electronic device 1001 may display a first image 1021 corresponding to a first playback section and a first region/part of an original image (e.g., an original image 1010) on a first region, a second image 1022 corresponding to a second playback section and a second region/part of the original image on a second region, and a third image 1023 corresponding to a third playback section and a third region/part of the original image on a third region.

In an embodiment, the electronic device 1001 may store or share a combined image 1020 including the first image 1021, the second image 1022, and the third image 1023 that are concurrently displayed on the display 1006, in response to a user input or automatically.

In an embodiment, the electronic device 1001 may display in real time the original image 1010 on the display 1006 during capturing of the original image 1010.

In an embodiment, the electronic device 1001 may sequentially play at least some of the first image 1021, the second image 1022, and the third image 1023 during/after capturing of the original image 1010. For example, the electronic device 1001 may sequentially play the second image 1022 and the third image 1023, while playing the first image 1021.

In an embodiment, the electronic device 1001 may concurrently play the first image 1021, the second image 1022, and the third image 1023 after capturing of the original image 1010.

In an embodiment, the electronic device 1001 may play the first image 1021 at a speed of 120 fps, the second image 1022 at a speed of 30 fps, and the third image 1023 at a speed of 60 fps, based on the configuration information or an automatic calculation result.

Figure 10D:
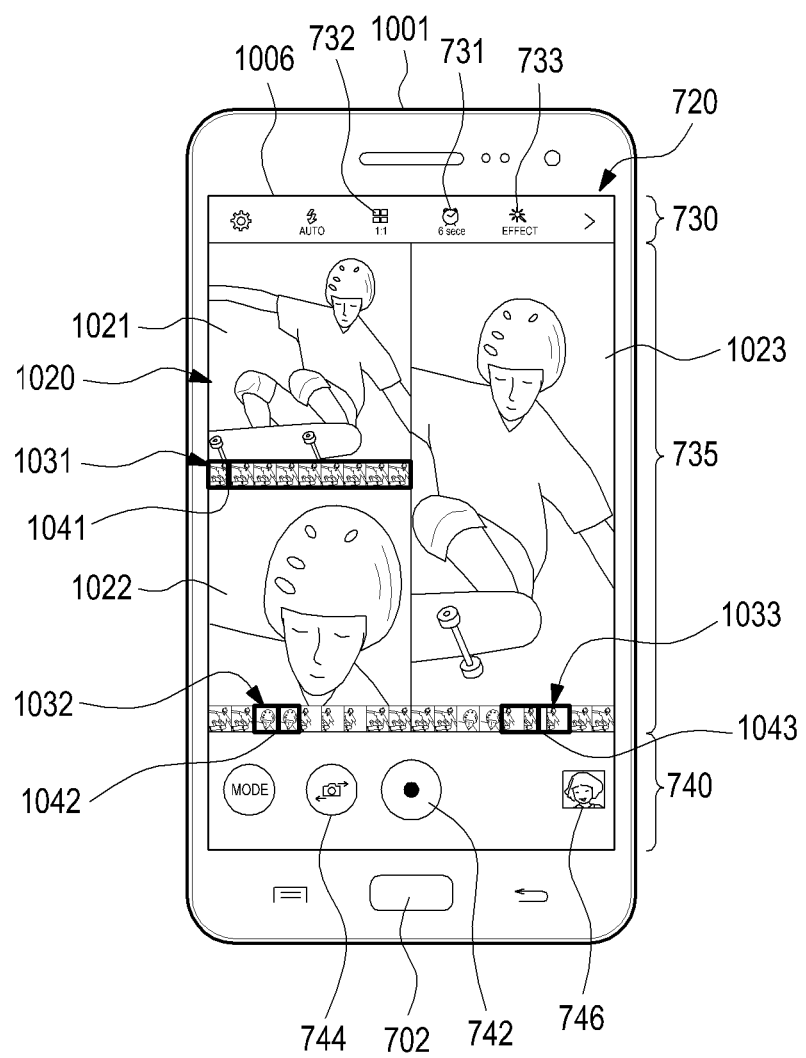

Referring to FIG. 10D, for example, the electronic device 1001 may display a first graphic element 1031 indicating a playback section of the first image 1021 in the original image (e.g., the original image 1010) and a second graphic element 1041 indicating a current playback position of the first image 1021 on the display 1006. The electronic device 1001 may display a third graphic element 1032 indicating a playback section of the second image 1022 in the original image and a fourth graphic element 1042 indicating a current playback position of the second image 1022 on the display 1006. The electronic device 1001 may display a fifth graphic element 1033 indicating a playback section of the third image 1023 in the original image and a sixth graphic element 1043 indicating a current playback position of the third image 1023 on the display 1006.

Figure 10E:
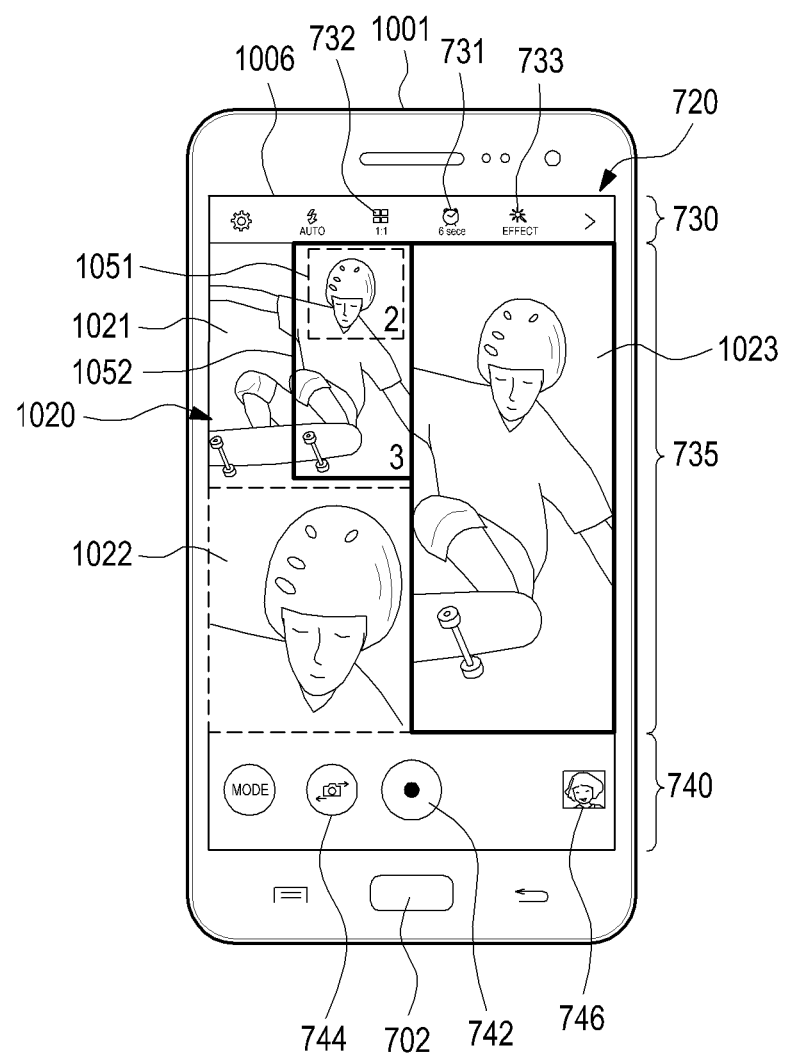

Referring to FIG. 10E, for example, the electronic device 1001 may display a seventh graphic element 1051 indicating a region/part of the second image 1022 in the original image (e.g., the original image 1010) and an eighth graphic element 1052 indicating a region/part of the third image 1023 in the original image on the display 1006.

Figure 10F:
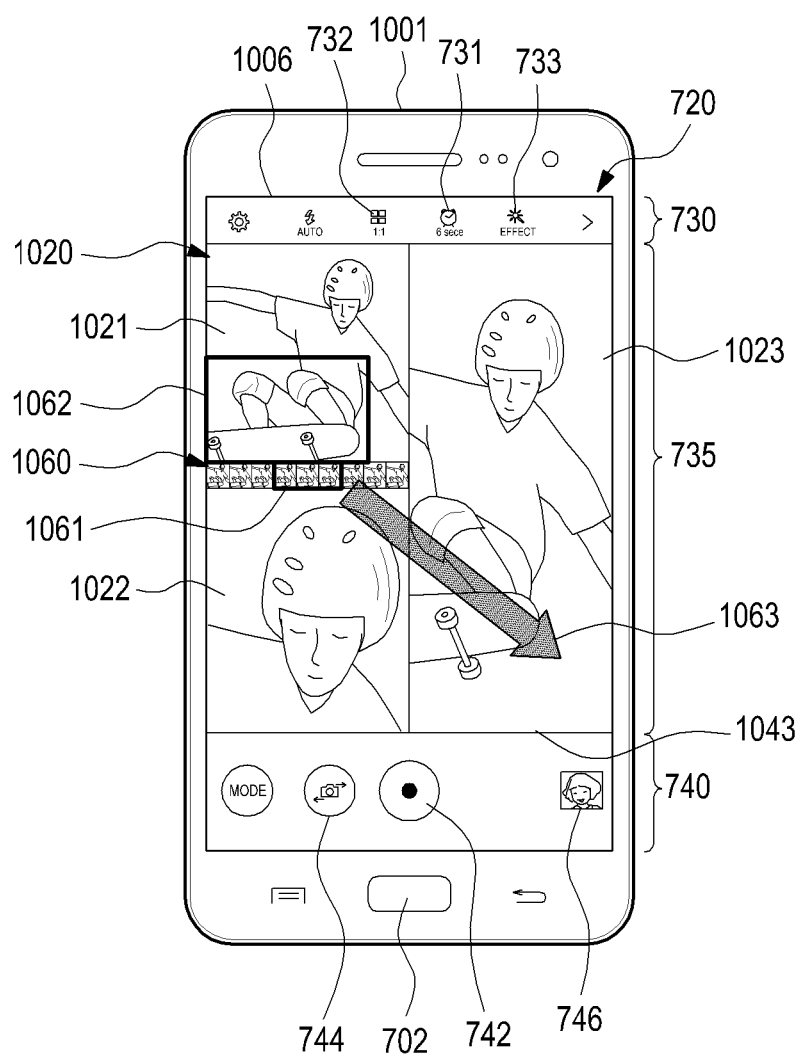
Figure 10G:
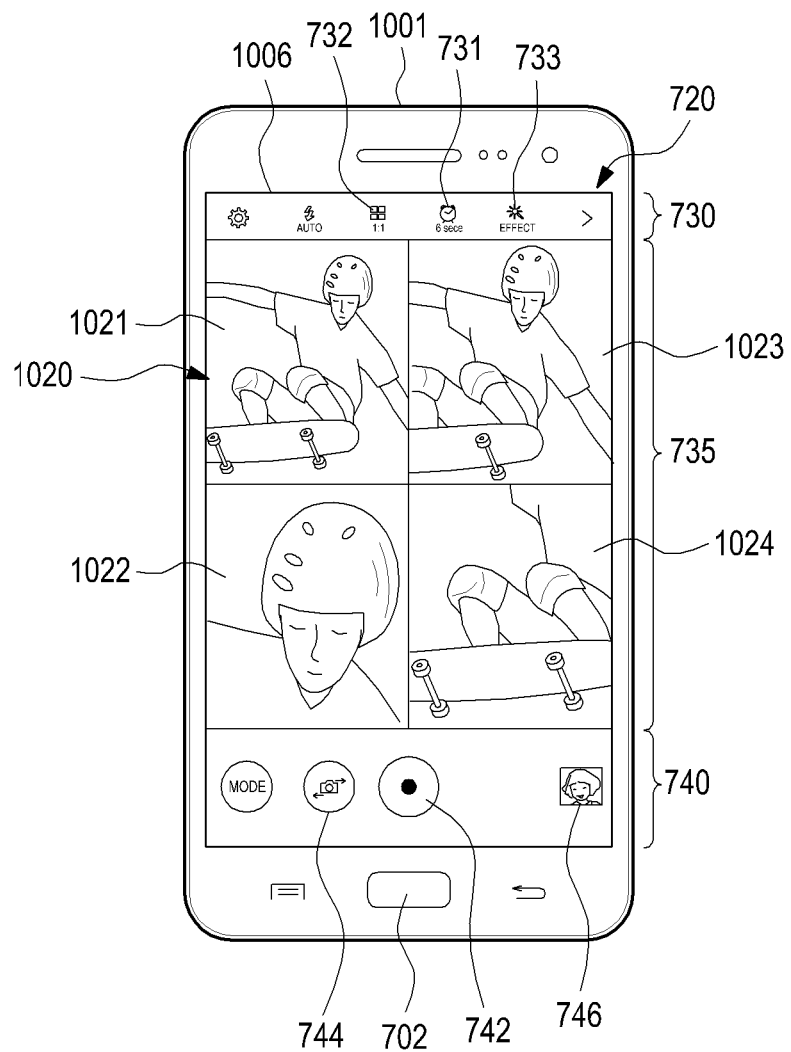

Referring to FIGS. 10F and 10G, in an embodiment, the electronic device 1001 displays image frames 1060 or playback sections of the original image (e.g., the original image 1010) or the first image 1021 on the display 1006 in response to a user input. The electronic device 1001 detects a user input of selecting at least some image frames 1061 from among the image frames 1060. The electronic device 1001 detects a user input 1063 of dragging the selected image frames 1061 (or a selected section) to the third region. The electronic device 1001 divides a part of the third region as a fourth region in response to the user input 1063, and displays a fourth image 1024 corresponding to the selected image frames 1061 (or the selected section) on the fourth region.

Referring to FIGS. 10F and 10G, in an embodiment, the electronic device 1001 may detect a user input of selecting a region/part 1062 of the original image (e.g., the original image 1010) or the first image 1021. The electronic device 1001 may detect a user input 1063 of dragging the selected region/part 1062 to the third region. The electronic device 1001 divides a part of the third region as the fourth region in response to the user input 1063, and displays the fourth image 1024 corresponding to the selected image/part 1062 on the fourth region.

Referring to FIGS. 10F and 10G, in an embodiment, the electronic device 1001 may detect a user input of selecting the at least some image frames 1061 from among the image frames 1060 of the original image (e.g., the original image 1010) or the first image 1021 and selecting a region/part 1062 of the original image (e.g., the original image 1010) or the first image 1021. The electronic device 1001 detects a user input 1063 of dragging the selected image frames 1061 (or a selected section) and/or the selected region/part 1062 to the third region. The electronic device 1001 divides a part of the third region as a fourth region in response to the user input 1063, and displays a fourth image 1024 corresponding to the selected image frames 1061 (or the selected section) and the selected region/part 1062 on the fourth region.

Figure 10H:
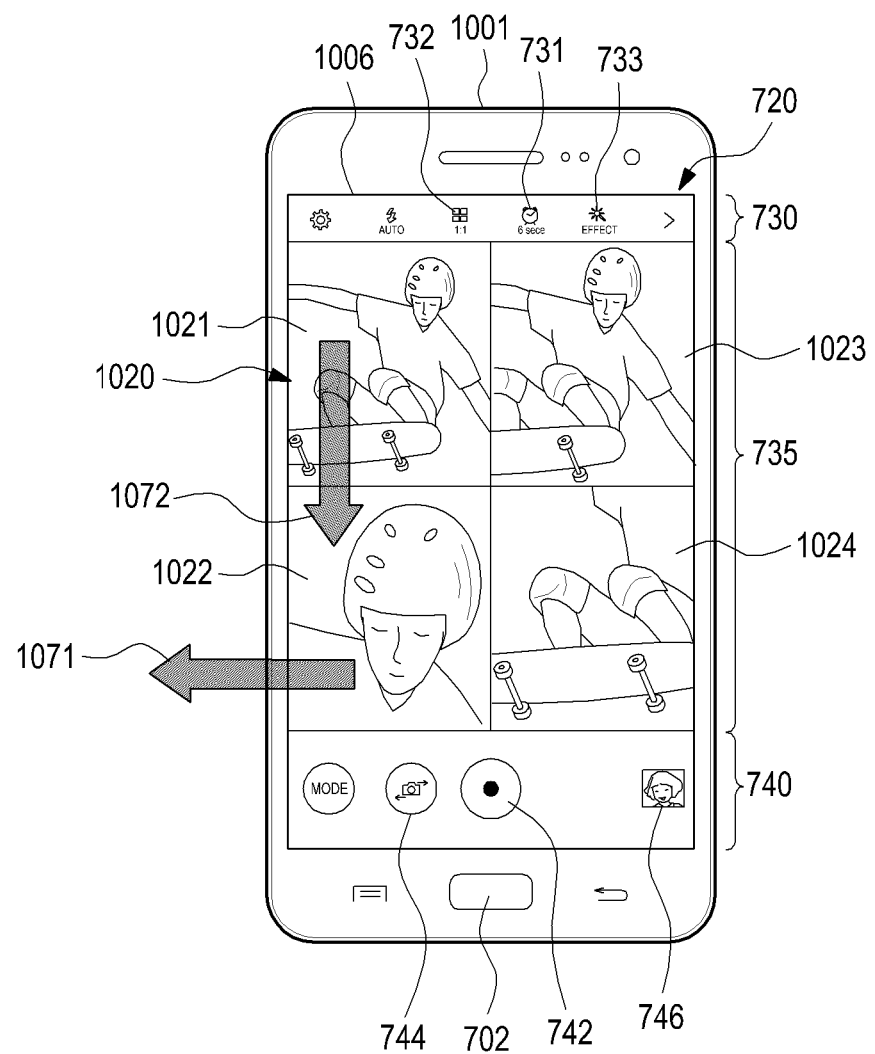
Figure 10I:
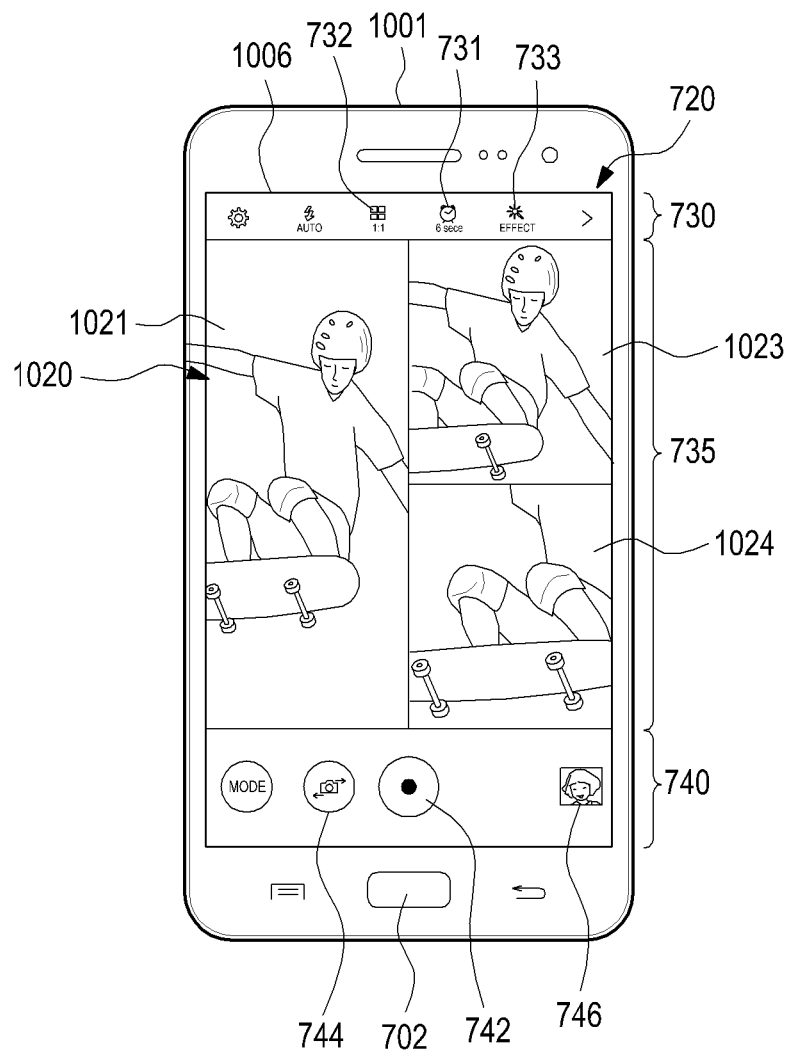

Referring to FIGS. 10H and 10I, in an embodiment, the electronic device 1001 may detect a user input of selecting the second image 1022. The electronic device 1001 may detect a user input 1071 of dragging the selected second image 1022 to a left end of the display. The electronic device 1001 removes the second image 1022 in response to the user input 1071 and extends the first region where the first image 1021 is displayed to the second region where the second image 1022 has been displayed.

Referring to FIGS. 10H and 10I, in an embodiment, the electronic device 1001 may detect a user input of selecting the first image 1021. The electronic device 1001 may detect a user input 1072 of dragging the selected first image 1021 to the second region. The electronic device 1001 removes the second image 1022 in response to the user input 1072 and extends the first region where the first image 1021 is displayed to the second region where the second image 1022 has been displayed.

In an embodiment, the electronic device 1001 may detect a user input 1072 of dragging the selected first image 1021 to the second region or a user input of dragging the second image 1022 to the first region. The electronic device 1001 may exchange the first image 1021 and the second image 1022 with each other and display them in response to the user input 1072 or a reverse input thereof.

Figure 10J:
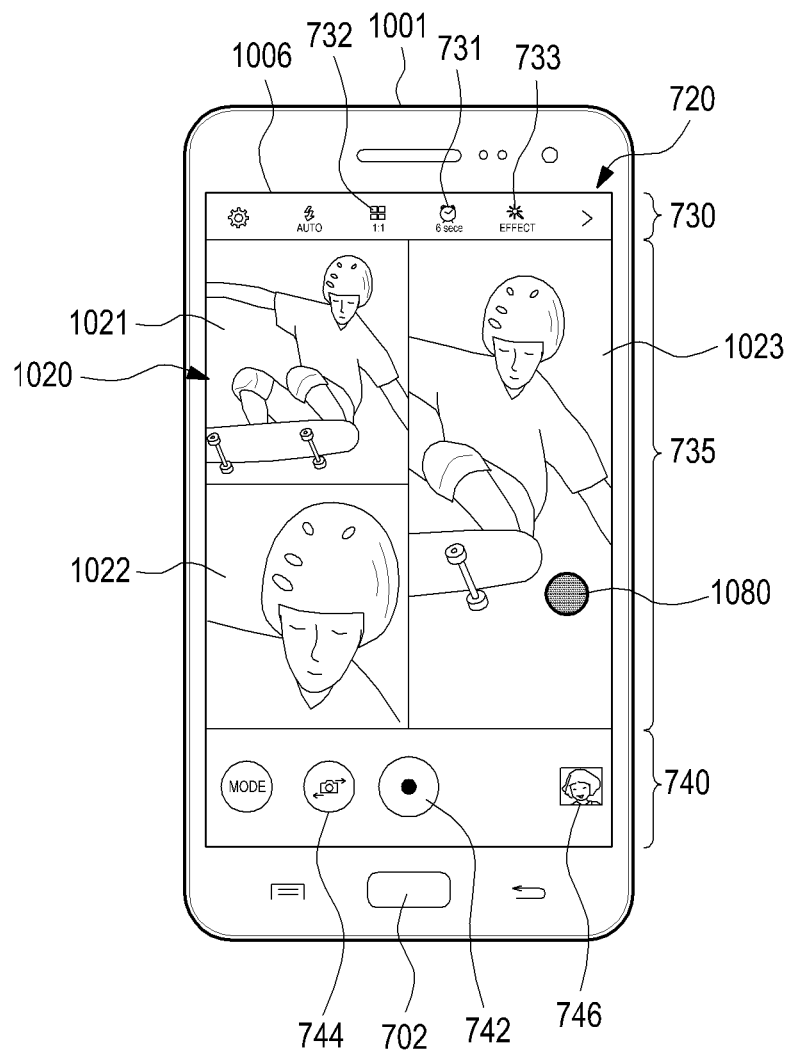
Figure 10K:
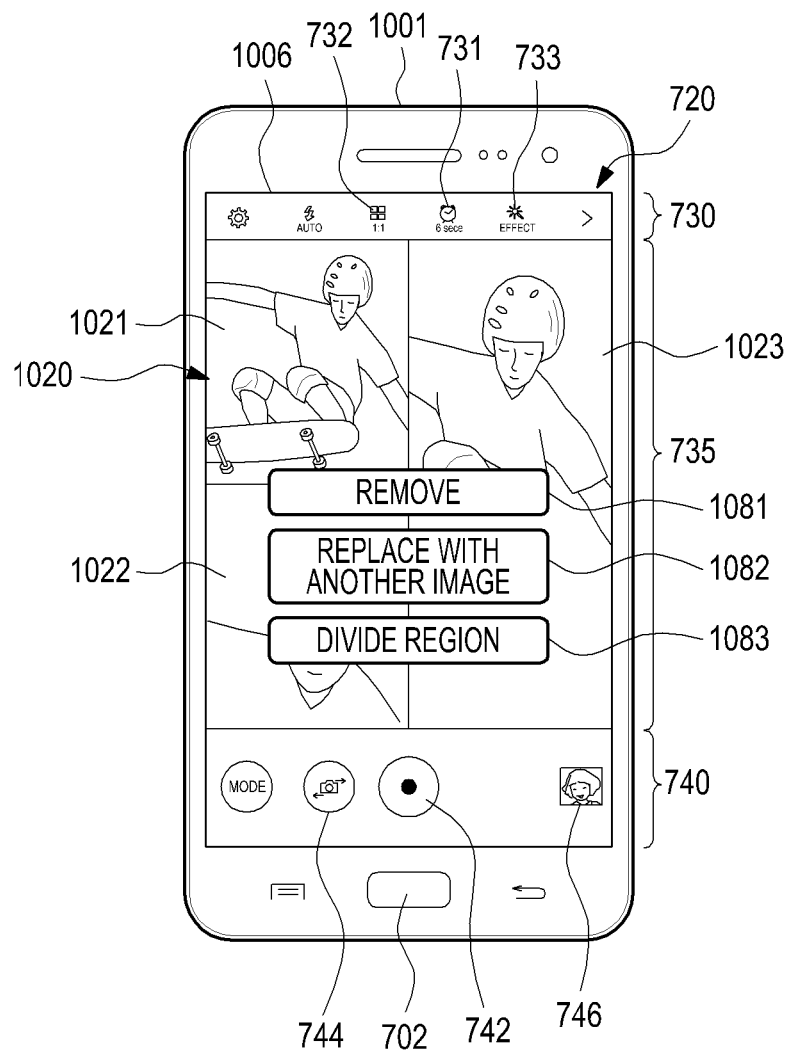

Referring to FIGS. 10J and 10K, in an embodiment, the electronic device 1001 may detect a user input 1080 of selecting the third image 1023. The electronic device 1001 displays at least one item for performing at least one function related to the third image 1023 on the display 1006 in response to the user input 1080. For example, the electronic device 1001 may display a first item 1081 for removing the third image 1023, a second item 1082 for replacing the third image 1023 with another image, and a third item 1083 for dividing the third region where the third image 1023 is displayed into two or more regions on the display 1006. The electronic device 1001 may detect selection with respect to the first item 1081, the second item 1082, or the third item 1083, and perform a function corresponding to the selected item. For example, the other image may include at least one of a currently captured image, an image shared in real time with an external electronic device (e.g., the electronic device 102 or 104, the server 106, etc.), a gallery image and a combined image stored in the memory, and so forth.

Figure 11:
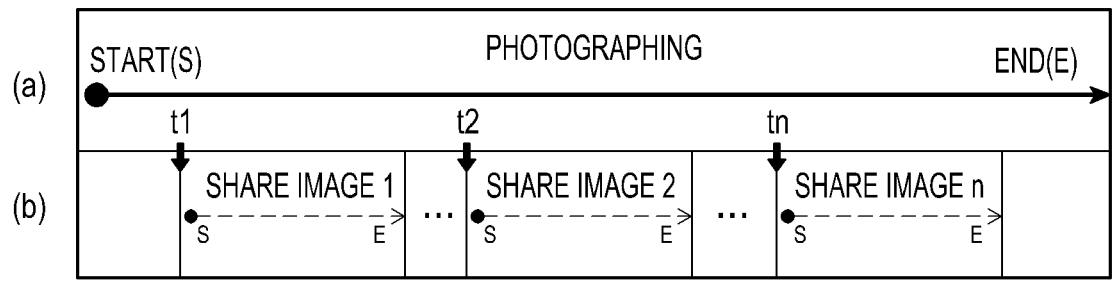
FIG. 11 is a view for describing a method for providing an image by an electronic device according to various embodiments.

FIG. 11 is a view for describing a method for providing an image by an electronic device according to various embodiments.

Referring to (a) of FIG. 11, an electronic device (e.g., the electronic device 101, 201, or 401) obtains an original image of a subject by using a camera (e.g., the camera module 291 or the camera 490) functionally connected with the electronic device, upon reception of a photographing instruction from a user or based on configuration information about a combined image stored in a memory (e.g., the memory 130, 230, or 430) functionally connected with the electronic device.

Referring to (b) of FIG. 11, the electronic device may generate a first image and at least one image including a second image based on the original image. For example, after starting capturing of the original image, the electronic device may initiate generation (and displaying) of the first image at a point t1, initiate generation (and displaying) of the second image at a point t2 (>t1), and initiate generation (and displaying) of an $n^{th}$ image at a point to (>t2).

The electronic device may generate (and display) a combined image including the first through $n^{th}$ images after ending capturing of the original image.

In an embodiment, the electronic device may perform a cancellation (or undo or remove) function with respect to at least one of the first through $n^{th}$ images in response to a user input. For example, in response to an undo instruction with respect to the second image, the electronic device may remove a previous image (i.e., the first image) as well as the second image.

In an embodiment, the electronic device may display another image on a region of a display (e.g., the display 160, 260, or 460) where the removed image has been displayed, in response to a user input. For example, the other image may include at least one of a currently captured image, an image shared in real time with an external electronic device (e.g., the electronic device 102 or 104, the server 106, etc.), a gallery image and a combined image stored in the memory, and so forth.

In an embodiment, the electronic device may display a combined image on the display while generating the combined image. For example, the combined image may be displayed on a live-view region of the camera application.

In an embodiment, the electronic device may display, on the display, a graphic element for identifying an image currently displayed on the live-view region. For example, the electronic device may display a first graphic element for identifying the original image and a second graphic element for identifying a sub image generated based on the original image on the display.

Figure 12:
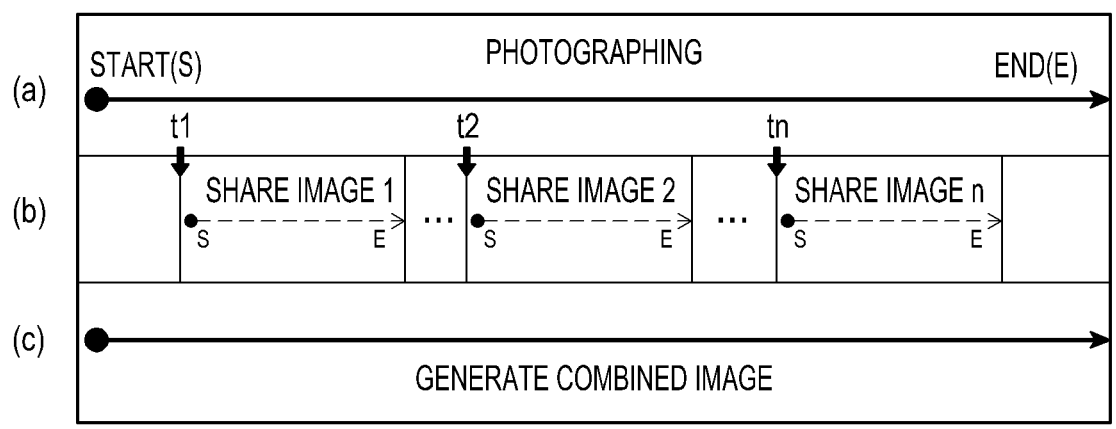
FIG. 12 is a view for describing a method for providing an image by an electronic device according to various embodiments.

FIG. 12 is a view for describing a method for providing an image by an electronic device according to various embodiments.

Referring to (a) of FIG. 12, an electronic device (e.g., the electronic device 101, 201, or 401) obtains an original image of a subject by using a camera (e.g., the camera module 291 or the camera 490) functionally connected with the electronic device, upon reception of a photographing instruction from a user or based on configuration information about a combined image stored in a memory (e.g., the memory 130, 230, or 430) functionally connected with the electronic device.

Referring to (b) of FIG. 12, the electronic device may generate a first image and at least one image including a second image based on the original image. For example, after starting capturing of the original image, the electronic device may initiate generation (and displaying) of the first image at a point t1, initiate generation (and displaying) of the second image at a point t2 (>t1), and initiate generation (and displaying) of an n$^{th}$ image at a point to (>t2).

Referring to (c) of FIG. 12, the electronic device may initiate generation (and displaying) of the combined image that sequentially includes the first through n$^{th}$ images at the point t1.

In an embodiment, the electronic device may perform the undo (or cancel or remove) function with respect to at least one of the first through n$^{th}$ images in response to a user input during/after capturing of the original image.

In an embodiment, the electronic device may sequentially generate the first through n$^{th}$ images and at the same time, sequentially display the first through n$^{th}$ images on the display (e.g., the display 160, 260, or 460).

Figure 13:
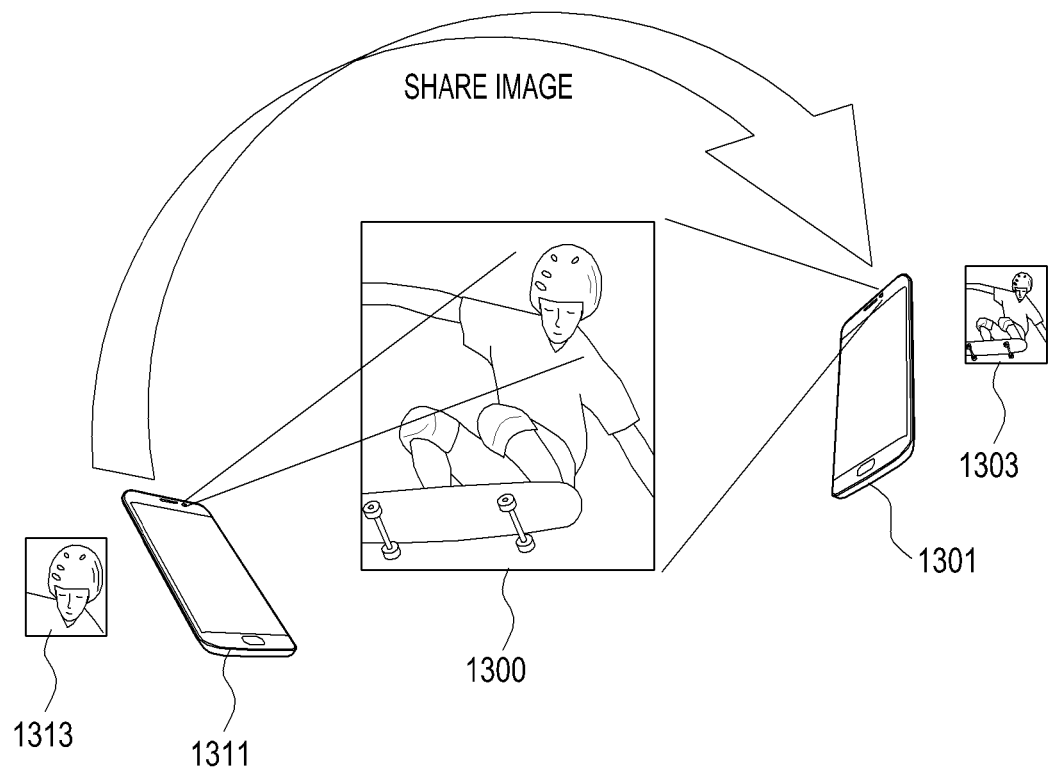
FIG. 13 is a view for describing a method for providing an image by an electronic device according to various embodiments.

FIG. 13 is a view for describing a method for providing an image by an electronic device according to various embodiments.

A first electronic device 1301 (e.g., the electronic device 101, 201, or 401) obtains a first original image 1303 of a subject 1300 by using a camera (e.g., the camera module 291 or the camera 490) functionally connected with the first electronic device 1301, upon reception of a photographing instruction from a user or based on configuration information about a combined image stored in a memory (e.g., the memory 130 or 230) functionally connected with the first electronic device 1301.

The first electronic device 1301 receives a second image 1313 from a second electronic device 1311, which obtains the second image 1313 by photographing the subject 1300, through a communication module (e.g., the communication module 170 or 220) functionally connected with the first electronic device 1301.

The first electronic device 1301 generates a combined image including the first image 1303 and the second image 1313.

In an embodiment, the first electronic device 1301 transmits the first image 1303 or the combined image to the second electronic device 1311 through the communication module.

Figure 14A:
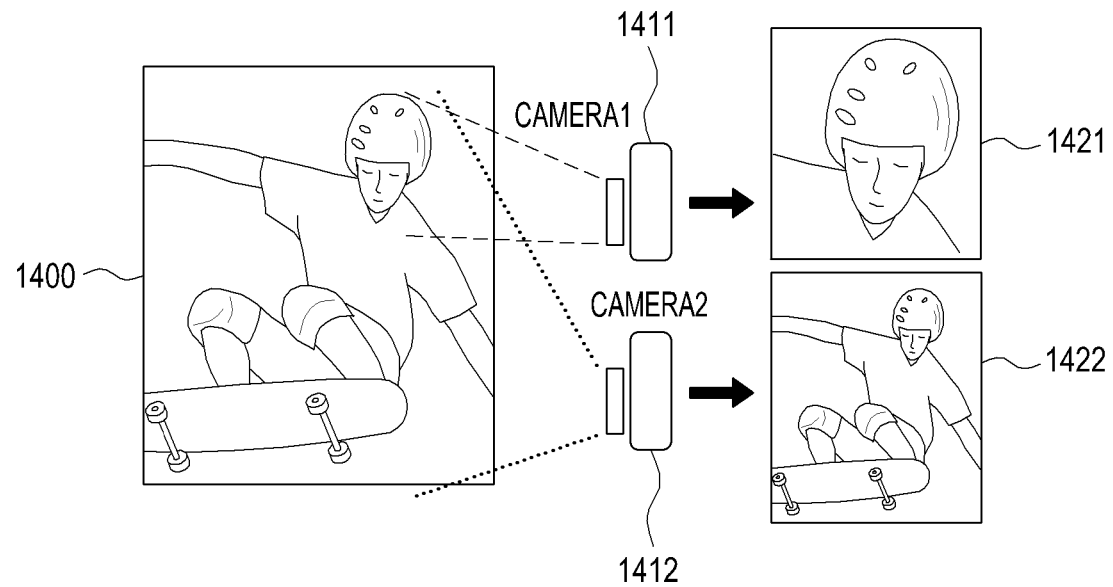
FIGS. 14A and 14B are views for describing a method for providing an image by an electronic device according to various embodiments.
Figure 14B:
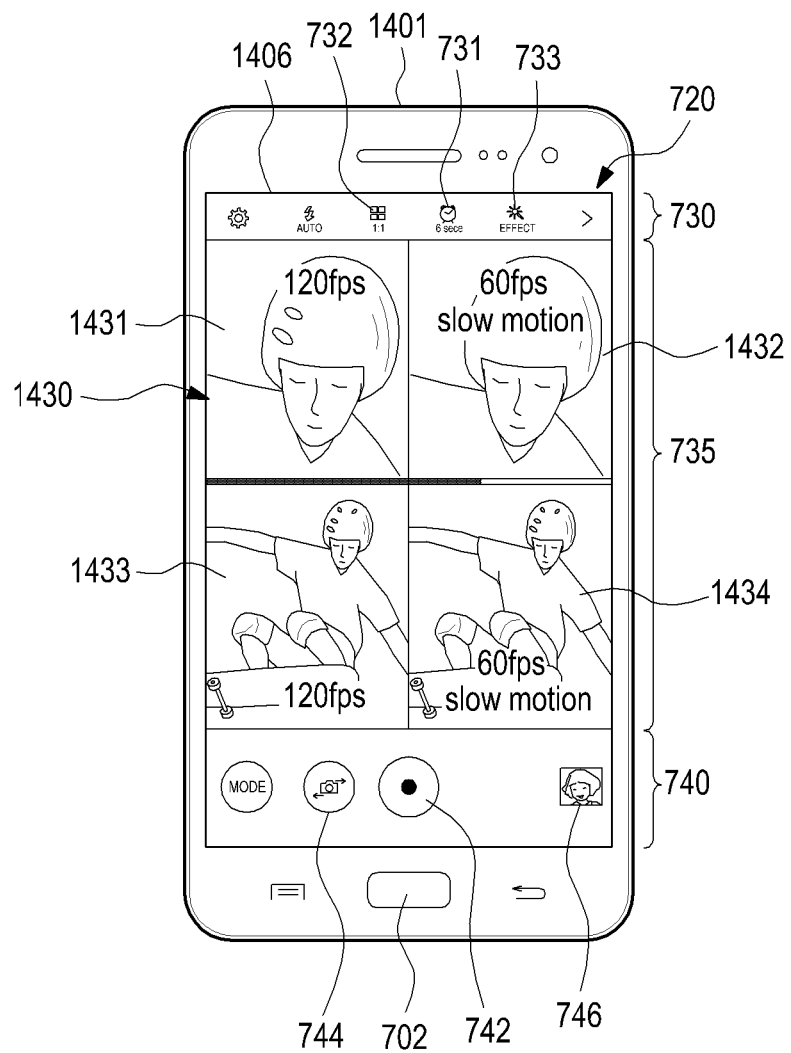

FIGS. 14A and 14B are views for describing a method for providing an image by an electronic device according to various embodiments.

Referring to FIGS. 14A and 14B, an electronic device 1401 (e.g., the electronic device 101, 201, or 401) obtains a first original image 1421 of a subject 1400 by using a first camera 1411 (e.g., the camera module 291 or the camera 490) functionally connected with the electronic device 1401, upon reception of a photographing instruction from a user or based on configuration information about a combined image stored in a memory (e.g., the memory 130 or 230) functionally connected with the electronic device 1401.

The electronic device 1401 obtains a second original image 1422 of the subject 1400 by using a second camera 1412 (e.g., the camera module 291 or the camera 490) functionally connected with the electronic device 1401, upon reception of a photographing instruction from a user or based on the configuration information.

The electronic device 1401 may generate a first image 1431, which corresponds to the entire playback duration of the first original image 1421 and has a playback speed of 120 fps, and a second image 1432, which corresponds to the entire playback duration or a playback section of the first original image 1421 and has a playback speed of 60 fps, based on the first original image 1421.

The electronic device 1401 may generate a third image 1433, which corresponds to the entire playback duration of the second original image 1422 and has a playback speed of 120 fps, and a fourth image 1434, which corresponds to the entire playback section or a playback section of the second original image 1422 and has a playback speed of 60 fps, based on the second original image 1422.

For example, the electronic device 1401 may display the camera application screen 720 as shown in FIG. 7B on a display 1406 (e.g., the display 160, 260, or 460) functionally connected with the electronic device 1401. The electronic device 1401 divides the live-view region 735 into first through fourth regions based on configuration information (e.g., display region arrangement information) about the combined image. For example, the electronic device 1401 may display the first image 1431 on a first region, the second image 1432 on a second region, the third image 1433 on a third region, and the fourth image 1434 on a fourth region.

In an embodiment, the electronic device 1401 may store or share a combined image 1430 including the first image 1431, the second image 1432, the third image 1433, and the fourth image 1434 that are concurrently displayed on the display 1406, in response to a user input or automatically.

Figure 15A:
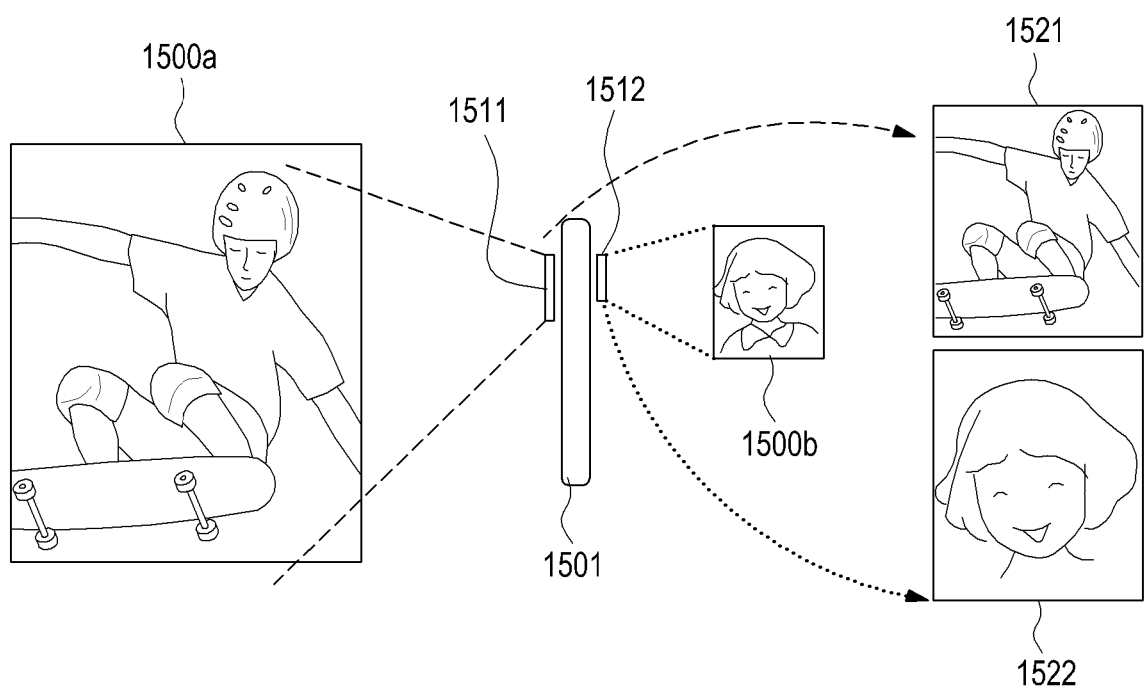
FIGS. 15A and 15B are views for describing a method for providing an image by an electronic device according to various embodiments.
Figure 15B:
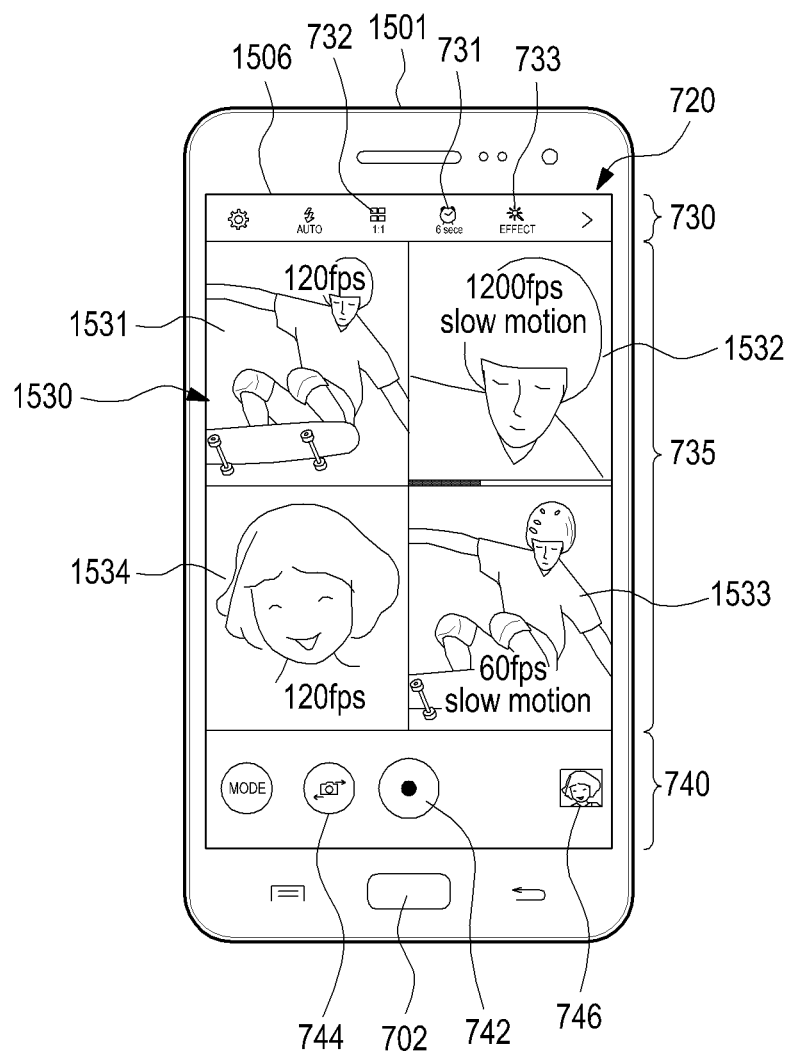

FIGS. 15A and 15B are views for describing a method for providing an image by an electronic device according to various embodiments.

Referring to FIGS. 15A and 15B, an electronic device 1501 (e.g., the electronic device 101, 201, or 401) obtains a first original image 1521 of a first subject 1500a by using a first camera module 1511 (e.g., the first camera module 491) that is functionally connected with the electronic device 1501 and is a rear surface/rear camera module, and obtains a second original image 1522 of a second subject 1500b by using a second camera module 1512 (e.g., the second camera module 492) that is functionally connected with the electronic device 1501 and is a front surface/front camera module, upon reception of a photographing instruction from a user or based on configuration information about a combined image stored in a memory (e.g., the memory 130, 230, or 430) functionally connected with the electronic device 1501.

The electronic device 1501 may generate a first image 1531, which corresponds to the entire region/part and the entire playback duration of the first original image 1521 and has a playback speed of 120 fps, a second image 1532, which corresponds to a part/region (e.g., a facial part) and the entire playback duration of the first original image 1521 and has a playback speed of 120 fps, and a third image 1533, which corresponds to the entire region/part or a playback section of the first original image 1521 and has a playback speed of 60 fps, based on the first original image 1521.

The electronic device 1501 may generate a fourth image 1534, which corresponds to the entire region/part and the entire playback duration of the second original image 1522 and has a playback speed of 120 fps.

For example, the electronic device 1501 may display the camera application screen 720 as shown in FIG. 7B on a display 1506 (e.g., the display 160, 260, or 460) functionally connected with the electronic device 1501. The electronic device 1501 divides the live-view region 735 into first through fourth regions based on configuration information (e.g., display region arrangement information) about the combined image. For example, the electronic device 1501 may display the first image 1531 on a first region, the second image 1532 on a second region, the third image 1533 on a third region, and the fourth image 1534 on a fourth region.

In an embodiment, the electronic device 1501 may store or share a combined image 1530 including the first image 1531, the second image 1532, the third image 1533, and the fourth image 1534 that are concurrently displayed on the display 1506, in response to a user input or automatically.

In an embodiment, the electronic device 1501 may change a camera module for capturing an image to be included in the combined image 1530, in response to a user input (e.g., selection of the switch button 744).

In an embodiment, to generate the combined image 1530, the first camera module 1511 and the second camera module 1512 may perform photographing concurrently or sequentially.

Figure 16A:
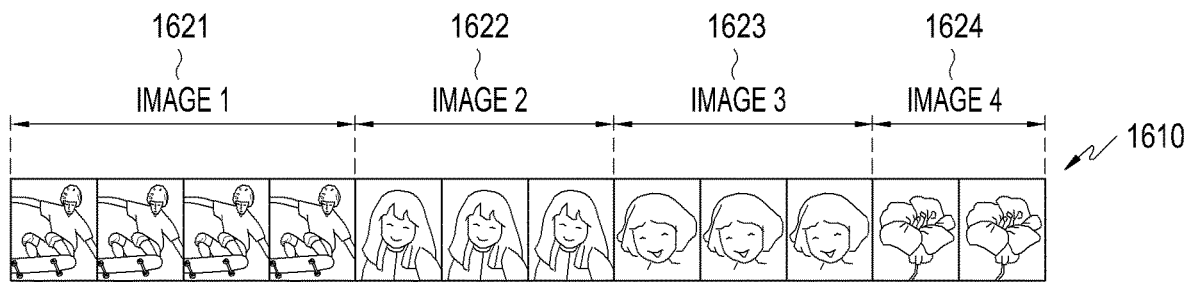
FIGS. 16A and 16B are views for describing a method for providing an image by an electronic device according to various embodiments.
Figure 16B:
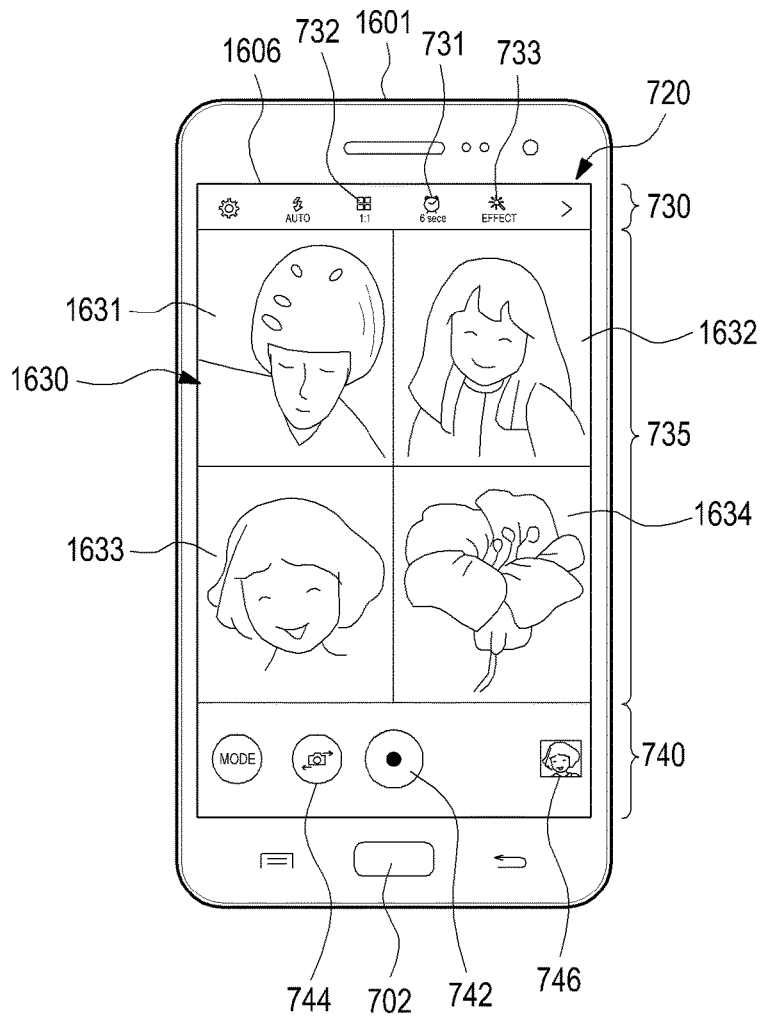

FIGS. 16A and 16B are views for describing a method for providing an image by an electronic device according to various embodiments.

Referring to FIG. 16A, an electronic device 1601 (e.g., the electronic device 101, 201, or 401) sequentially obtains first through fourth images 1621 through 1624 of first through fourth subjects in different times by using a camera (e.g., the camera module 291 or the camera 490) functionally connected with the electronic device 1601, upon reception of a photographing instruction from a user or based on configuration information about a combined image stored in a memory (e.g., the memory 130 or 230) functionally connected with the electronic device 1601. The electronic device 1601 may generate a combined image 1610 by continuously connecting image frames of the first through fourth images 1621 through 1624.

Referring to FIG. 16B, for example, the electronic device 1601 may display the camera application screen 720 as shown in FIG. 7B on a display 1606 (e.g., the display 160, 260, or 460) functionally connected with the electronic device 1601. The electronic device 1601 divides the live-view region 735 into first through fourth regions in response to a user input or based on configuration information (e.g., display region arrangement information) about the combined image.

The electronic device 1601 sequentially obtains the first through fourth images 1621 through 1624 of the first through fourth subjects in different times by using the camera, upon reception of a photographing instruction from a user or based on the configuration information about the combined image. The electronic device 1601 may sequentially display the first image 1631 on a first region, the second image 1632 on a second region, the third image 1633 on a third region, and the fourth image 1634 on a fourth region.

In an embodiment, the electronic device 901 may display in real time the first image 1631, the second image 1632, the third image 1633, and the fourth image 1634 on the display 906 during capturing of each of those images 1631 through 1634.

In an embodiment, the electronic device 1601 may store or share a combined image 1630 including the first image 1631, the second image 1632, the third image 1633, and the fourth image 1634 that are concurrently displayed on the display 1606, in response to a user input or automatically.

Figure 17A:
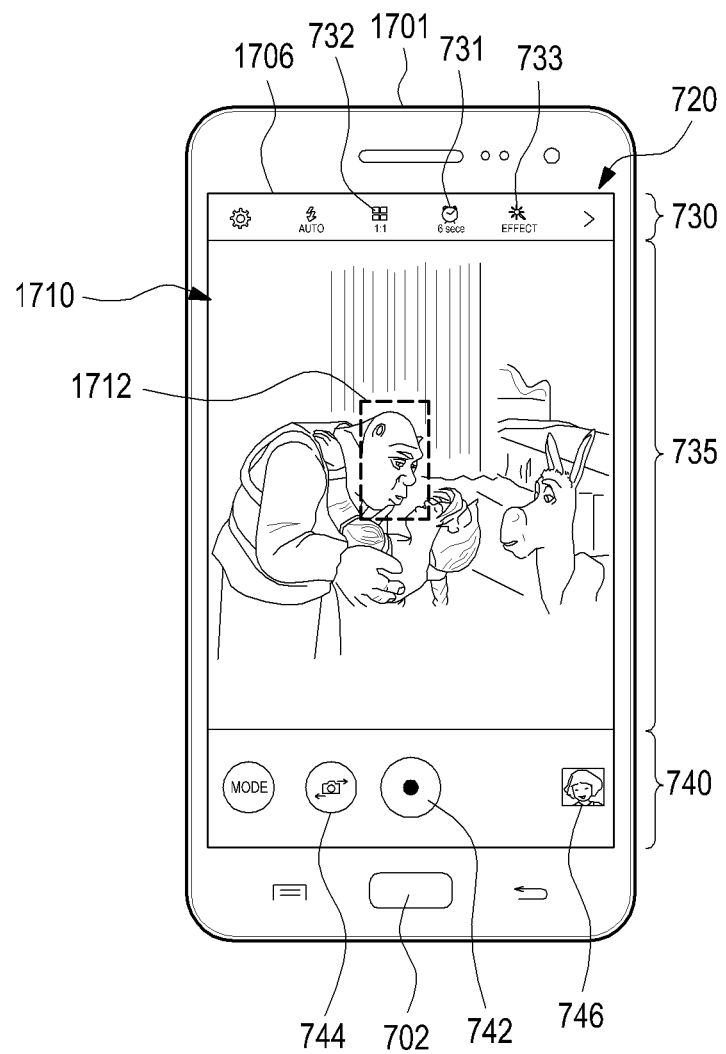
FIGS. 17A and 17B are views for describing a method for providing an image by an electronic device according to various embodiments.
Figure 17B:
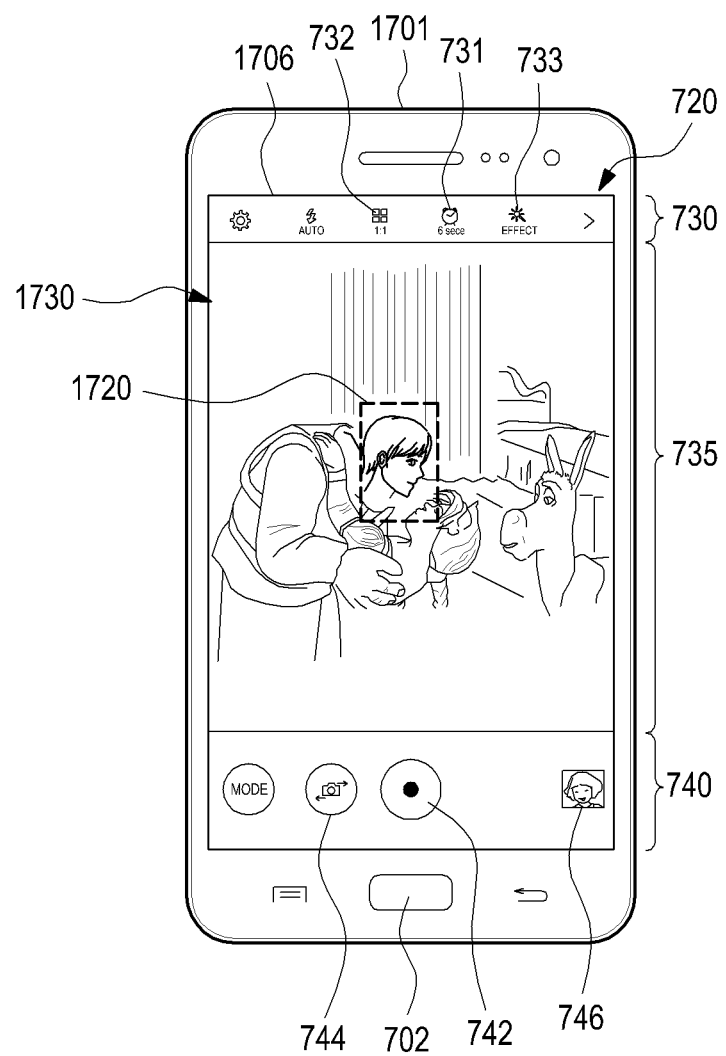

FIGS. 17A and 17B are views for describing a method for providing an image by an electronic device according to various embodiments.

Referring to FIG. 17A, an electronic device 1701 (e.g., the electronic device 101, 201, or 401) obtains a first image 1710 of a subject by using a camera (e.g., the camera module 291 or the camera 490) functionally connected with the electronic device 1701, upon reception of a photographing instruction from a user or based on configuration information about a combined image stored in a memory (e.g., the memory 130, 230, or 430) functionally connected with the electronic device 1701.

For example, the electronic device 1701 may recognize a region 1712 (e.g., a facial region) from a first image 1710 in response to a user input or automatically.

Referring to FIG. 17B, for example, the electronic device 1701 may replace the region 1712 with another image stored in the memory or a second image 1720 obtained using the camera in response to a user input or automatically, thus generating a combined image 1730.

For example, the electronic device 1701 may photograph a photo story separately for user-desired sections, i.e., a narration part, a dialogue part, an image part, etc., to generate a plurality of images. The electronic device 1701 may replace a particular region of the image part with another image. For example, the other image may be an image captured by the electronic device 1701. The electronic device 1701 may replace audio of the image part with audio information recorded when the other image is captured.

FIGS. 18A through 18G are views for describing a method for providing an image by an electronic device according to various embodiments.

For example, the electronic device 401 may display the camera application screen 720 as shown in FIG. 7B on a display 1806 (e.g., the display 160, 260, or 460) functionally connected with the electronic device 1801.

The electronic device 1801 may store time information (e.g., three seconds) for the combined image and/or the plurality of sub images of the combined image as one of the configuration information about the combined image in the memory (e.g., the memory 130, 230, or 430) functionally connected with the electronic device 1801, in response to a user input (or selection) using the time setting item 731.

The electronic device 1801 may detect a user input (or selection) with respect to the arrangement setting item 732. For example, the electronic device 1801 may display a second menu window 760a for inputting/setting display region (or window) arrangement information for the combined image on the display 1806 in response to the user input. The display region (window) arrangement information may include at least one of information about arrangement of regions (or screen regions) where the original image, the first image, and/or the at least one image including the second image are to be displayed, information about shape/size/area of each region, and so forth.

In an embodiment, the second menu window 760a may include at least one graphic elements 762a, 762b, and 762c according to a type of the combined image. For example, the second menu window 760a may include at least one first graphic element 762a indicating arrangement of a collage combined image, at least one second graphic element 762b indicating arrangement of a series combined image, and at least one third graphic element 762*c* indicating arrangement of a slow motion combined image. The electronic device 1801 may detect a user input (or selection) with respect to at least one of the graphic elements 762*a*, 762*b*, and 762*c*. The electronic device 1801 stores display region (or window) arrangement information corresponding to the selected graphic element as one of configuration information for the combined image in the memory in response to the user input.

Figure 18A:
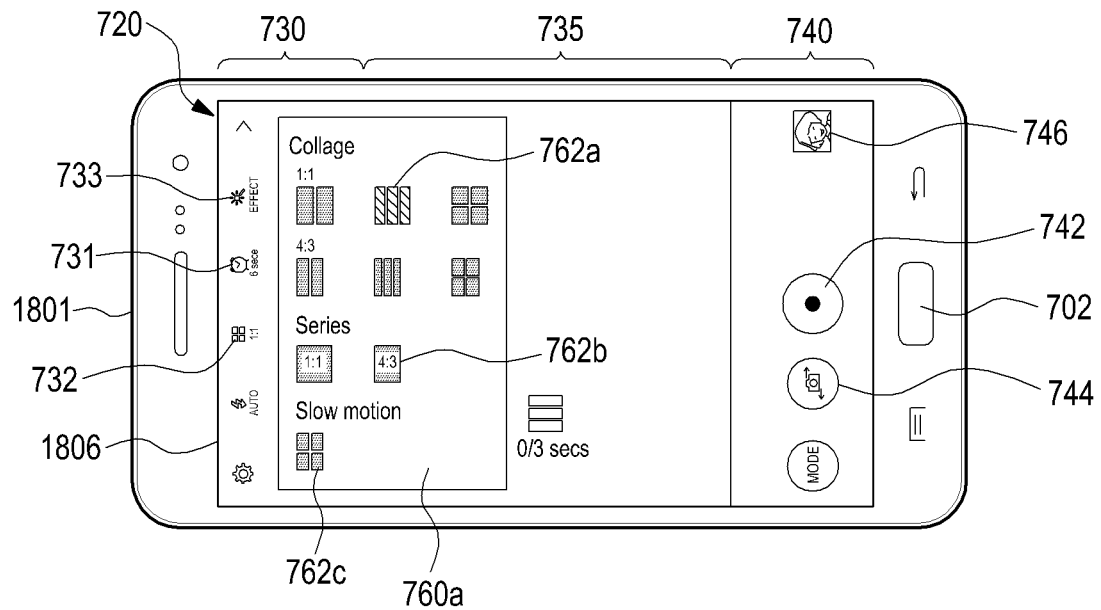
FIGS. 18A through 18G are views for describing a method for providing an image by an electronic device according to various embodiments.
Figure 18B:
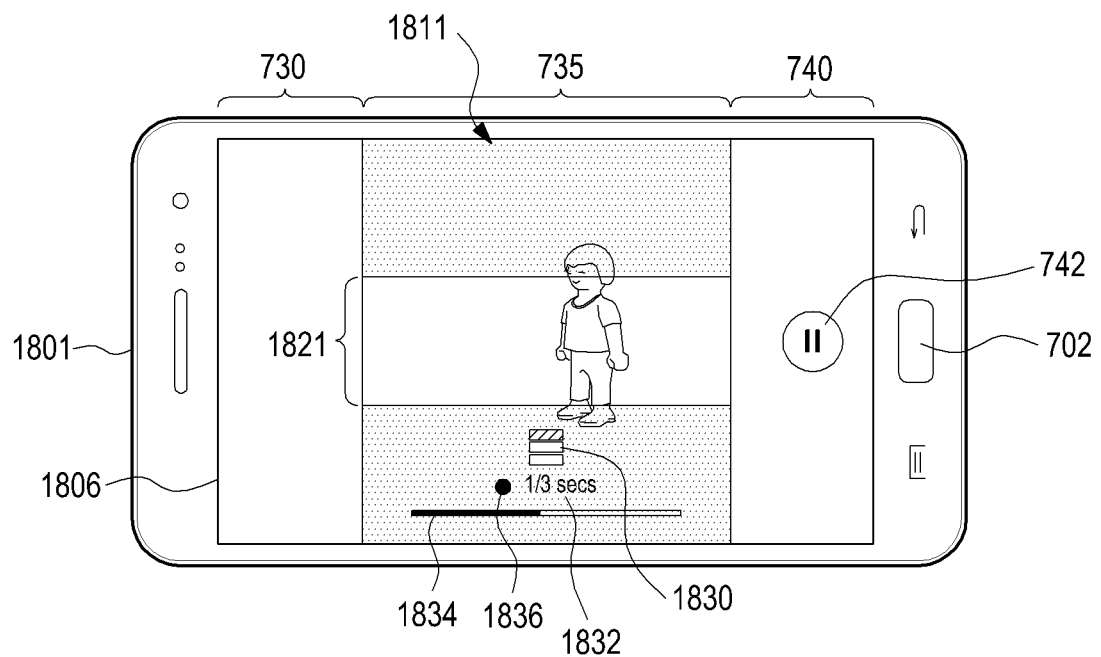

Referring to FIG. 18B, the electronic device 1801 may detect a user input (or selection) with respect to the photograph/stop button 742. The electronic device 1801 initiates capturing of a first original image 1811 in response to the user input. The electronic device 1801 displays a part (i.e., a first sub image 1821) of the first original image 1811, which is to be included in a combined image, on the display 1806. For example, the part to be included in the combined image (i.e., the first sub image 1821) may correspond to a central part of the first original image 1811. The electronic device 1801 may display, on the display 1806, at least one of a first indicator 1830 indicating information about arrangement of a currently captured image in a combined image, a second indicator 1832 indicating an actual photographing time/total photographing time (e.g., three seconds) of the currently captured image, a third indicator (e.g., a progress bar) 1834 indicating a photographing progress state, and a fourth indicator 1836 indicating that photographing is currently performed, during capturing of the first original image 1811. The electronic device 1801 automatically terminates capturing of the first original image 1811 if the actual photographing time reaches the total photographing time, based on the configuration information.

Figure 18C:
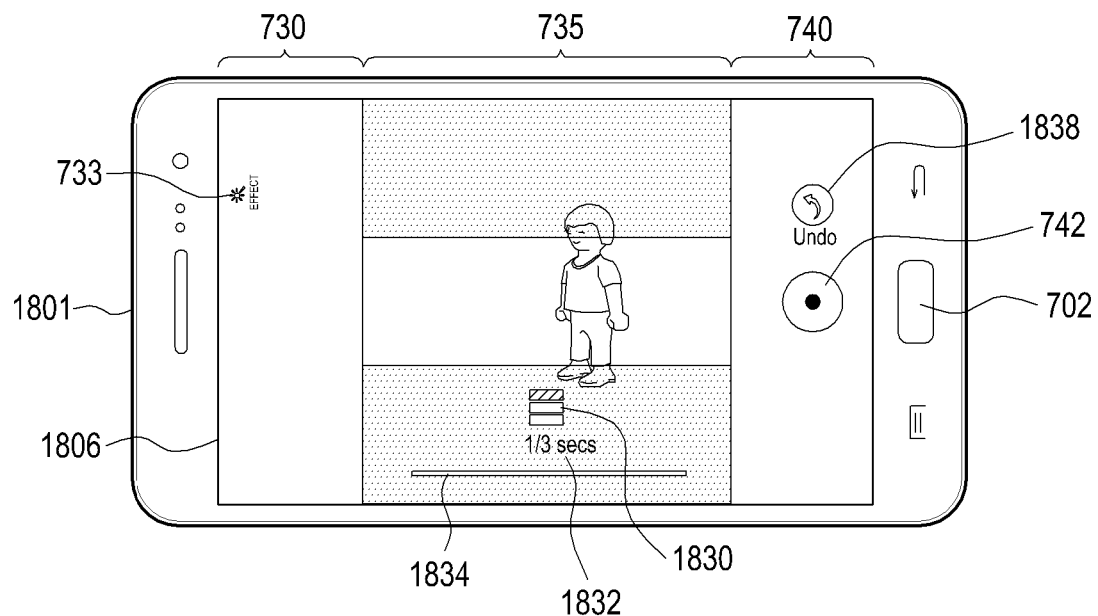

Referring to FIG. 18C, the electronic device 1801 may automatically display at least one of a cancel button 1838 for cancelling capturing of (or undoing or removing) the first original image 1811 and an effect setting item 733 for applying a visual effect to the first original image 1811 or the first sub image 1821 on the display 1806, if capturing of the first original image 1811 is completed.

Figure 18D:
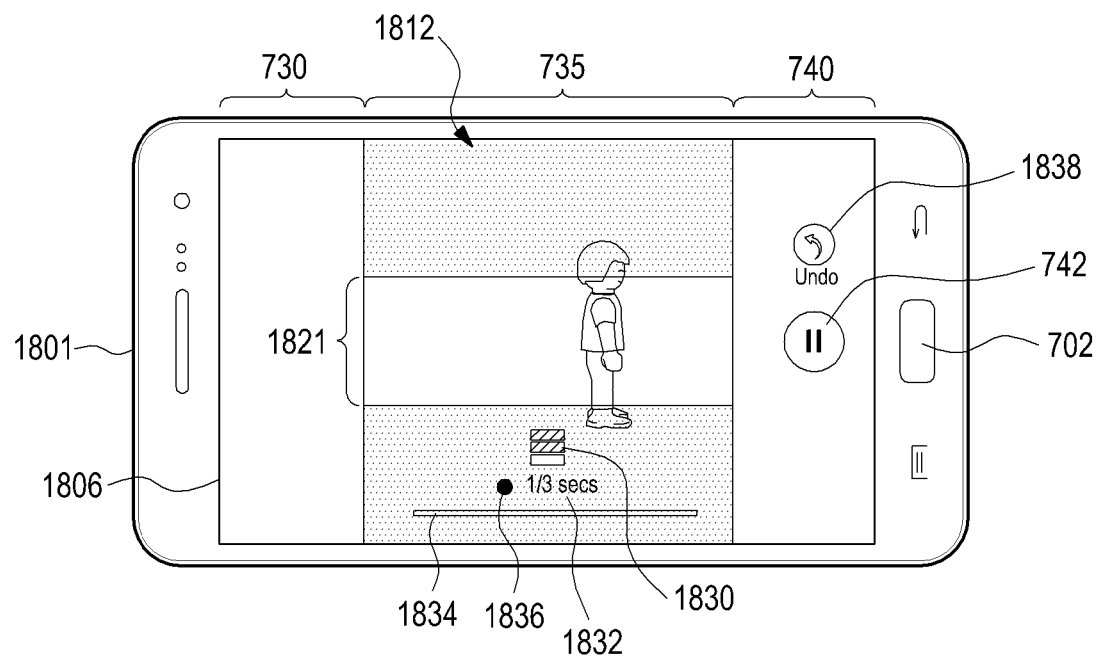

Referring to FIG. 18D, the electronic device 1801 may detect a user input (or selection) with respect to the photograph/stop button 742 after completion of capturing of the first original image 1811. The electronic device 1801 initiates capturing of the second original image 1812 in response to the user input. The electronic device 1801 displays a part (i.e., a second sub image 1822) of the second original image 1812, which is to be included in the combined image, on the display 1806. The electronic device 1801 may display, on the display 1806, at least one of the first indicator 1830, the second indicator 1832, the third indicator (e.g., a progress bar) 1834, and the fourth indicator 1836, during capturing of the second original image 1812. The electronic device 1801 automatically terminates capturing of the second original image 1812 if the actual photographing time reaches the total photographing time, based on the configuration information.

Figure 18E:
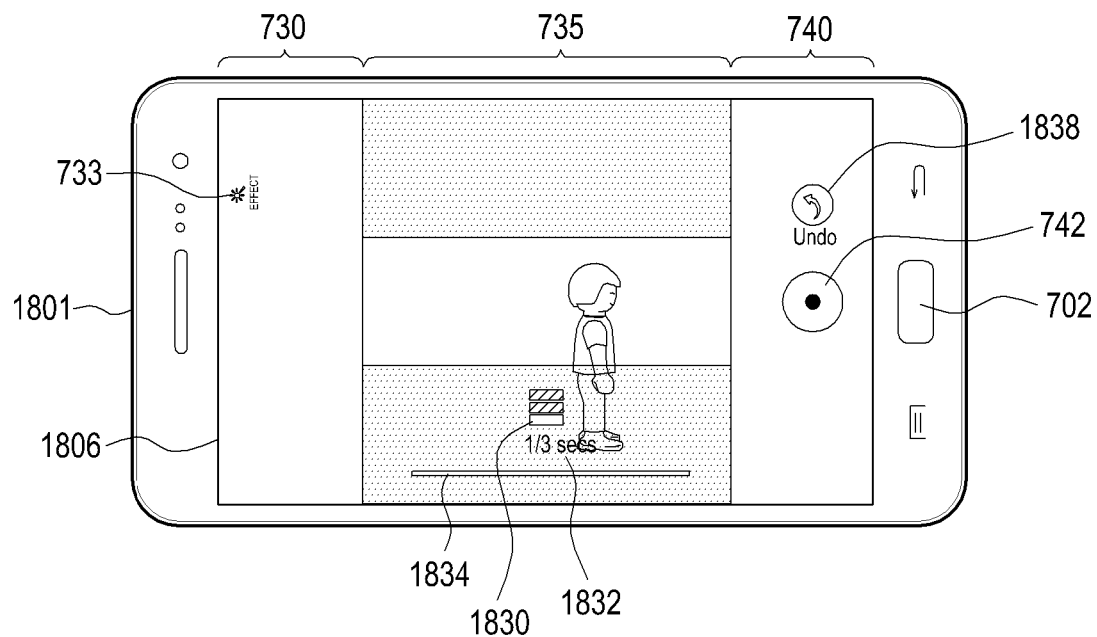

Referring to FIG. 18E, the electronic device 1801 may automatically display at least one of the cancel button 1838 and the effect setting item 733 on the display 1806, if capturing of the second original image 1812 is completed.

Figure 18F:
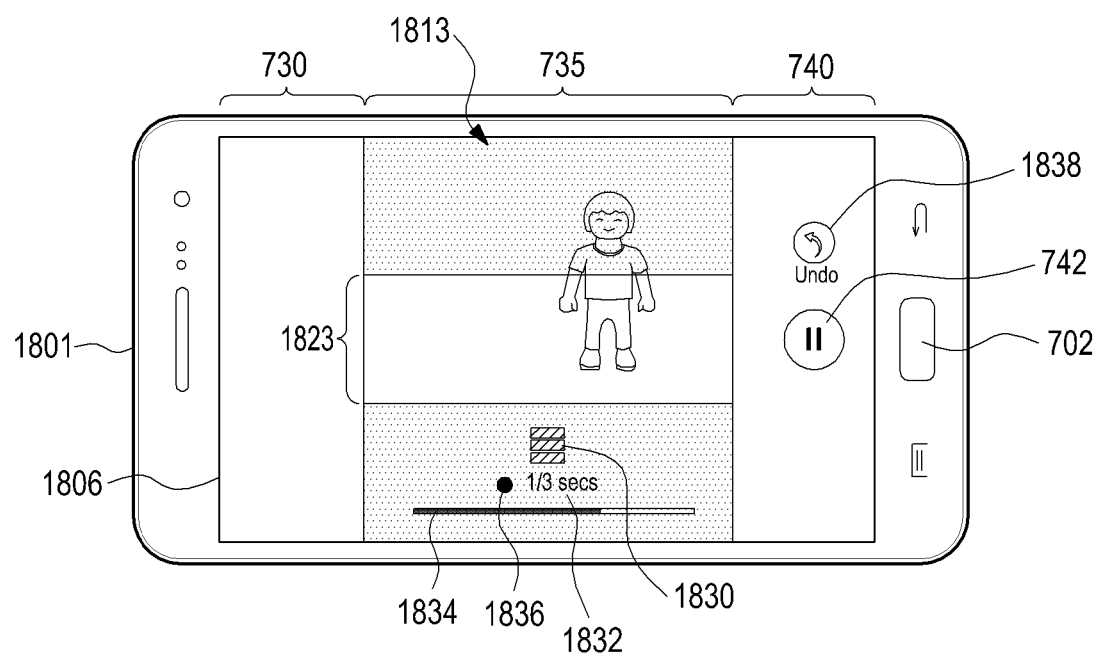

Referring to FIG. 18F, the electronic device 1801 may detect a user input (or selection) with respect to the photograph/stop button 742, after completion of capturing of the second original image 1812. The electronic device 1801 initiates capturing of a third original image 1813 in response to the user input. The electronic device 1801 may display a part of the third original image 1813 (i.e., a third sub image 1823), which is to be included in the combined image, on the display 1806. The electronic device 1801 may display, on the display 1806, at least one of the first indicator 1830, the second indicator 1832, the third indicator (e.g., a progress bar) 1834, and the fourth indicator 1836, during capturing of the third original image 1813. The electronic device 1801 automatically terminates capturing of the third original image 1813 if the actual photographing time reaches the total photographing time, based on the configuration information.

Figure 18G:
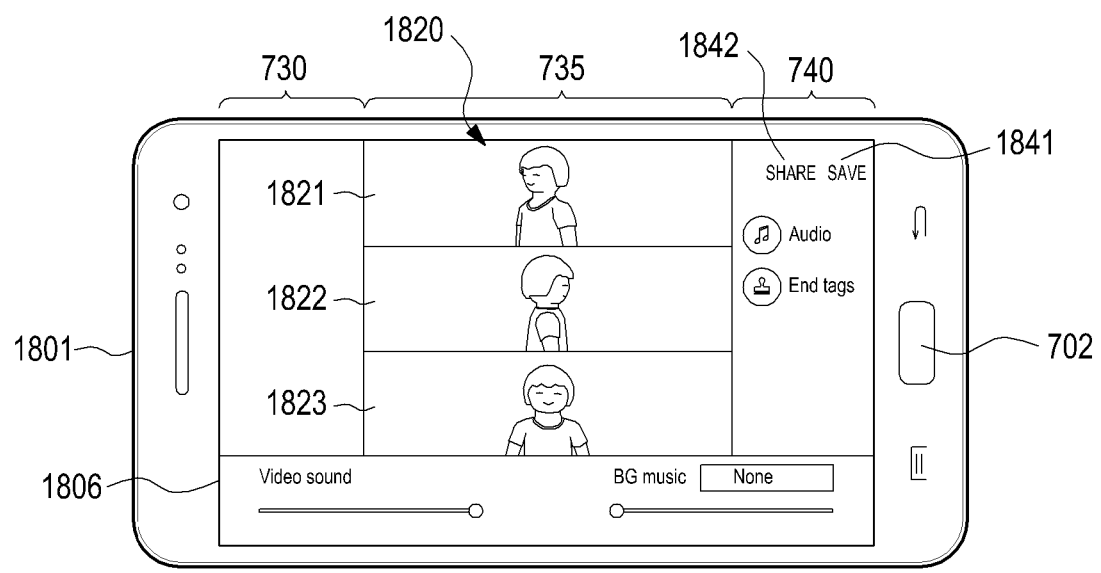

Referring to FIG. 18G, the electronic device 1801 may automatically display a combined image 1820 including the first sub image 1821, the second sub image 1822, and the third sub image 1823 on the display 1806, if capturing of the third original image 1813 is completed. For example, the electronic device 1801 may divide the live-view region 735 into first through third regions based on configuration information (e.g., display region arrangement information) about the combined image. The electronic device 1801 may display the first sub image 1821 on a first region, the second sub image 1822 on a second region, and the third sub image 1433 on a third region.

In an embodiment, the electronic device 1801 may automatically display, on the display 1806, a share item 1842 for sharing the combined image 1820, a store item 1841 for storing the combined image 1820, and an item for editing audio information that is included or to be included in the combined image 1820.

In an embodiment, if a user input (e.g., input of a button such as the home button/key 702, the back button, the multi-task button, etc.) or occurrence of an event (e.g., call reception/sending) is detected during capturing of any one of the original images 1811, 1812, and 1813, the electronic device 1801 cancel or stop capturing of the original image. For example, if the camera application is executed again upon termination of an event or in response to a user input, the electronic device 1801 may display a stop screen of the original image or a screen (e.g., the screen shown in FIG. 18C) for capturing an original image subsequent to the original image that is already captured before the cancellation.

In an embodiment, if selection of the back button is detected in a state where capturing of any one of the original images 1811, 1812, and 1813 is stopped, the electronic device 1801 displays an initial screen (e.g., the screen shown in FIG. 18A) for capturing the combined image. In an embodiment, if selection of the back button is detected, the electronic device 1801 may display a message window asking whether to remove an already captured original image (or a part thereof). For example, upon user's selection of a remove button included in the window message, the electronic device 1801 may delete the already captured original image (or a part thereof).

In an embodiment, the arrangement setting item 732 included in the first menu bar 730 may have the same arrangement regardless of an orientation mode/direction (e.g., a portrait mode/direction or a landscape mode/direction) of the electronic device 1801. A first indicator 1830 indicating information about arrangement of a currently captured image in a combined image may be rotated according to an orientation mode/direction (e.g., the portrait mode/direction or the landscape mode/direction) of the electronic device 1801 in a before-capturing state as shown in FIG. 18A or a during-capturing state as shown in FIG. 18B. For example, if the electronic device 1801 is rotated at 90 degrees in a clockwise direction, the first indicator 1830 may also be rotated at 90 degrees in the clockwise direction. In the first indicator indicating the information about arrangement of the currently captured image, first through fourth sub images are displayed as being arranged in the clockwise direction (e.g., may be displayed in an order of 1, 2, 4, and 3 in the clockwise direction from a left upper end), and if the first indicator is rotated at 90 degrees in the clockwise direction, the clockwise order of the first through fourth sub images may be maintained (e.g., may be displayed in an order of 3, 1, 2, and 4 in the clockwise direction from the left upper end).

FIGS. 19A through 19E are views for describing a method for providing an image by an electronic device according to various embodiments.

Figure 19A:
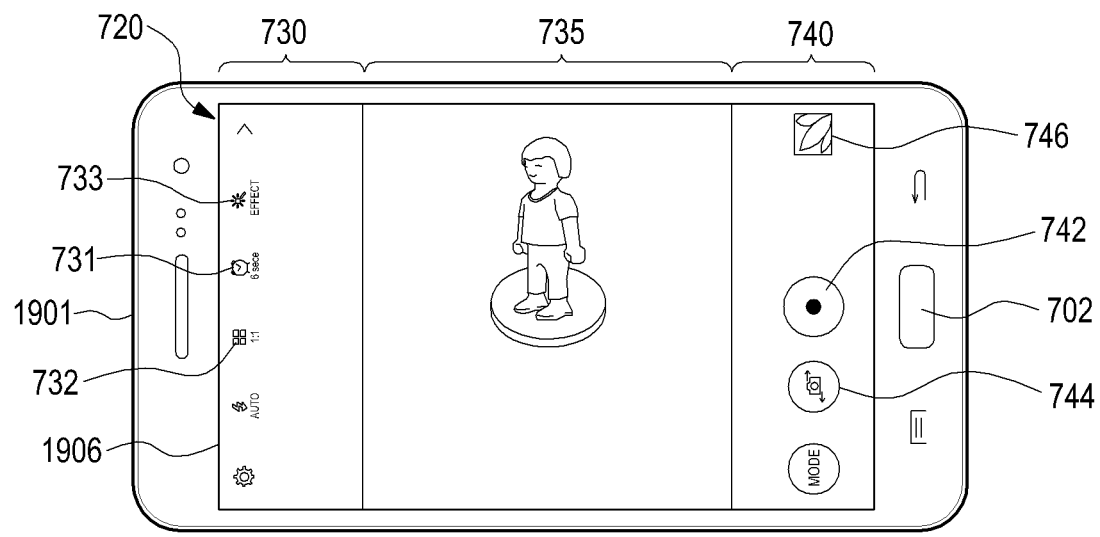
FIGS. 19A through 19E are views for describing a method for providing an image by an electronic device according to various embodiments.

Referring to FIG. 19A, an electronic device 1901 (e.g., the electronic device 101, 201, or 401) may display the camera application screen 720 as shown in FIG. 7B on a display 1906 (e.g., the display 160, 260, or 460) functionally connected with the electronic device 1901.

The electronic device 1901 may store time information (e.g., six seconds) for the combined image and/or the plurality of sub images of the combined image as one of the configuration information about the combined image, in response to a user input (or selection) using the time setting item 731.

The electronic device 1901 may store display region (or window) arrangement information for a plurality of sub images of a combined image (e.g., (e.g., arrangement for a series combined image) as one of the configuration information about the combined image in the memory (e.g., the memory 130, 230, or 430) functionally connected with the electronic device 1901, in response to a user input (or selection) using the arrangement setting item 732.

Figure 19B:
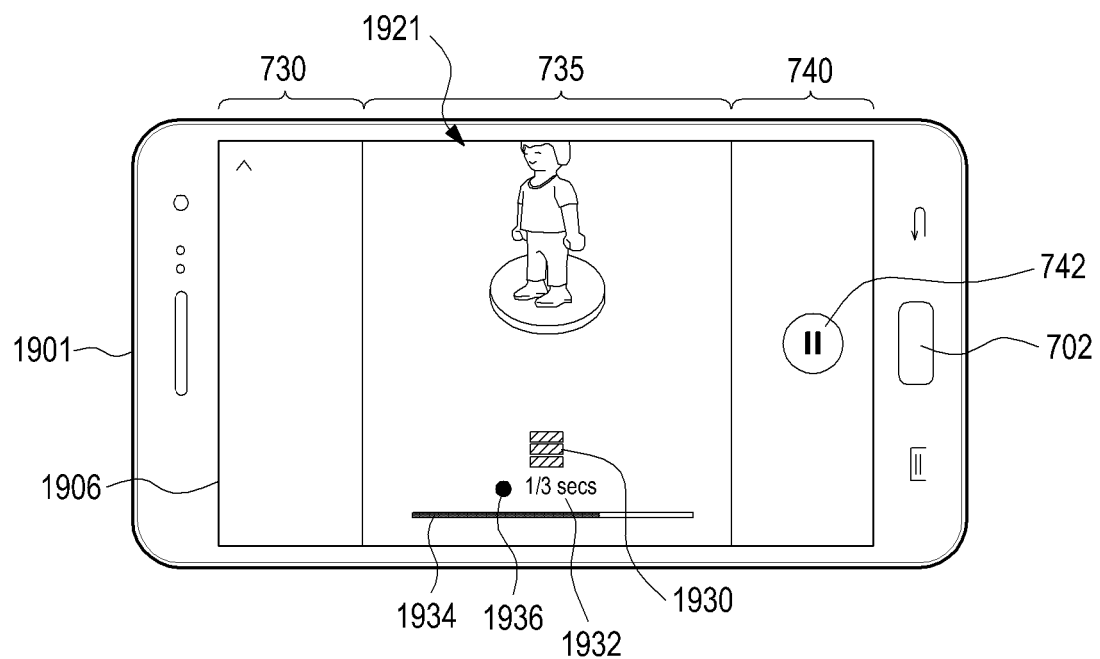

Referring to FIG. 19B, the electronic device 1901 may detect a user input (or selection) with respect to the photograph/stop button 742. The electronic device 1901 initiates capturing of the first sub image 1921 in response to the user input. The electronic device 1901 may display, on the display 1906, at least one of a second indicator 1932 indicating an actual photographing time/total photographing time (e.g., six seconds), a third indicator (e.g., a progress bar) 1934 indicating a photographing progress state, and a fourth indicator 1936 indicating photographing is currently performed/is paused, during capturing of the first sub image 1921.

Figure 19C:
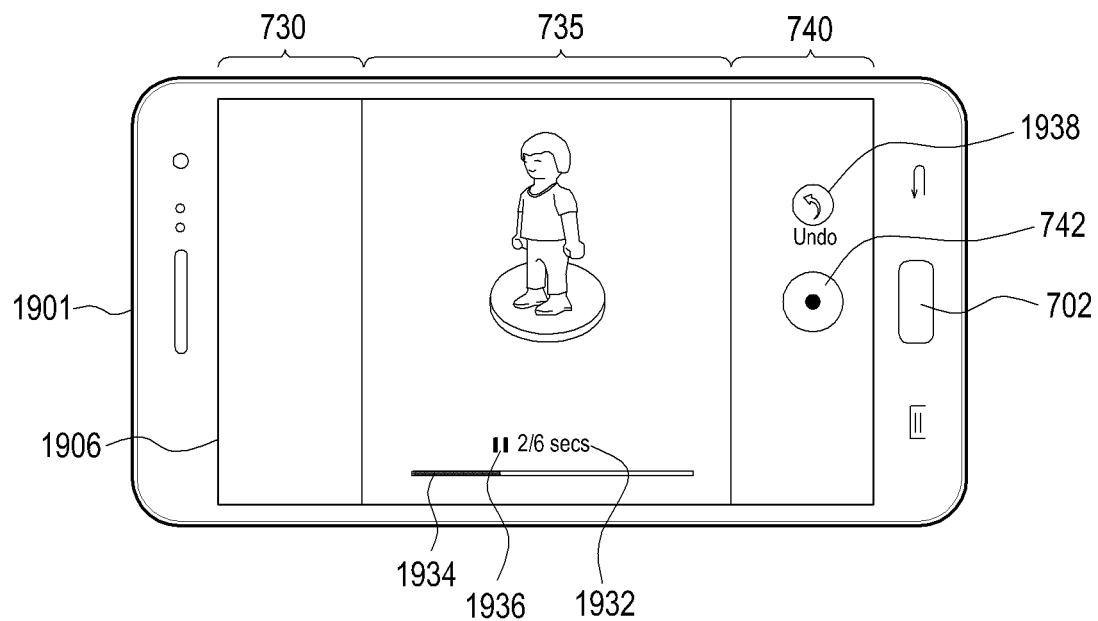

Referring to FIG. 19C, the electronic device 1901 may detect a user input (or selection) with respect to the photograph/stop button 742. The electronic device 1901 completes capturing of the first sub image 1921 in response to the user input. The electronic device 1901 may display, on the display 1906, at least one of a cancel button 1938 for cancelling capturing of (or undoing or removing) the first sub image 1921, a second indicator 1932 indicating an actual photographing time/total photographing time (e.g., six seconds), a third indicator 1934 indicating a photographing progress state (e.g., a progress bar), and a fourth indicator 1936 indicating that photographing is currently performed/is paused.

Figure 19D:
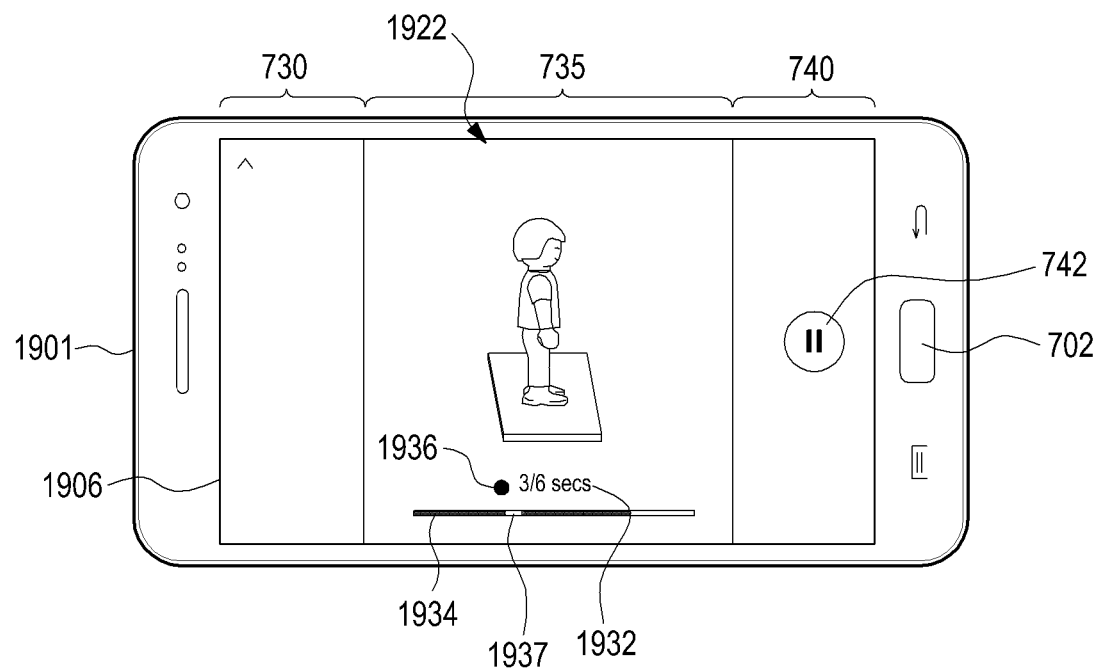

Referring to FIG. 19D, the electronic device 1901 may detect a user input (or selection) with respect to the photograph/stop button 742 after completion of capturing of the first sub image 1921. The electronic device 1901 initiates capturing of the second sub image 1922 in response to the user input. The electronic device 1901 may display at least one of the second indicator 1932, the third indicator 1934, and the fourth indicator 1936 on the display 1906, during capturing of each of the second sub image 1922. The electronic device 1901 may display a fifth indicator 1937 for distinguishing the first sub image 1921 from the second sub image 1922 on the display 1906. The electronic device 1901 automatically terminates capturing of the second sub image 1922 if the actual photographing time reaches the total photographing time, based on the configuration information.

Figure 19E:
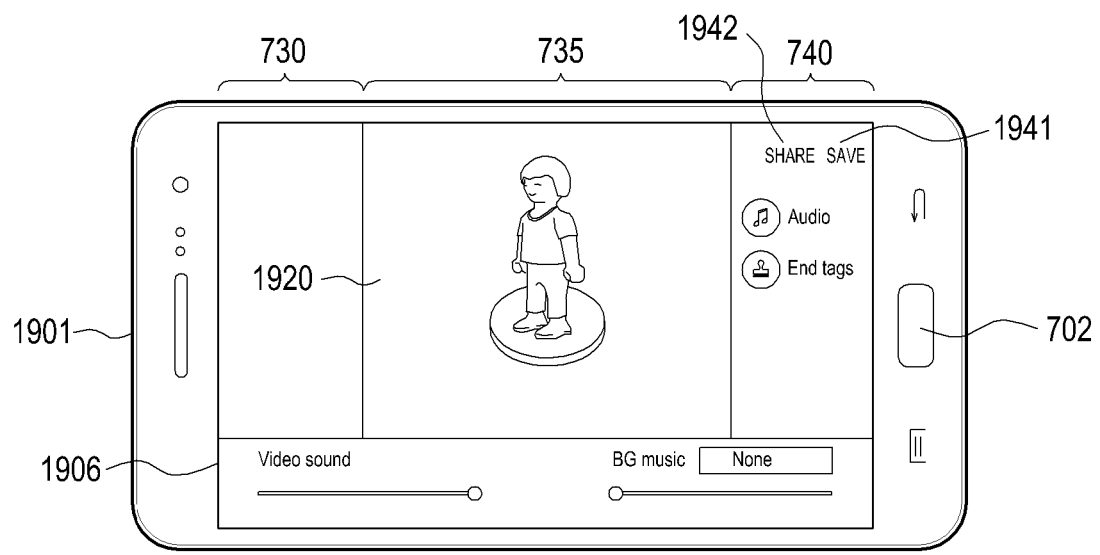

Referring to FIG. 19E, the electronic device 1901 may automatically display, on the display 1906, a combined image 1920 including the first sub image 1921 and the second sub image 1922 if capturing of the second sub image 1922 is completed.

In an embodiment, the electronic device 1901 may automatically display, on the display 1906, a share item 1942 for sharing the combined image 1920, a store item 1941 for storing the combined image 1920, and an item for editing audio information that is included or to be included in the combined image 1920.

In an embodiment, if a user input (e.g., input of a button such as the home button/key 702, the back button, the multi-task button, etc.) or occurrence of an event (e.g., call reception/sending) is detected during capturing of any one of the sub images 1911 and 1912, the electronic device 1901 cancel or stop capturing of the sub image. For example, if the camera application is executed again upon termination of an event or in response to a user input, the electronic device 1901 may display a stop screen of the sub image or a screen (e.g., the screen shown in FIG. 19C) for capturing a sub image subsequent to the sub image that is already captured before the cancellation.

In an embodiment, if selection of the back button is detected in a state where capturing of any one of the sub images 1911 and 1912 is stopped, the electronic device 1901 displays an initial screen (e.g., the screen shown in FIG. 18A) for capturing the combined image. In an embodiment, if selection of the back button is detected, the electronic device 1901 may display a message window asking whether to remove an already captured sub image (or a part thereof). For example, upon user's selection of a remove button included in the window message, the electronic device 1901 may delete the already captured sub image (or a part thereof).

FIGS. 20A through 20D are views for describing a method for providing an image by an electronic device according to various embodiments.

Figure 20A:
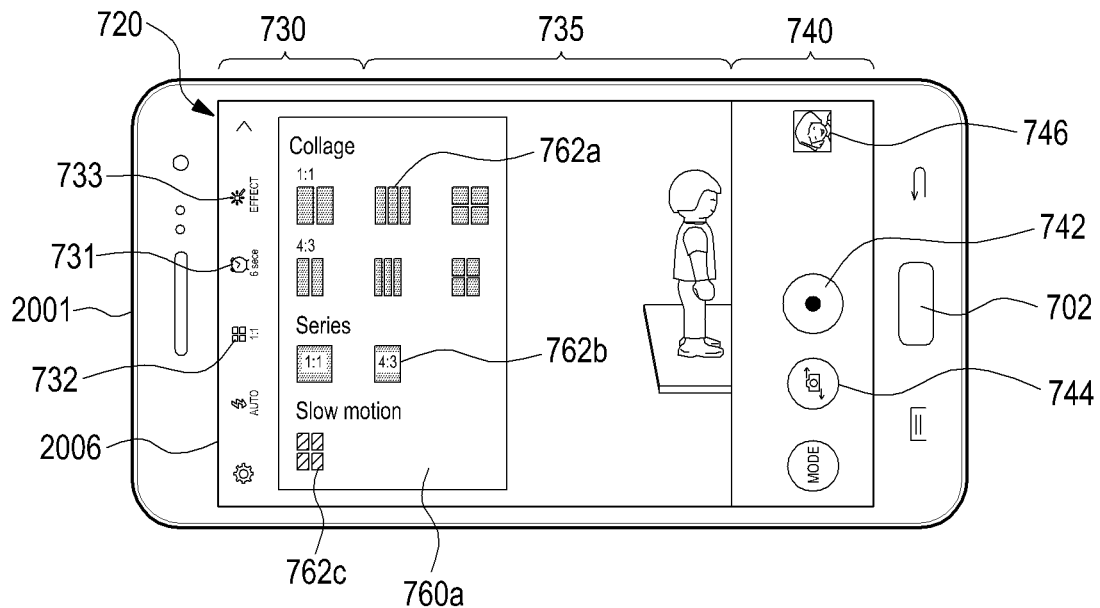
FIGS. 20A through 20D are views for describing a method for providing an image by an electronic device according to various embodiments.

Referring to FIG. 20A, an electronic device 2001 (e.g., the electronic device 101, 201, or 401) may display the camera application screen 720 as shown in FIG. 7B on a display 2006 (e.g., the display 160, 260, or 460) functionally connected with the electronic device 2001.

The electronic device 2001 may store time information (e.g., six seconds) for the combined image and/or the plurality of sub images of the combined image as one of the configuration information about the combined image in the memory (e.g., the memory 130, 230, or 430) functionally connected with the electronic device 2001, in response to a user input (or selection) using the time setting item 731.

The electronic device 2001 may detect a user input (or selection) with respect to the arrangement setting item 732. For example, the electronic device 2001 may display a second menu window 760a for inputting/setting display region (or window) arrangement information for the combined image on the display 2006 in response to the user input.

The electronic device 2001 may detect a user input (or selection) with respect to at least one third graphic element 762c indicating arrangement of a slow-motion combined image among the graphic elements 762a, 762b, and 762c of the second menu window 760a. The electronic device 2001 stores display region (or window) arrangement information corresponding to the selected graphic element as one of configuration information for the combined image in the memory in response to the user input.

Figure 20B:
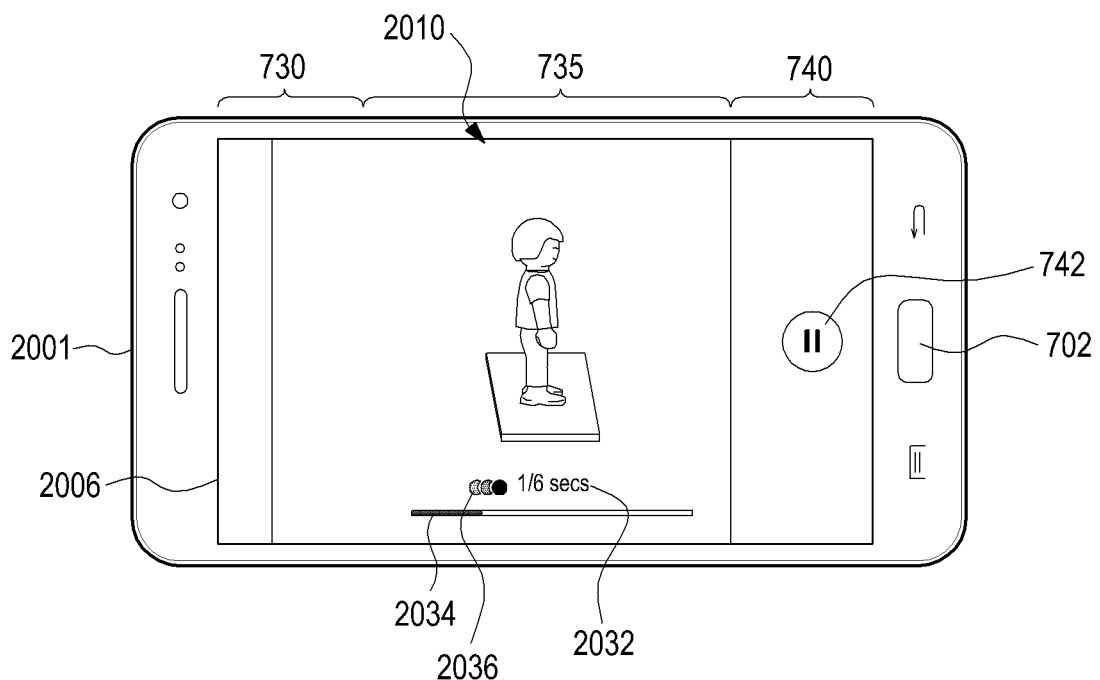

Referring to FIG. 20B, the electronic device 2001 may detect a user input (or selection) with respect to the photograph/stop button 742. The electronic device 2001 initiates capturing of an original image 2010 in response to the user input. The electronic device 2001 may display, on the display 2006, at least one of a first indicator 1830 indicating information about arrangement of a currently captured image in a combined image, a second indicator 2032 indicating an actual photographing time/total photographing time (e.g., three seconds) of the currently captured image, a third indicator (e.g., a progress bar) 2034 indicating a photographing progress state, and a fourth indicator 2036 indicating that slow motion is currently photographed/is paused, during capturing of the original image 2010. The electronic device 2001 automatically terminates capturing of the original image 2010 if the actual photographing time reaches the total photographing time, based on the configuration information.

Figure 20C:
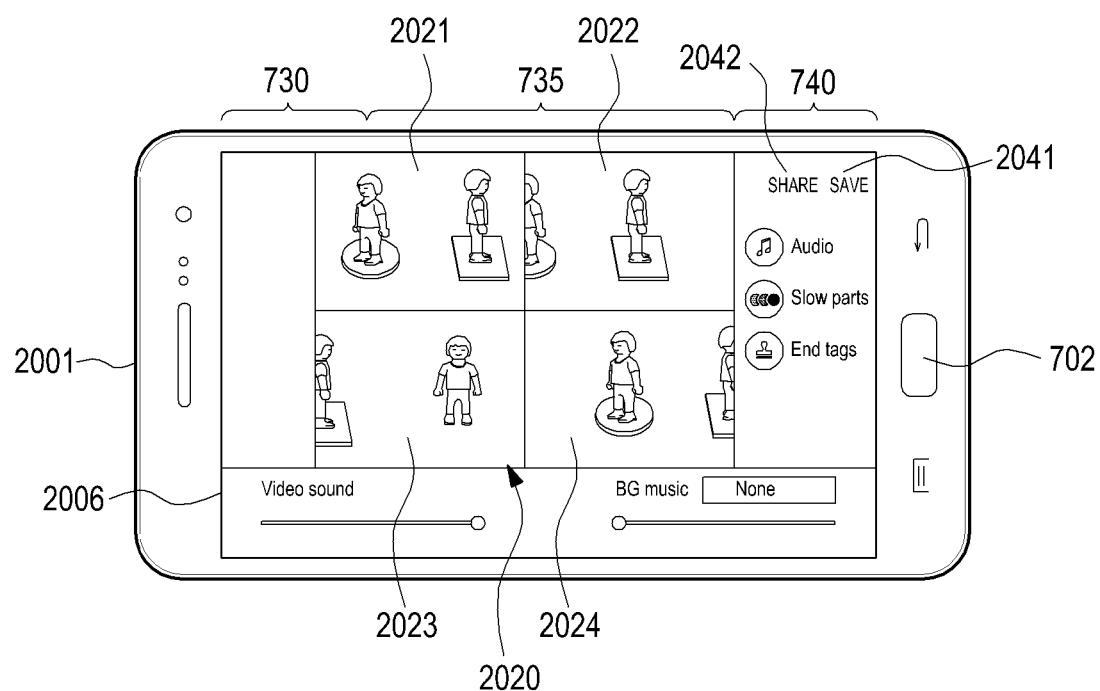

Referring to FIG. 20C, the electronic device 2001 (e.g., the image combiner 414) generates a first sub image 2021 having the same playback speed as that of an original image 2010 and second through fourth sub images 2022, 2023, and 2024 having slower playback speeds than that of the original image 2010, based on the original image 2010 if capturing of the original image 2010 is completed. The electronic device 2001 may automatically display a combined image 2020 including the first sub image 2021, the second sub image 2022, the third sub image 2023, and the fourth sub image 2024 on the display 2006, if capturing of the third original image 2021 is completed. For example, the electronic device 2001 may divide the live-view region 735 into first through fourth regions based on configuration information (e.g., display region arrangement information) about the combined image. For example, the electronic device 2001 may display the first sub image 2021 on a first region, the second sub image 2022 on a second region, the third sub image 2023 on a third region, and the fourth sub image 2024 on a fourth region.

In an embodiment, the electronic device 2001 may automatically display, on the display 2006, a share item 2042 for sharing the combined image 2020, a store item 2041 for storing the combined image 2020, an edit item 2043 for editing each of the sub images 2021, 2022, 2023, and 2024, and an item for editing audio information that is included or to be included in the combined image 1920.

Figure 20D:
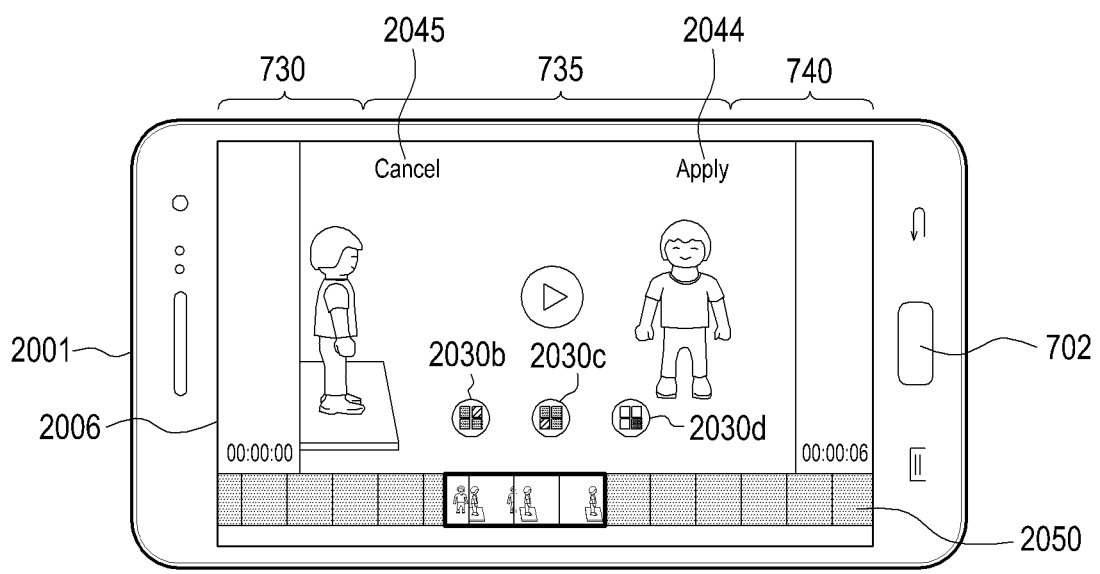

Referring to FIG. 20D, the electronic device 2001 may detect a user input (or selection) with respect to the edit item 2043. The electronic device 2001 displays, on the display 2006, indicators 2030b, 2030c, and 2030d indicating information about arrangement of the second through fourth sub images 2022, 2023, and 2024 in the combined image 2020, in response to the user input. The electronic device 2001 displays, on the display 2006, image frames 2050 of a sub image corresponding to a selected indicator, in response to a user input (or selection) with respect to any one of the indicators 2030b, 2030c, and 2030d, the electronic device 2001 displays an apply button 2044 for applying an edited sub image to the combined image 2020 and a cancel button 2045 for canceling edition of the sub image on the display 2026.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

According to various embodiments, a storage medium has recorded therein instructions which, when executed by at least one processor, are configured to cause the at least one processor to perform at least one operation including obtaining an image of a subject by using a camera functionally connected with an electronic device, generating at least one sub image corresponding to a part of the subject based on the image, and concurrently displaying the image on a first region of a display functionally connected with the electronic device and the at least one sub image on a second region of the display.

According to various embodiments, a storage medium has recorded therein instructions which, when executed by at least one processor, are configured to cause the at least one processor to perform at least one operation including obtaining a first image by using a camera functionally connected with an electronic device, generating a second image by using the first image, to combine the first image with the second image to thereby generate a third image, the first image being provided on a first region of the third image and the second image being provided on a second region of the third image, and displaying the third image on a display functionally connected with the electronic device.

According to various embodiments, a storage medium has recorded therein instructions which, when executed by at least one processor, are configured to cause the at least one processor to perform at least one operation including obtaining a first image of a subject by using a camera functionally connected with an electronic device, generating at least one image including a second image to be associated with the first image, and concurrently displaying the first image on a first region of a display functionally connected with the electronic device and the second image on a second region of the display.

According to various embodiments, a storage medium has recorded therein instructions which, when executed by at least one processor, are configured to cause the at least one processor to perform at least one operation including obtaining a first image, generating at least one image including a second image to be associated with the first image, and concurrently displaying the first image on a first region of a display functionally connected with the electronic device and the second image on a second region of the display.

According to various embodiments, a storage medium has recorded therein instructions which, when executed by at least one processor, are configured to cause the at least one processor to perform at least one operation including capturing a first image by using a camera functionally connected with an electronic device, generating at least one image including a second image based on a captured part of the first image during/after capturing of the first image, and concurrently displaying the first image on a first region of a display functionally connected with the electronic device and the second image on a second region of the display.

According to various embodiments, a storage medium has recorded therein instructions which, when executed by at least one processor, are configured to cause the at least one processor to perform at least one operation including storing configuration information about a combined image, obtaining a first image to be included in the combined image, automatically generating at least one image including a second image to be included in the combined image based on the first image, and concurrently displaying the first image on a first region of a display functionally connected with an electronic device and the second image on a second region of the display.

According to various embodiments, a storage medium has recorded therein instructions which, when executed by at least one processor, are configured to cause the at least one processor to perform at least one operation including storing configuration information about a combined image, obtaining a first image to be included in the combined image, automatically generating at least one image including a second image that is associated with the first image and is to be included in the combined image based on the configuration image, and generating the combined image including the first image and the second image.

According to various embodiments, a storage medium has recorded therein instructions which, when executed by at least one processor, are configured to cause the at least one processor to perform at least one operation including displaying a first image on a first screen region of a display functionally connected with an electronic device, displaying a second image to be associated with the first image on a second screen region of the display, and generating a combined image including the first image and the second image that are concurrently displayed on the display.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. A method for an electronic device, the method comprising:
   identifying a selection of information on an arrangement of at least two moving images;
   displaying at least one of a plurality of image frames obtained by a camera functionally connected with the electronic device, through a screen comprising a specific region corresponding to the information on the arrangement, wherein an effect that separates the specific region from another region in the screen is applied to the screen;
   in response to obtaining a first input while displaying the at least one of the plurality of image frames, generating a first moving image comprising first image frames corresponding to the specific region in a part of the plurality of image frames;
   in response to obtaining a second input after obtaining the first input, generating a second moving image comprising second image frames corresponding to the specific region in another part of the plurality of image frames; and
   concurrently displaying the first moving image on a first region of a display functionally connected with the electronic device and the second moving image on a second region of the display based on the information on the arrangement of the at least two moving images.

2. The method of claim 1, further comprising
   generating a third moving image by combining the first moving image with the second moving image.

3. The method of claim 1, wherein the concurrent displaying comprises displaying the first moving image at a first playback speed and the second moving image at a second playback speed different from the first playback speed.

4. The method of claim 1, wherein the specific region has a predetermined size and a predetermined location in the screen.

5. The method of claim 1, wherein an object indicating the information on the arrangement of the at least two moving images is displayed through the screen, and
   wherein the information on the arrangement of the at least two moving images comprises information on an arrangement of a moving image being currently recorded among the at least two moving images.

6. The method of claim 1, further comprising:
   executing a camera application; and
   dividing a live-view region of the camera application into a plurality of regions comprising the first region and the second region.

7. An electronic device comprising:
   a display;
   a camera; and
   a processor functionally connected to the camera and the display, wherein the processor is configured to:
       identify a selection of information on an arrangement of at least two moving images;
       control the display to display at least one of a plurality of image frames obtained by the camera, through a screen comprising a specific region corresponding to the information on the arrangement, wherein an effect that separates the specific region from another region in the screen is applied to the screen;

in response to obtaining a first input while displaying the at least one of the plurality of image frames, generate a first moving image comprising first image frames corresponding to the specific region in a part of the plurality of image frames;

in response to obtaining a second input after obtaining the first input, generate a second moving image comprising second image frames corresponding to the specific region in another part of the plurality of image frames; and control the display to concurrently display the first moving image on a first region of the display and the second moving image on a second region of the display based on the information on the arrangement of the at least two moving images.

8. The electronic device of claim 7, wherein the processor is further configured to generate a third moving image by combining the first moving image with the second moving image.

9. The electronic device of claim 8, wherein the processor is further configured to transmit the third moving image to an external electronic device by using a communication module functionally connected with the electronic device.

10. The electronic device of claim 7, wherein the processor is further configured to display the first moving image at a first playback speed and the second moving image at a second playback speed different from the first playback speed.

11. The electronic device of claim 7, wherein the specific region has a predetermined size and a predetermined location in the screen.

12. The electronic device of claim 7, wherein an object indicating the information on the arrangement of the at least two moving images is displayed through the screen, and wherein the information on the arrangement of the at least two moving images comprises information on an arrangement of a moving image being currently recorded among the at least two moving images.

13. The electronic device of claim 7, wherein the processor is further configured to:

execute a camera application; and divide a live-view region of the camera application into a plurality of regions comprising the first region and the second region.

* * * * *